(12) United States Patent
Shimazu et al.

(10) Patent No.: US 7,750,957 B2
(45) Date of Patent: Jul. 6, 2010

(54) PIXEL ARRANGING APPARATUS, SOLID-STATE IMAGE SENSING APPARATUS, AND CAMERA

(75) Inventors: Yoshihisa Shimazu, Mukou (JP); Ryouichi Nagayoshi, Nishinomiya (JP); Toshiya Fujii, Ohtsu (JP); Toshiyuki Nakashima, Minoo (JP); Toshinobu Hatano, Nagaokakyo (JP); Jun Kajiwara, Yawata (JP); Kenji Arakawa, Toyonaka (JP); Toshiya Kogishi, Kyoto (JP)

(73) Assignee: Panasonic Corporation, Osaka (JP)

( * ) Notice: Subject to any disclaimer, the term of this patent is extended or adjusted under 35 U.S.C. 154(b) by 1211 days.

(21) Appl. No.: 10/970,724

(22) Filed: Oct. 22, 2004

(65) Prior Publication Data
US 2005/0104982 A1 May 19, 2005

(30) Foreign Application Priority Data
Oct. 24, 2003 (JP) ............................. 2003-365225
May 13, 2004 (JP) ............................. 2004-143480

(51) Int. Cl.
*H04N 5/335* (2006.01)
*H04N 3/14* (2006.01)
*H01L 27/00* (2006.01)
*H01L 31/113* (2006.01)

(52) U.S. Cl. .................. 348/294; 348/312; 348/316; 250/208.1; 257/291; 257/292

(58) Field of Classification Search .............. 348/220.1, 348/294, 268–281, 257, 316, 312; 250/208.1; 257/291–292
See application file for complete search history.

(56) References Cited

U.S. PATENT DOCUMENTS
4,937,037 A * 6/1990 Griffiths et al. ............... 345/36

(Continued)

FOREIGN PATENT DOCUMENTS
JP 06-303529 10/1994

(Continued)

OTHER PUBLICATIONS

Japanese Office Action issued in Japanese Patent Application No. 2004-307306, mailed Mar. 16, 2010.

*Primary Examiner*—Lin Ye
*Assistant Examiner*—Mekonnen Dagnew
(74) *Attorney, Agent, or Firm*—McDermott Will & Emery LLP

(57) ABSTRACT

A solid-state image sensing apparatus including a solid-state image sensing device and a signal processing circuit. The solid-state image sensing device includes: a vertical transfer unit, composed of transfer columns corresponding to columns of the light-to-electric conversion elements, operable to transfer, in a vertical direction, signal charges read out from the light-to-electric conversion elements; a horizontal transfer unit operable to receive the signal charges from the vertical transfer unit and transfer them in a horizontal direction. The signal processing circuit converts the signal charges from the horizontal transfer unit into pixel data, and rearranges it into a two-dimensional array. In the rearrangement, the signal processing circuit, per transfer of one piece of pixel data, cyclically selects a line memory out of three line memories, writes a piece of pixel data into the selected line memory, or reads a row of pixel data from the selected line memory.

18 Claims, 46 Drawing Sheets

U.S. PATENT DOCUMENTS

| | | | |
|---|---|---|---|
| 5,440,406 A | 8/1995 | Sugino | |
| 5,491,512 A * | 2/1996 | Itakura et al. | 348/321 |
| 6,215,520 B1 * | 4/2001 | Taniji | 348/249 |
| 6,423,959 B1 * | 7/2002 | Ikeda et al. | 250/208.1 |
| 6,661,451 B1 * | 12/2003 | Kijima et al. | 348/220.1 |
| 6,686,960 B2 * | 2/2004 | Iizuka | 348/273 |
| 6,888,568 B1 * | 5/2005 | Neter | 348/222.1 |
| 2001/0010554 A1 * | 8/2001 | Yoshida | 348/312 |
| 2005/0018063 A1 * | 1/2005 | Tominaga | 348/294 |

FOREIGN PATENT DOCUMENTS

| | | |
|---|---|---|
| JP | 11-234688 | 8/1999 |
| JP | 2002-043559 | 2/2002 |
| JP | 2003-101928 | 4/2003 |

\* cited by examiner

FIG.2

| a1 | a2 (DUMMY) | a3 (DUMMY) | a4 | a5 | a6 (DUMMY) | a7 | a8 | a9 | a10 | a11 | a12 | a13 | a14 | a15 |

| a16 | a17 | a18 | a19 | a20 | a21 | a22 | a23 | a24 | a25 (DUMMY) | a26 | a27 | a28 (DUMMY) | a29 (DUMMY) | a30 |

| b1 | b2 (DUMMY) | b3 (DUMMY) | b4 | b5 | b6 (DUMMY) | b7 | b8 | b9 | b10 | b11 | b12 | b13 | b14 | b15 |

| b16 | b17 | b18 | b19 | b20 | b21 | b22 | b23 | b24 | b25 (DUMMY) | b26 | b27 | b28 (DUMMY) | b29 (DUMMY) | b30 |

FIG.3

| (VERTICAL ADDRESS) | 0 | 1 | 2 | 3 | 4 | 5 | 6 | 7 |
|---|---|---|---|---|---|---|---|---|
| 5 | b9 | b12 | b15 | b18 | b21 | b24 | b27 | b30 |
| 4 | b5 | b8 | b11 | b14 | b17 | b20 | b23 | b26 |
| 3 | b1 | b4 | b7 | b10 | b13 | b16 | b19 | b22 |
| 2 | a9 | a12 | a15 | a18 | a21 | a24 | a27 | a30 |
| 1 | a5 | a8 | a11 | a14 | a17 | a20 | a23 | a26 |
| 0 | a1 | a4 | a7 | a10 | a13 | a16 | a19 | a22 |

(HORIZONTAL ADDRESS)

FIG.7

| (VERTICAL ADDRESS) | 0 | 1 | 2 | 3 | 4 | 5 | 6 | 7 | 8 | 9 |
|---|---|---|---|---|---|---|---|---|---|---|
| 5 | b3 (DUMMY) | b6 (DUMMY) | b9 | b12 | b15 | b18 | b21 | b24 | b27 | b30 |
| 4 | b2 (DUMMY) | b5 | b8 | b11 | b14 | b17 | b20 | b23 | b26 | b29 (DUMMY) |
| 3 | b1 | b4 | b7 | b10 | b13 | b16 | b19 | b22 | b25 (DUMMY) | b28 (DUMMY) |
| 2 | a3 (DUMMY) | a6 (DUMMY) | a9 | a12 | a15 | a18 | a21 | a24 | a27 | a30 |
| 1 | a2 (DUMMY) | a5 | a8 | a11 | a14 | a17 | a20 | a23 | a26 | a29 (DUMMY) |
| 0 | a1 | a4 | a7 | a10 | a13 | a16 | a19 | a22 | a25 | a28 (DUMMY) |

(HORIZONTAL ADDRESS)

FIG.26

| | 1 | 2 | 3 | 2 | 1 | 3 | 2 | 1 | 3 | 2 | 1 | 3 | 2 | 1 | 2 |
|---|---|---|---|---|---|---|---|---|---|---|---|---|---|---|---|
| | R41 | G43 | R42 | R43 | G41 | R42 | G43 | G41 | R42 | R43 | G41 | R42 | R43 | R41 | G43 |
| | G31 | B33 | G32 | G33 | B31 | G32 | B33 | B31 | G32 | G33 | B31 | G32 | G33 | G31 | B33 |
| BOTTOM ELEMENT | R21 | G23 | R22 | R23 | G21 | R22 | G23 | G21 | R22 | R23 | G21 | R22 | R23 | R21 | G23 |

| HCCD | G11 + G12 + G13 | | B11 + B12 + B13 | | G11 + G12 + G13 | | B11 + B12 + B13 | | G11 + G12 + G13 |

FIG.27

| | 1 | 3 | 2 | 1 | 3 | 2 | 1 | 3 | 2 | 1 | 3 | 2 |
|---|---|---|---|---|---|---|---|---|---|---|---|---|
| | G51 | G52 | G53 | B51 | B52 | B53 | G51 | G52 | G53 | B51 | B52 | B53 |
| | R41 | R42 | R43 | G41 | G42 | G43 | R41 | R42 | R43 | G41 | G42 | G43 |
| | G31 | G32 | G33 | B31 | B32 | B33 | G31 | G32 | G33 | B31 | B32 | B33 |

| R21 + R22 + R23 | | G21 + G22 + G23 | | R21 + R22 + R23 | | G21 + G22 + G23 | | R21 + R22 + R23 |
|---|---|---|---|---|---|---|---|---|
| | G11 + G12 + G13 | | B11 + B12 + B13 | | G11 + G12 + G13 | | B11 + B12 + B13 | |

| | 1 | 2 | 3 | 1 | 2 | 3 | 1 | 2 | 3 | 1 | 2 |
|---|---|---|---|---|---|---|---|---|---|---|---|
| | R61 | G63 | R62 | G61 | R63 | G62 | R61 | G63 | R62 | G61 | R63 |
| | G51 | B53 | G52 | B51 | G53 | B52 | G51 | B53 | G52 | B51 | G53 |
| | R41 | G43 | R42 | G41 | R43 | G42 | R41 | G43 | R42 | G41 | R43 |

| | a6 | a1 | a2 | a3 | a4 | a5 | a6 | a1 | a2 | a3 | a4 | a5 | a6 | a1 |
|---|---|---|---|---|---|---|---|---|---|---|---|---|---|---|
| | G31 | B11 | R21 | B31 | G11 | G21 | G31 | B11 | R21 | B31 | G11 | G21 | G31 | B11 |
| | + | + | + | + | + | + | + | + | + | + | + | + | + | + |
| | G32 | B12 | R22 | B32 | G12 | G22 | G32 | B12 | R22 | B32 | G12 | G22 | G32 | B12 |
| | + | + | + | + | + | + | + | + | + | + | + | + | + | + |
| | G33 | B13 | R23 | B33 | G13 | G23 | G33 | B13 | R23 | B33 | G13 | G23 | G33 | B13 |

| | 1 | 2 | 3 | 1 | 2 | 3 | 1 | 2 | 3 | 1 | 2 | 3 | 1 | 2 |
|---|---|---|---|---|---|---|---|---|---|---|---|---|---|---|
| | G31 | B33 | B32 | B31 | B33 | B32 | B31 | B33 | B32 | B31 | B33 | B32 | B31 | B33 |
| | R21 | G23 | R22 | G21 | G23 | R22 | G21 | G23 | R22 | G21 | G23 | R22 | G21 | G23 |
| | G11 | B13 | G12 | B11 | B13 | G12 | B11 | B13 | G12 | B11 | B13 | G12 | B11 | B13 |

| b6 | b1 | b2 | b3 | b4 | b5 | b6 | b1 | b2 | b3 | b4 | b5 | b6 | b1 |
|---|---|---|---|---|---|---|---|---|---|---|---|---|---|
| R61 | G41 | G51 | G61 | R41 | B51 | R61 | G41 | G51 | G61 | R41 | B51 | R61 | G41 |
| + | + | + | + | + | + | + | + | + | + | + | + | + | + |
| R62 | G42 | G52 | G62 | R42 | B52 | R62 | G42 | G52 | G62 | R42 | B52 | R62 | G42 |
| + | + | + | + | + | + | + | + | + | + | + | + | + | + |
| R63 | G43 | G53 | G63 | R43 | B53 | R63 | G43 | G53 | G63 | R43 | B53 | R63 | G43 |

| 0 | 1 | 2 | 3 | 4 | 5 | 6 | 7 | 8 | 9 | 10 | 11 | 12 | 13 | 14 |
|---|---|---|---|---|---|---|---|---|---|----|----|----|----|----|
| a1 | a2 (DUMMY) | a3 (DUMMY) | a4 | a5 | a6 (DUMMY) | a7 | a8 | a9 | a10 | a11 | a12 | a13 | a14 | a15 |

| 15 | 16 | 17 | 18 | 19 | 20 | 21 | 22 | 23 | 24 | 25 | 26 | 27 | 28 | 29 |
|----|----|----|----|----|----|----|----|----|----|----|----|----|----|----|
| a16 | a17 | a18 | a19 | a20 | a21 | a22 | a23 | a24 | a25 (DUMMY) | a26 | a27 | a28 (DUMMY) | a29 (DUMMY) | a30 |

PIXEL ARRANGING APPARATUS, SOLID-STATE IMAGE SENSING APPARATUS, AND CAMERA

This application is based on applications No. 2003-365225 and 2004-143480 filed in Japan, the contents of which are hereby incorporated by reference.

BACKGROUND OF THE INVENTION (1) Field of the Invention

The present invention relates to a solid-state image sensing apparatus composed of a solid-state image sensing device, which converts received light into electric signals, and a signal processing circuit.

(2) Description of the Related Art

One of most eagerly developed apparatuses in recent years might be solid-state image sensing apparatuses, which include a solid-state image sensing device for converting received light into electric signals, and a signal processing circuit for converting the electric signals into image signals.

The solid-state image sensing apparatuses are largely used in digital cameras, such as digital still cameras and digital video cameras. There has always been a strong demand for improving image quality of digital cameras, and the pixel resolution for the solid-state image sensing devices has been improved at a rapid pace.

Digital cameras use less pixels for shooting moving images than for taking still pictures, due to limited speeds at which image signals are output. In some methods proposed to achieve this, the solid-state image sensing devices output data of a reduced number of pixels, compared with the number of pixels for which it read signal charges initially.

Patent Document 1 (Japanese Laid-Open Patent Application No. H11-234688), for example, discloses a method for driving a solid-state image sensing device in which every three pixels aligned sequentially in the horizontal direction are regarded as one block, signal charges of two pixels except for the middle one (i.e. two at both ends of the block) are mixed together, and the signal charge of the middle pixel of a block is mixed with that of the middle pixel of an adjacent block. In this way, this driving method allows the solid-state image sensing device to output image signals of a predetermined number of pixels that have been reduced in the horizontal direction.

However, if one third of the components of the image signals is reduced as described above, one third of the sampling frequency, which is not 0 in the conventional driving methods, is added to the DC (Direct Current) component of the signals. This generates moire or false signals, degrading the image quality represented by the output image signals.

[PATENT DOCUMENT 1]: Japanese Laid-Open Patent Application No. H11-234688

SUMMARY OF THE INVENTION

The object of the present invention is therefore to provide a solid-state image sensing apparatus including a solid-state image sensing device which is capable of reducing the number of pixels to be processed, at least, in the horizontal direction, and outputting high-quality image signals at high speeds, without generating moire or false signals.

The above object is fulfilled by a pixel arranging apparatus for rearranging a plurality of pieces of pixel data received from a solid-state image sensing device, the pixel arranging apparatus comprising: an acquiring unit operable to acquire a sequence of the plurality of pieces of pixel data from the solid-state image sensing device; an extracting unit operable to extract pieces of pixel data from the sequence of the plurality of pieces of pixel data, one piece out of every predetermined number of pieces; and an arranging unit operable to arrange the extracted pieces of pixel data sequentially in an order in which the pieces of pixel data are extracted.

With the above-stated construction, it is possible to extract pieces of pixel data from the pixel data sequence, which is received from the solid-state image sensing device, one piece out of every predetermined number of pieces, and arrange the extracted pieces to form a sequence of data. Especially, in terms of two-dimensionally arranged pixel data of an image taken by the solid-state image sensing device, it is possible to, not outputting rows of pixel data continuously, extract pieces of pixel data one piece out of every predetermined number of pieces, and arrange the extracted pieces to output a sequence of data. This enables the image taken by the solid-state image sensing device to be reproduced by arranging each piece of pixel data constituting a sequence of pixel data.

In the above-described pixel arranging apparatus, the extracting unit may extract, as first pixel data, pieces of pixel data from the plurality of pieces of pixel data, one piece out of three pieces starting from a predetermined position, may extract, as second pixel data, pieces of pixel data from the plurality of pieces of pixel data, one piece out of three pieces starting from a position that is posterior to the predetermined position by four pieces of pixel data, and may extract, as third pixel data, pieces of pixel data from the plurality of pieces of pixel data, one piece out of three pieces starting from a position that is posterior to the predetermined position by eight pieces of pixel data, and the arranging unit arranges the extracted pieces of first pixel data sequentially in an order in which the pieces of first pixel data are extracted, arranges the extracted pieces of second pixel data sequentially in an order in which the pieces of second pixel data are extracted, and arranges the extracted pieces of third pixel data sequentially in an order in which the pieces of third pixel data are extracted.

With the above-stated construction, it is possible to extract pieces of pixel data from the pixel data sequence, which is received from the solid-state image sensing device, one piece out of three pieces, and arrange the extracted pieces to form a sequence of data. Especially, in terms of two-dimensionally arranged pixel data of an image taken by the solid-state image sensing device, it is possible to, not outputting rows of pixel data continuously, extract pieces of pixel data one piece out of every three pieces, and arrange the extracted pieces to output a sequence of data. This enables the image taken by the solid-state image sensing device to be reproduced by arranging each piece of pixel data constituting a sequence of pixel data.

In the above-described pixel arranging apparatus, the extracting unit may extract a predetermined number of pieces of first pixel data, the extracting unit extracts a predetermined number of pieces of second pixel data, and the extracting unit extracts a predetermined number of pieces of third pixel data.

With the above-stated construction, it is possible to remove portions of pixel data that correspond to part of the image not displayed on screen, such as the left, right, upper, and lower edges of the image. This makes it possible to remove invalid pixel data portions to restore a desired portion of the image or speed up the data processing.

In the above-described pixel arranging apparatus, the extracting unit may include: a storage sub-unit; a writing sub-unit operable to write the sequence of the plurality of pieces of pixel data into an area having consecutive addresses of the storage unit in an order in which the writing unit receives thereof; and an address control sub-unit operable to output addresses that each appear every predetermined number of addresses among the consecutive addresses for the area, wherein the arranging unit reads pieces of pixel data from positions in the area indicated by the addresses output by the address control sub-unit, and arranges the read pieces of pixel data sequentially.

In the above-described pixel arranging apparatus, the address control sub-unit may include: a control signal receiving lower-unit operable to receive, from outside the pixel arranging apparatus, a reference clock and a horizontal sync signal; a horizontal counter operable to count in synchronization with the reference clock to output horizontal counting values; a vertical counter operable to count in synchronization with the horizontal sync signal to output vertical counting values; and an address calculating lower-unit operable to calculate addresses that are each represented by ax+by+c, based on the horizontal and vertical counting values, wherein "x" represents a horizontal counting value, "y" represents a vertical counting value, "a" and "b" respectively represent a given number, and "c" represents a reading start address that corresponds to a position from which the extracting unit begins to extract the pieces of pixel data.

With the above-stated construction, it is possible to store the pixel data sequence, which is output from the solid-state image sensing device, into an area having consecutive addresses of the storage unit, and then read pieces of pixel data from positions in the area indicated by the addresses aligned at regular intervals. This makes it possible to extract pieces of pixel data from the pixel data sequence one piece out of every predetermined number of pieces, and arrange the extracted pieces to form a sequence of data. Especially, in the case where a solid-state image sensing device having two-dimensional arrangement of light-to-electric conversion elements does not output rows of pixel data continuously, it is possible to extract pieces of pixel data one piece out of every predetermined number of pieces, and arrange the extracted pieces to output a sequence of data. This enables the image taken by the solid-state image sensing device to be reproduced by arranging each piece of pixel data constituting a sequence of pixel data.

In the above-described pixel arranging apparatus, the extracting unit may include: a storage sub-unit including three line memories; and a control sub-unit operable to cyclically select a line memory out of the three line memories each time one piece of pixel data is transferred, and the arranging unit includes a writing sub-unit operable to extract one piece of pixel data from the sequence of the plurality of pieces of pixel data in an order in which the writing unit receives thereof, and write the extracted piece of pixel data into a line memory currently selected by the control sub-unit.

With the above-stated construction in which pieces of pixel data output from the solid-state image sensing device are, one by one, cyclically stored into a first line memory, a second line memory, a third line memory, the first line memory, . . . . It is accordingly possible to extract pieces of pixel data from the pixel data sequence one piece out of every predetermined number of pieces, and arrange the extracted pieces to form a sequence of data. Especially, in terms of two-dimensionally arranged pixel data of an image taken by the solid-state image sensing device, it is possible to, not outputting rows of pixel data continuously, extract pieces of pixel data one piece out of every predetermined number of pieces, and arrange the extracted pieces to output a sequence of data. This enables the image taken by the solid-state image sensing device to be reproduced by arranging each piece of pixel data constituting a sequence of pixel data.

In the above-described pixel arranging apparatus, the writing sub-unit may write, into the line memory currently selected by the control sub-unit, only pieces of pixel data located at positions excluding predetermined positions for exclusion in the sequence of the plurality of pieces of pixel data.

With the above-stated construction, it is possible to remove portions of pixel data that correspond to part of the image not displayed on screen, such as the left, right, upper, and lower edges of the image. This makes it possible to remove invalid pixel data portions to restore a desired portion of the image or speed up the data processing.

In the above-described pixel arranging apparatus, the arranging unit includes a reading sub-unit operable to, for each of the three line memories, discard a predetermined number of pieces of pixel data at a start of a line memory after reading thereof, and read out remaining pieces of pixel data that follow the discarded pieces of pixel data.

With the above-stated construction, after reading data from the line memories, it is possible to exclude, from use, portions of the read data that correspond to part of the image not displayed on screen, such as the left, right, upper, and lower edges of the image, and use only portions of the read data that correspond to part of the image displayed on screen. This makes it possible to remove invalid pixel data portions to restore a desired portion of the image or speed up the data processing.

In the above-described pixel arranging apparatus, the arranging unit may include a reading sub-unit operable to read pixel data only from predetermined positions indicated by predetermined consecutive addresses in each of the three line memories.

With the above-stated construction, it is possible not to read, from the line memories, portions of data that correspond to part of the image not displayed on screen, such as the left, right, upper, and lower edges of the image, but read only portions of the read data that correspond to part of the image displayed on screen. This makes it possible to remove invalid pixel data portions to restore a desired portion of the image or speed up the data processing.

In the above-described pixel arranging apparatus, the arranging unit may include: a 2-port memory operable to perform reading and writing of data in parallel; and a data processing sub-unit operable to write or read the extracted pieces of pixel data into/from the 2-port memory based on a two-dimensional arrangement of light-to-electric conversion elements provided in the solid-state image sensing device.

With the above-stated construction, it is possible, with use of the 2-port memory to rearrange pieces of pixel data, to perform reading of pixel data from the solid-state image sensing device, and outputting pixel data for image output, in parallel. This makes it possible to output image data at high speeds according to output requests.

The above object is also fulfilled by a solid-state image sensing apparatus comprising (a) a solid-state image sensing device that includes two-dimensionally arranged light-to-electric conversion elements and (b) a signal processing circuit, wherein the solid-state image sensing device includes: a vertical transfer unit operable to transfer, in a vertical direction, signal charges read out from the light-to-electric conversion elements, the vertical transfer unit being composed of a plurality of transfer columns that correspond to a plurality of columns into which the light-to-electric conversion elements are arranged; a horizontal transfer unit operable to receive the signal charges from the vertical transfer unit and transfer the received signal charges in a horizontal direction, wherein each of the vertical and horizontal transfer units includes transfer electrodes for receiving control signals from a control unit, each transfer column of the vertical transfer unit includes one or more transfer registers each of which corresponds to a predetermined number of rows of light-to-electric conversion elements, a bottom register of each one out of every 2n+1 transfer columns has a same transfer electrode structure with which transfer of signal charges from the bottom register to the horizontal transfer unit is controlled independent of other transfer registers in each transfer column and other bottom registers of other transfer columns, the signal processing circuit includes: a converting unit operable to convert the signal charges transferred from the horizontal transfer unit into a plurality of pieces of pixel data, and output the pieces of pixel data sequentially; and a pixel arranging apparatus which includes: an acquiring unit operable to acquire a sequence of the plurality of pieces of pixel data; an extracting unit operable to extract pieces of pixel data from the sequence of the plurality of pieces of pixel data, one piece out of every predetermined number of pieces; and an arranging unit operable to arrange the extracted pieces of pixel data sequentially in an order in which the pieces of pixel data are extracted.

With the above-stated construction, it is possible to extract pieces of pixel data from the pixel data sequence, which is received from the solid-state image sensing device, one piece out of every predetermined number of pieces, and arrange the extracted pieces to form a sequence of data. Especially, in terms of two-dimensionally arranged pixel data of an image taken by the solid-state image sensing device, it is possible to, not outputting rows of pixel data continuously, extract pieces of pixel data one piece out of every predetermined number of pieces, and arrange the extracted pieces to output a sequence of data. This enables the image taken by the solid-state image sensing device to be reproduced by arranging each piece of pixel data constituting a sequence of pixel data.

In the above-described solid-state image sensing apparatus, a bottom register of each one out of three transfer columns may have a same transfer electrode structure with which transfer of signal charges from the bottom register to the horizontal transfer unit is controlled independent of other transfer registers in each transfer column and other bottom registers of other transfer columns.

In the above-described solid-state image sensing apparatus, the extracting unit may extract, as first pixel data, pieces of pixel data from the plurality of pieces of pixel data, one piece out of three pieces starting from a predetermined position, may extract, as second pixel data, pieces of pixel data from the plurality of pieces of pixel data, one piece out of three pieces starting from a position that is posterior to the predetermined position by four pieces of pixel data, and may extract, as third pixel data, pieces of pixel data from the plurality of pieces of pixel data, one piece out of three pieces starting from a position that is posterior to the predetermined position by eight pieces of pixel data, and the arranging unit arranges the extracted pieces of first pixel data sequentially in an order in which the pieces of first pixel data are extracted, arranges the extracted pieces of second pixel data sequentially in an order in which the pieces of second pixel data are extracted, and arranges the extracted pieces of third pixel data sequentially in an order in which the pieces of third pixel data are extracted.

With the above-stated construction, it is possible to extract pieces of pixel data from the pixel data sequence, which is received from the solid-state image sensing device, one piece out of three pieces, and arrange the extracted pieces to form a sequence of data. Especially, in terms of two-dimensionally arranged pixel data of an image taken by the solid-state image sensing device, it is possible to, not outputting rows of pixel data continuously, extract pieces of pixel data one piece out of every three pieces, and arrange the extracted pieces to output a sequence of data. This enables the image taken by the solid-state image sensing device to be reproduced by arranging each piece of pixel data constituting a sequence of pixel data.

In the above-described solid-state image sensing apparatus, the extracting unit may extract a predetermined number of pieces of first pixel data, the extracting unit extracts a predetermined number of pieces of second pixel data, and the extracting unit extracts a predetermined number of pieces of third pixel data.

With the above-stated construction, it is possible to remove portions of pixel data that correspond to part of the image not displayed on screen, such as the left, right, upper, and lower edges of the image. This makes it possible to remove invalid pixel data portions to restore a desired portion of the image or speed up the data processing.

In the above-described solid-state image sensing apparatus, the extracting unit may include: a storage sub-unit; a writing sub-unit operable to write the sequence of the plurality of pieces of pixel data into an area having consecutive addresses of the storage unit in an order in which the writing unit receives thereof; and an address control sub-unit operable to output addresses that each appear every predetermined number of addresses among the consecutive addresses for the area, wherein the arranging unit reads pieces of pixel data from positions in the area indicated by the addresses output by the address control sub-unit, and arranges the read pieces of pixel data sequentially.

In the above-described solid-state image sensing apparatus, the address control sub-unit may include: a control signal receiving lower-unit operable to receive, from outside the pixel arranging apparatus, a reference clock and a horizontal sync signal; a horizontal counter operable to count in synchronization with the reference clock to output horizontal counting values; a vertical counter operable to count in synchronization with the horizontal sync signal to output vertical counting values; and an address calculating lower-unit operable to calculate addresses that are each represented by $ax+by+c$, based on the horizontal and vertical counting values, wherein "x" represents a horizontal counting value, "y" represents a vertical counting value, "a" and "b" respectively represent a given number, and "c" represents a reading start address that corresponds to a position from which the extracting unit begins to extract the pieces of pixel data.

With the above-stated construction, it is possible to store the pixel data sequence, which is output from the solid-state image sensing device, into an area having consecutive addresses of the storage unit, and then read pieces of pixel data from positions in the area indicated by the addresses aligned at regular intervals. This makes it possible to extract pieces of pixel data from the pixel data sequence one piece out of every predetermined number of pieces, and arrange the extracted pieces to form a sequence of data. Especially, in the case where a solid-state image sensing device having two-dimensional arrangement of light-to-electric conversion elements does not output rows of pixel data continuously, it is possible to extract pieces of pixel data one piece out of every predetermined number of pieces, and arrange the extracted pieces to output a sequence of data. This enables the image taken by the solid-state image sensing device to be reproduced by arranging each piece of pixel data constituting a sequence of pixel data.

In the above-described solid-state image sensing apparatus, the extracting unit may include: a storage sub-unit including three line memories; and a control sub-unit operable to cyclically select a line memory out of the three line memories each time one piece of pixel data is transferred, and the arranging unit includes a writing sub-unit operable to extract one piece of pixel data from the sequence of the plurality of pieces of pixel data in an order in which the writing unit receives thereof, and write the extracted piece of pixel data into a line memory currently selected by the control sub-unit.

With the above-stated construction in which pieces of pixel data output from the solid-state image sensing device are, one by one, cyclically stored into a first line memory, a second line memory, a third line memory, the first line memory, . . . . It is accordingly possible to extract pieces of pixel data from the pixel data sequence one piece out of every predetermined number of pieces, and arrange the extracted pieces to form a sequence of data. Especially, in terms of two-dimensionally arranged pixel data of an image taken by the solid-state image sensing device, it is possible to, not outputting rows of pixel data continuously, extract pieces of pixel data one piece out of every predetermined number of pieces, and arrange the extracted pieces to output a sequence of data. This enables the image taken by the solid-state image sensing device to be reproduced by arranging each piece of pixel data constituting a sequence of pixel data.

In the above-described solid-state image sensing apparatus, the writing sub-unit may write, into the line memory currently selected by the control sub-unit, only pieces of pixel data located at positions excluding predetermined positions for exclusion in the sequence of the plurality of pieces of pixel data.

With the above-stated construction, it is possible to remove portions of pixel data that correspond to part of the image not displayed on screen, such as the left, right, upper, and lower edges of the image. This makes it possible to remove invalid pixel data portions to restore a desired portion of the image or speed up the data processing.

In the above-described solid-state image sensing apparatus, the arranging unit may include a reading sub-unit operable to, for each of the three line memories, discard a predetermined number of pieces of pixel data at a start of a line memory after reading thereof, and read out remaining pieces of pixel data that follow the discarded pieces of pixel data.

With the above-stated construction, it is possible to remove portions of pixel data that correspond to part of the image not displayed on screen, such as the left, right, upper, and lower edges of the image. This makes it possible to remove invalid pixel data portions to restore a desired portion of the image or speed up the data processing.

In the above-described solid-state image sensing apparatus, the arranging unit may include a reading sub-unit operable to read pixel data only from predetermined positions indicated by predetermined consecutive addresses in each of the three line memories.

With the above-stated construction, it is possible not to read, from the line memories, portions of data that correspond to part of the image not displayed on screen, such as the left, right, upper, and lower edges of the image, but read only portions of the read data that correspond to part of the image displayed on screen. This makes it possible to remove invalid pixel data portions to restore a desired portion of the image or speed up the data processing.

In the above-described solid-state image sensing apparatus, the arranging unit may include: a 2-port memory operable to perform reading and writing of data in parallel; and a data processing sub-unit operable to write or read the extracted pieces of pixel data into/from the 2-port memory based on a two-dimensional arrangement of light-to-electric conversion elements provided in the solid-state image sensing device.

With the above-stated construction, it is possible, with use of the 2-port memory to rearrange pieces of pixel data, to perform reading of pixel data from the solid-state image sensing device, and outputting pixel data for image output, in parallel. This makes it possible to output image data at high speeds according to output requests.

The above object is also fulfilled by a camera including the solid-state image sensing apparatus defined above.

With the above-stated construction, a camera that operates at high speeds can be achieved since data is output at high speeds from the solid-state image sensing device.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings:

FIG. 2 shows the order in which data is input from the signal converting unit into the rearranging unit;

FIG. 3 shows a two-dimensional array of pixel data corresponding to the electric signals generated by the solid-state image sensing device;

FIG. 7 shows a data arrangement in a line memory when the dummy data is stored in the line memory, as well;

FIG. 26 shows a procedure of a pixel mixing operation by a solid-state image sensing device in an embodiment of the present invention;

FIG. 27 shows a procedure of a pixel mixing operation by a solid-state image sensing device in an embodiment of the present invention;

FIG. 28 shows a procedure of a pixel mixing operation by a solid-state image sensing device in an embodiment of the present invention;

FIG. 29 shows a procedure of a pixel mixing operation by a solid-state image sensing device in an embodiment of the present invention;

FIG. 30 shows a procedure of a pixel mixing operation by a solid-state image sensing device in an embodiment of the present invention;

FIG. 31 shows a procedure of a pixel mixing operation by a solid-state image sensing device in an embodiment of the present invention;

FIG. 44 shows data written into a SRAM memory;

DESCRIPTION OF THE PREFERRED EMBODIMENT

The following describes a preferred embodiment of the present invention, with reference to the attached drawings.

<1. Construction>

First, a solid-state image sensing device of the present invention will be described.

Figure 19:
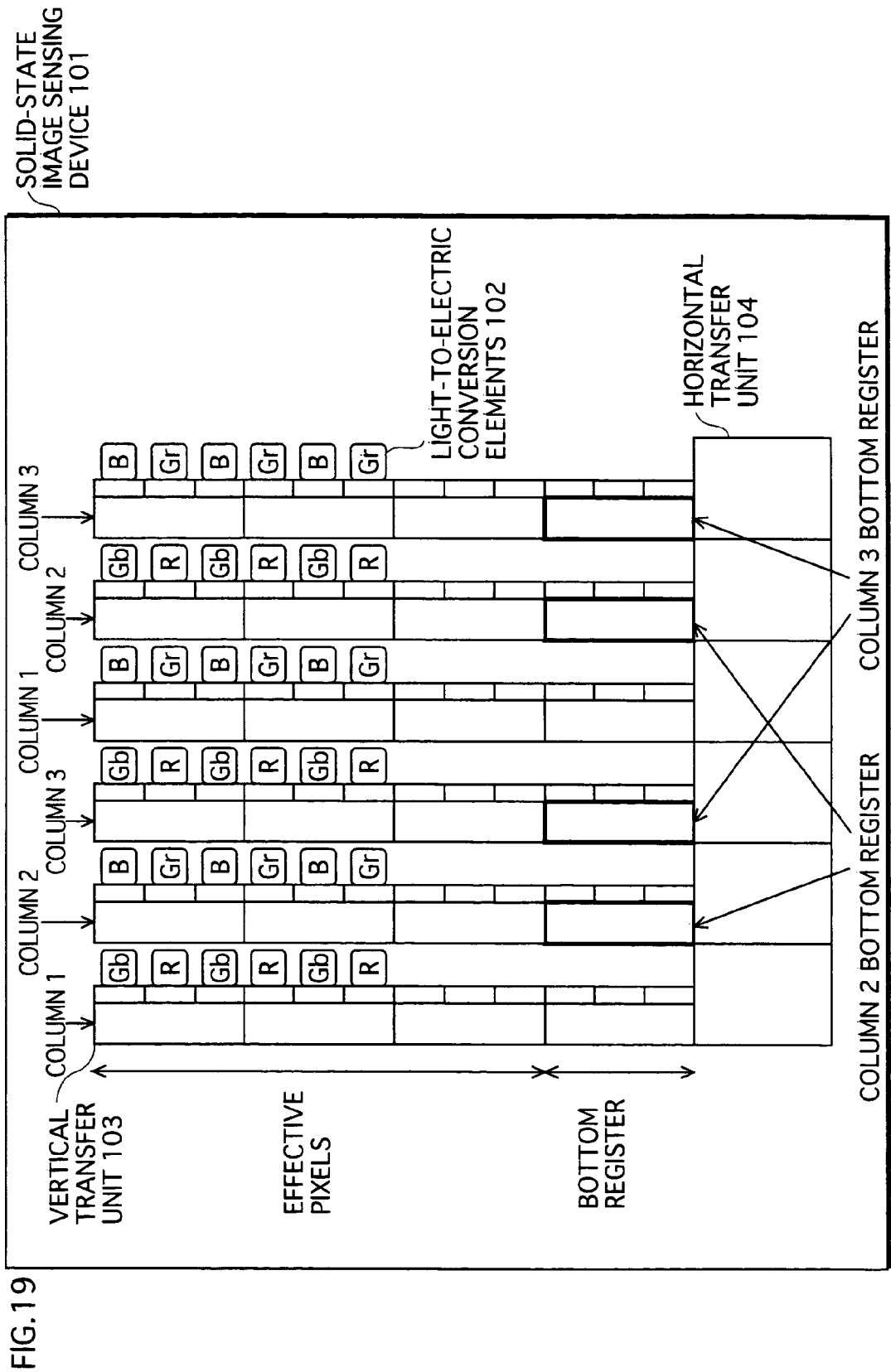
FIG. 19 shows a general construction of a solid-state image sensing device.

FIG. 19 shows a general construction of a solid-state image sensing device.

A solid-state image sensing device 101 adopts what is called "all-pixel simultaneously-and-independently reading" method, and includes light-to-electric conversion elements 102 arranged two-dimensionally in correspondence with the pixels, a vertical transfer unit 103, and a horizontal transfer unit 104. Also, the vertical transfer unit 103 is composed of a plurality of transfer columns that align horizontally, and a plurality of vertical transfer elements constitute each of the transfer columns.

The light-to-electric conversion elements 102 are photodiodes.

The light-to-electric conversion elements 102 are attached with color filters of red (R), green (G), and blue (B) that are arranged periodically in both the vertical and horizontal directions.

The vertical transfer unit 103 and the horizontal transfer unit 104 are both achieved by CCDs (Charge Coupled Devices).

For example, assume that a block of four pixels composed of two vertical pixels and two horizontal pixels is regarded as one unit. As shown in FIG. 19, the color filters are arranged so that in each unit, the lower-left pixel is R, the upper-left and lower-right pixels are G (represented as Gb and Gr, respectively), and the upper-right pixel is B, for example.

Though not illustrated, a control unit is provided outside the solid-state image sensing device 101, and is connected with the solid-state image sensing device 101 by a signal line.

The solid-state image sensing device 101 is activated as the control unit (not illustrated) sends control signals to the transfer electrodes included in the vertical transfer unit 103 and the horizontal transfer unit 104.

The control unit may be formed together with the solid-state image sensing device 101 as one unit.

The vertical transfer unit 103 is composed of a plurality of transfer columns. Each transfer column is composed of transfer registers of which corresponds to three rows of the lightto-electric conversion elements 102, each transfer register being composed of three transfer elements.

Now, an operation in which the solid-state image sensing device 101 mixes pixels in the horizontal direction will be described.

The solid-state image sensing device 101 allows the control unit to reduce the number of pixels in the horizontal direction to ⅓ by mixing the signal charges of every three pixels each of which appears every two pixels in the horizontal direction, by controlling the transfer operation of the vertical transfer unit 103 and the horizontal transfer unit 104.

Figure 20:
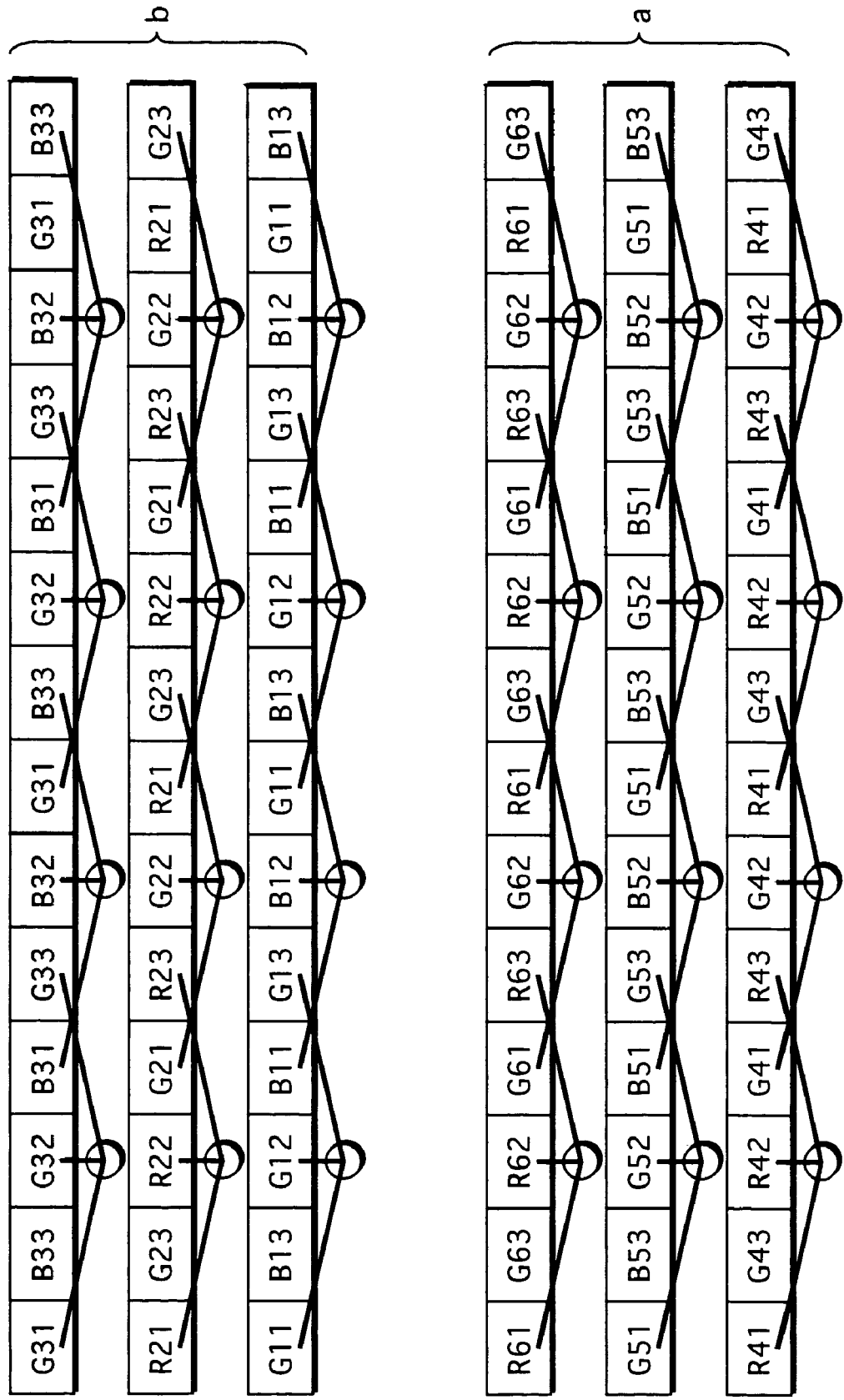
FIG. 20 shows a combination of pixels for which signal charges are mixed together.

FIG. 20 shows a combination of pixels for which signal charges are mixed together.

Each group of pixels for which signal charges are mixed together is hereinafter referred to as "mixed pixel group".

In FIG. 20, the sign contained in each small box denotes as follows: R of Rxy denotes red, which is the color of the color filter attached to a pixel, x denotes the vertical position of the pixel, and y denotes the horizontal position of the pixel in the mixed pixel group, where the vertical positions of the pixels are represented as "1", "2", . . . in sequence starting with the pixel that is nearest to the horizontal transfer unit 104, and the horizontal positions of the pixels in each mixed pixel group are represented as "1", "2", . . . in sequence starting with the pixel that is nearest to the output of the horizontal transfer unit 104.

Here, mixed pixel groups of two different colors are arranged alternately in the horizontal direction at regular intervals, and adjacent mixed pixel groups of two different colors in each pair are referred to as a first mixed pixel group and a second mixed pixel group, respectively.

For example, in FIG. 20, a group of green pixels G11, G12 and G13 that each appear every two pixels in the horizontal direction is regarded as a first mixed pixel group. Then, a group of blue pixels B11, B12 and B13 that each appear every two pixels in the horizontal direction, where the pixel B11 is between G11 and G12 of the first mixed pixel group, is regarded as a second mixed pixel group. First mixed pixel groups of one color and second mixed pixel groups of another color are arranged alternately in the horizontal direction.

As described above, from the pixels of two colors that are arranged alternately in each row, every three pixels of the same color are selected in order and mixed together. With such operation, the weighted centers of the mixed pixel groups are aligned at regular intervals for each color. This prevents moire or false signals from being generated.

Next, the procedures for driving the solid-state image sensing device 101 to mix pixels with the combinations shown in FIG. 20 will be explained by referring to FIGS. 21-31 that show changes in state.

The transfer columns constituting the vertical transfer unit 103 of the solid-state image sensing device 101 are arranged in a three column cycle in the horizontal direction.

In FIGS. 21-31, it is supposed that the horizontal transfer unit 104 outputs signal charges to the left side thereof. The vertical columns in each cycle are referred to as the first, the second, and the third starting with the column that is nearest to the output of the horizontal transfer unit 104 (in the drawings, represented as 1, 2, and 3, respectively).

Hereinafter, in each transfer column of the vertical transfer unit 103, the element nearest to the horizontal transfer unit 104 is referred to as a bottom element.

The vertical transfer unit 103 is constructed to enable the bottom elements of the second and third transfer columns to transfer signal charges independent of other transfer elements in the same transfer column and other bottom elements of other transfer columns.

That is to say, for example, it is possible to cause the bottom element of the second transfer column to transfer the signal charge to the horizontal transfer unit 104, while the bottom elements of the first and third transfer columns hold the signal charges.

Also, it is possible to cause the bottom element of the third transfer column to transfer the signal charge to the horizontal transfer unit 104, while the bottom elements of the first and second transfer columns hold the signal charges.

Figure 21:
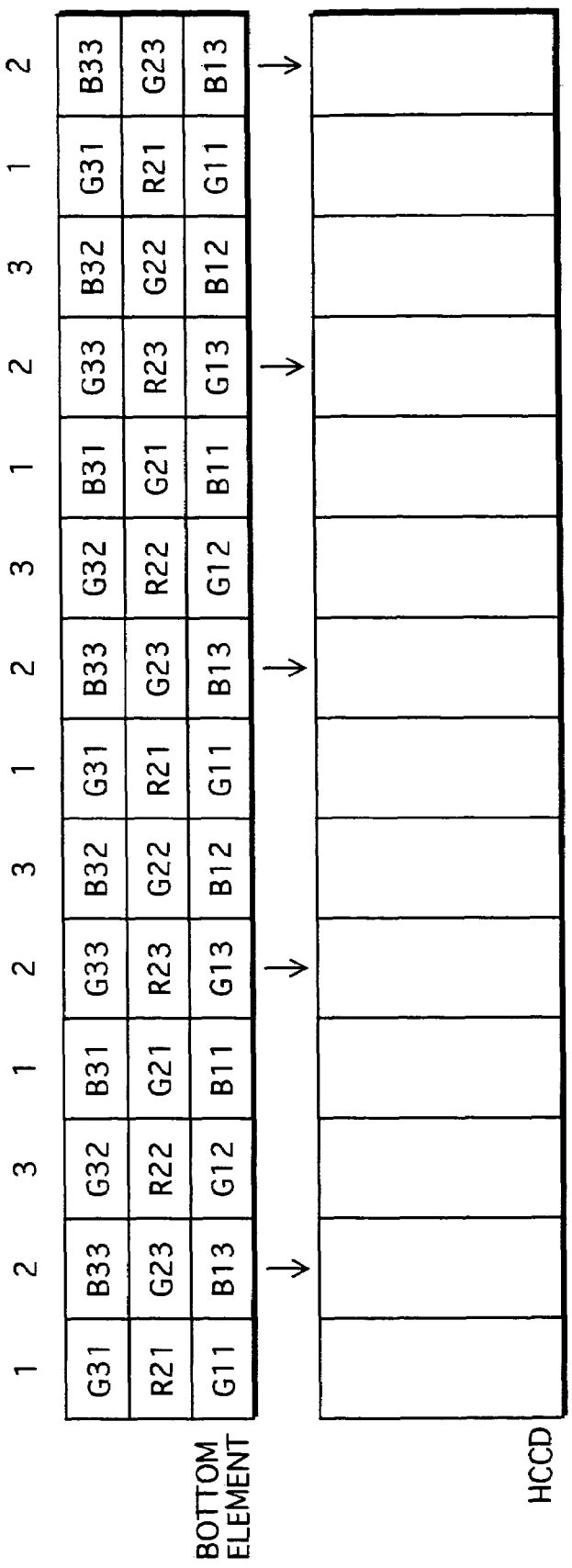
FIG. 21 shows a procedure of a pixel mixing operation by a solid-state image sensing device in an embodiment of the present invention.

In the procedure, first, as shown in FIG. 21, the bottom elements of the second transfer columns are driven so that they transfer the signal charges to the horizontal transfer unit 104, as indicated by the arrows in FIG. 21.

Figure 22:
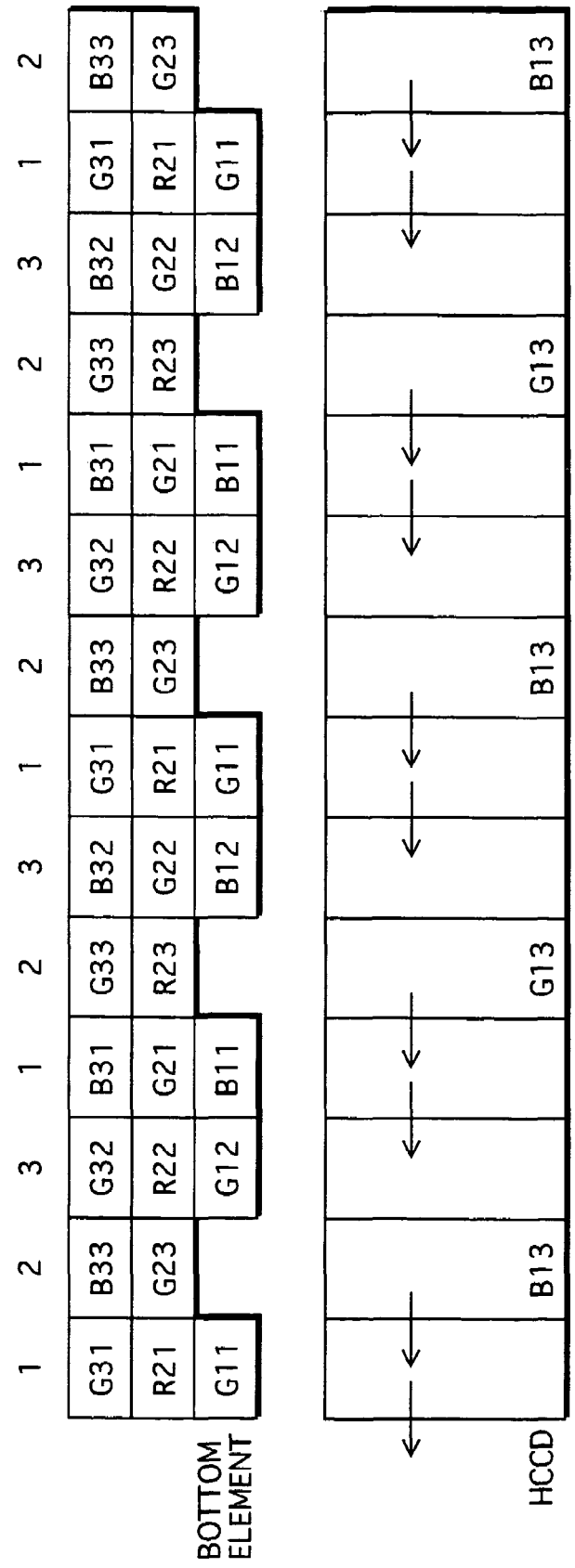
FIG. 22 shows a procedure of a pixel mixing operation by a solid-state image sensing device in an embodiment of the present invention.

Next, as shown in FIG. 22, inside the horizontal transfer unit 104, the signal charges are shifted by two pixels in forward direction.

Figure 23:
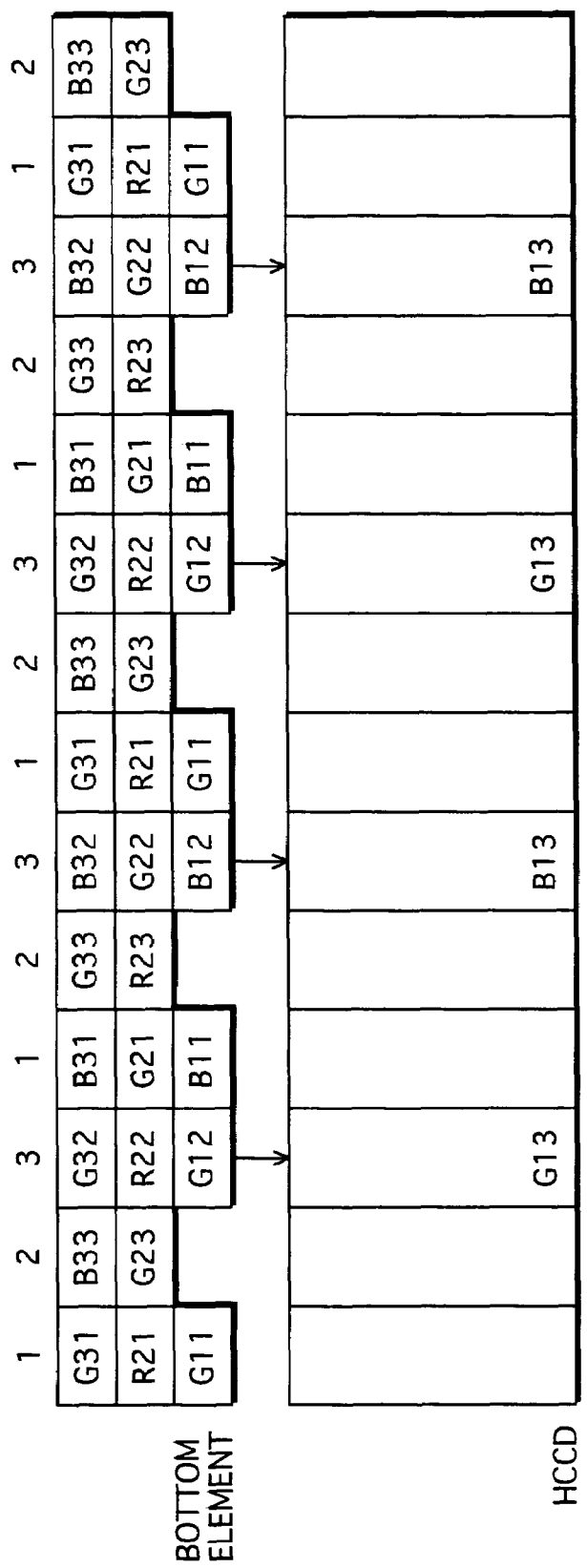
FIG. 23 shows a procedure of a pixel mixing operation by a solid-state image sensing device in an embodiment of the present invention.

Next, as shown in FIG. 23, the bottom elements of the third transfer columns are driven so that they transfer the signal charges to the horizontal transfer unit 104, as indicated by the arrows in FIG. 23.

This causes signal charges of G12 and G13 in each pair and signal charges of B12 and B13 in each pair to be mixed together inside the horizontal transfer unit 104.

Figure 24:
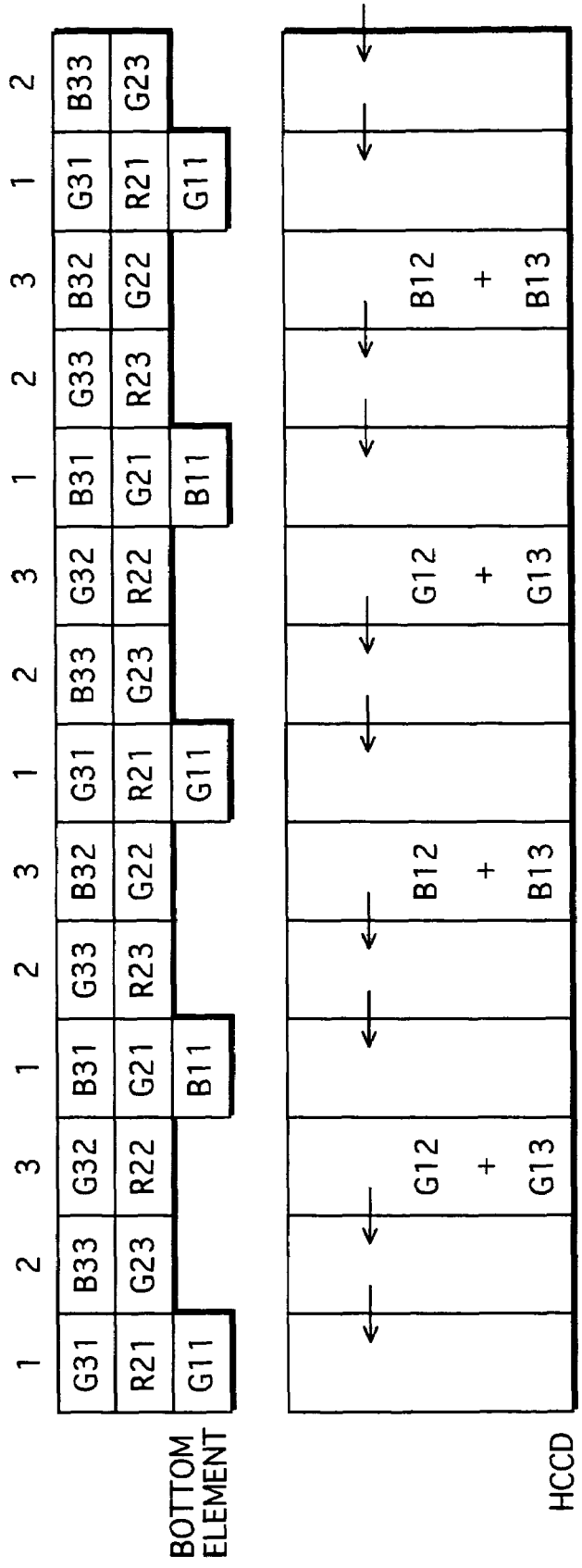
FIG. 24 shows a procedure of a pixel mixing operation by a solid-state image sensing device in an embodiment of the present invention.

Then, inside the horizontal transfer unit 104, the signal charges are shifted by two pixels in forward direction, as shown in FIG. 24.

Figure 25:
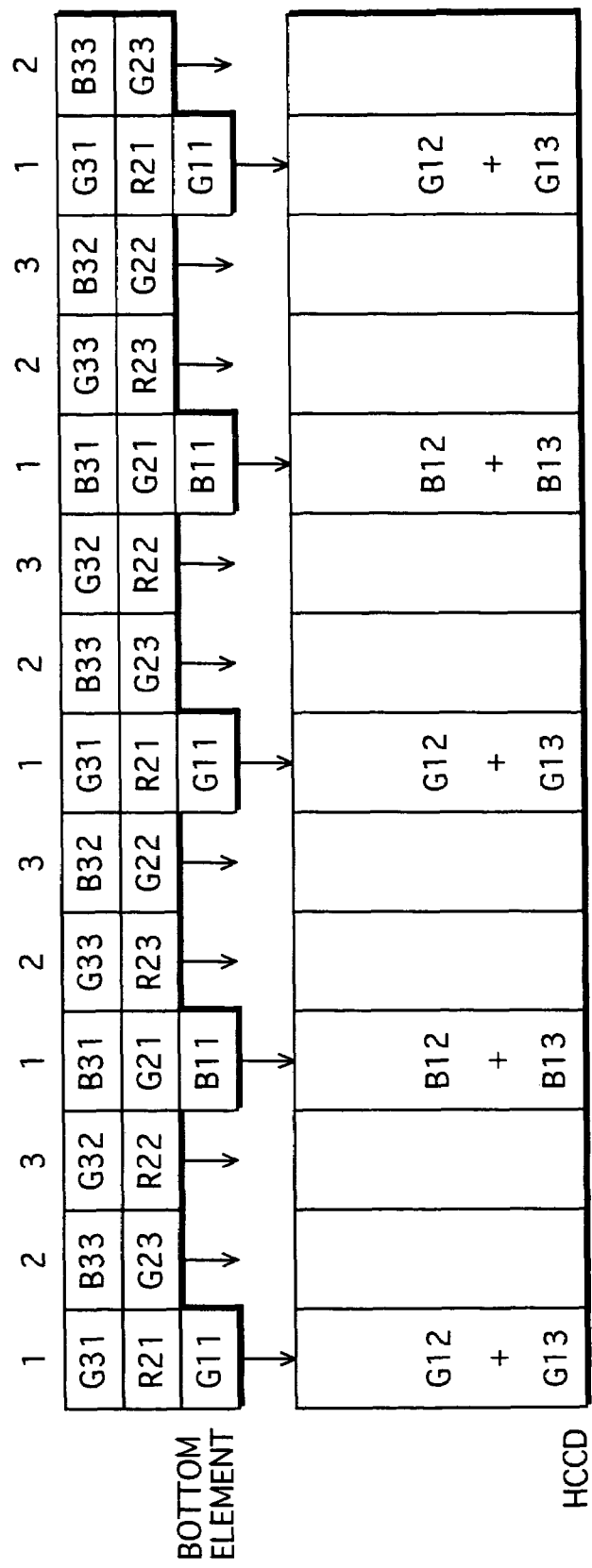
FIG. 25 shows a procedure of a pixel mixing operation by a solid-state image sensing device in an embodiment of the present invention.

Then, as shown in FIG. 25, all elements of the vertical transfer unit 103 are driven so that they transfer the signal charges downward by one element in each transfer column, where the bottom elements of the first transfer columns transfer the signal charges to the horizontal transfer unit 104, as indicated by the arrows in FIG. 25.

This causes signal charges of G11, G12, and G13 in each set and signal charges of B11, B12, and B13 in each set to be mixed together inside the horizontal transfer unit 104.

With such operation in which three pixels in each set, which were in the same row of bottom elements in the vertical transfer unit 103 appearing every two pixels in the horizontal direction, are mixed together, the number of pixels in the horizontal direction is reduced to ⅓.

Also, as understood from FIG. 26, the mixed pixels of green and blue are aligned at regular intervals. This prevents moire or false signals from being generated.

FIG. 27 shows the state inside the vertical transfer unit 103 and horizontal transfer unit 104 after the operation shown in FIGS. 21-25 is repeated, starting with the state shown in FIG. 26.

Figure 28:
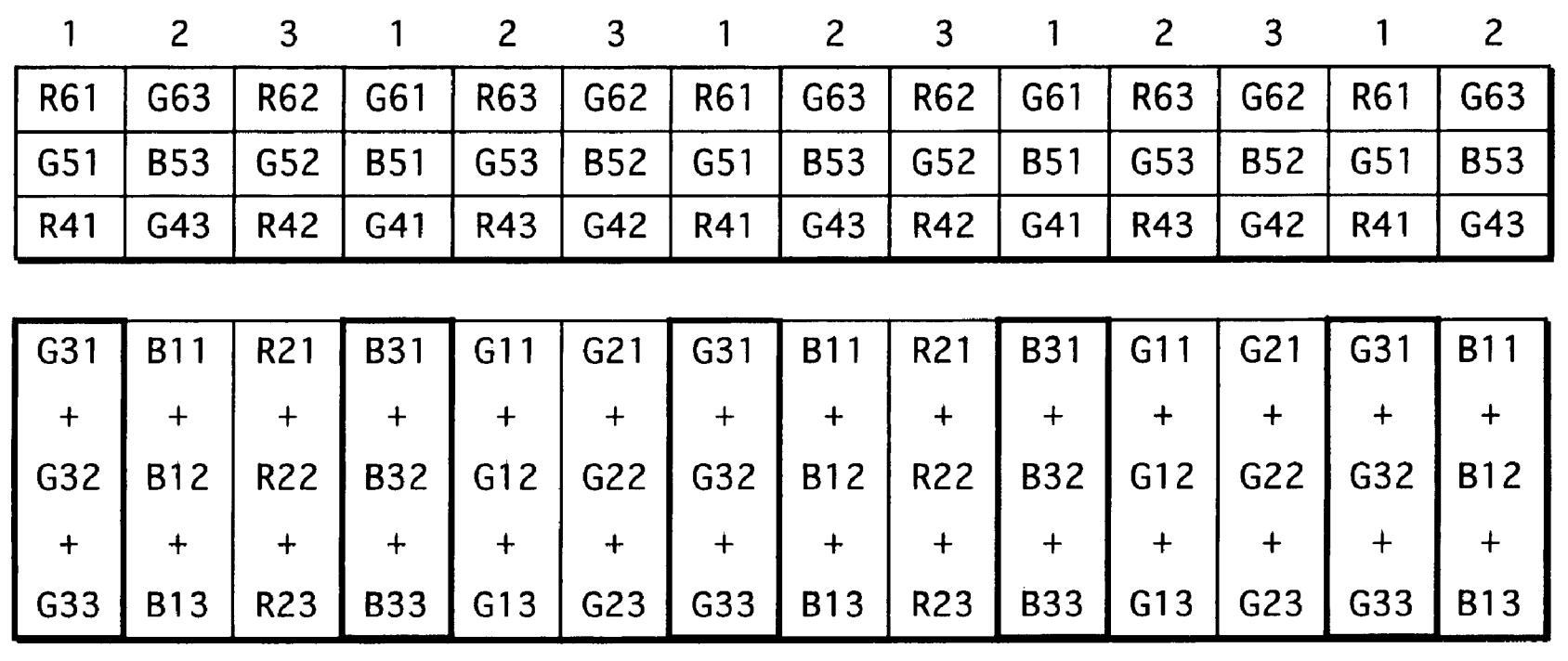

FIG. 28 shows the state inside the vertical transfer unit 103 and horizontal transfer unit 104 after the operation shown in FIGS. 21-25 is repeated, starting with the state shown in FIG. 27.

FIG. 28 indicates that the signal charges have been transferred to the horizontal transfer unit 104 from all the elements of the three rows in the vertical transfer unit 103 indicated as "a" in FIG. 20.

The horizontal transfer unit 104 then outputs the signal charges in sequence, as shown in FIG. 29. This means that the solid-state image sensing device 101 outputs signal charges for three rows of pixels, that are ⅓ of the original signal charges.

Figure 30:
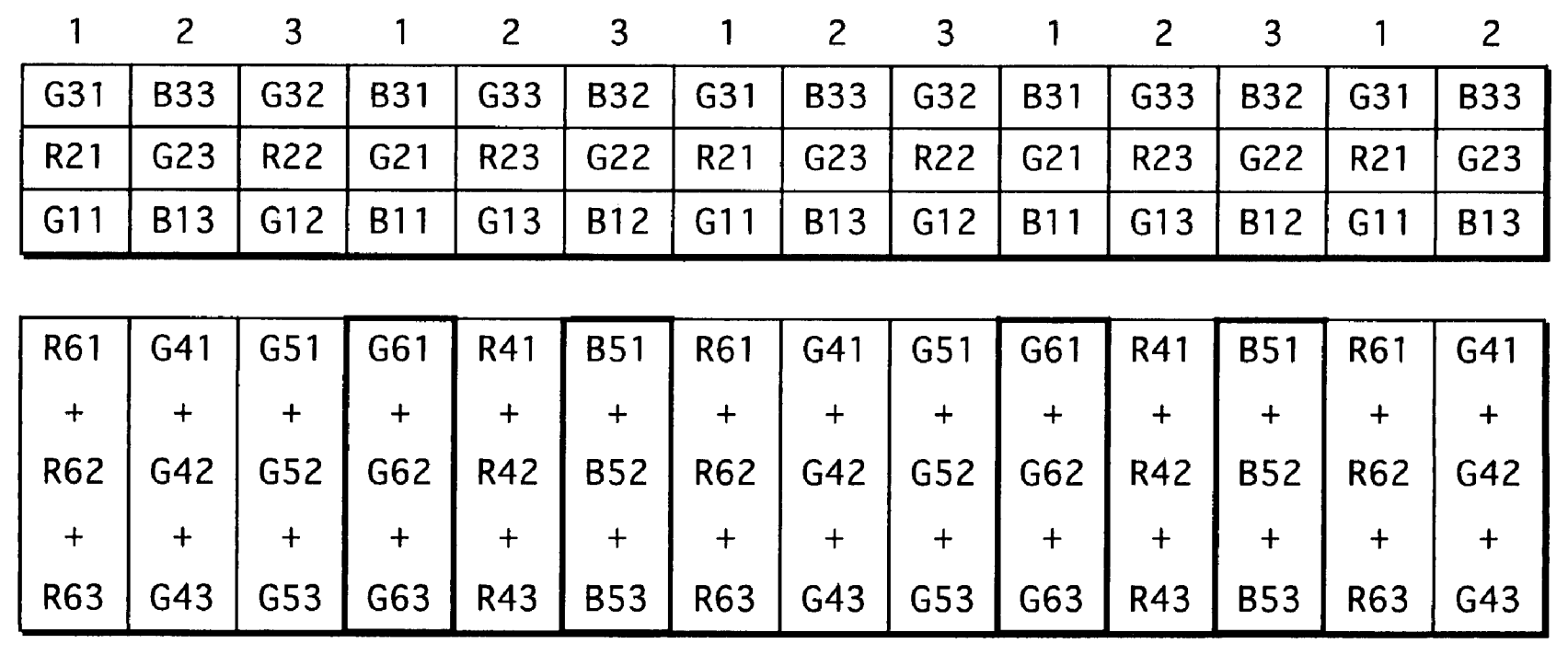

FIG. 30 shows the state inside the vertical transfer unit 103 and horizontal transfer unit 104 after the above-described operation is repeated, indicating that the signal charges have been transferred to the horizontal transfer unit 104 from all the elements of the three rows in the vertical transfer unit 103 indicated as "b" in FIG. 20. The horizontal transfer unit 104 then outputs the signal charges in sequence, as shown in FIG. 31.

As understood from the above description, the image signals output from the horizontal transfer unit 104 of the solid-state image sensing device 101 correspond to pixels arranged in a one-dimensional array. To return the signals from a one-dimensional array to a two-dimensional array, an image processing apparatus, which is outside the solid-state image sensing device 101, rearranges the signals output from the horizontal transfer unit 104 into a two-dimensional array.

How to rearrange the signals into a two-dimensional array will be described later.

Figure 32:
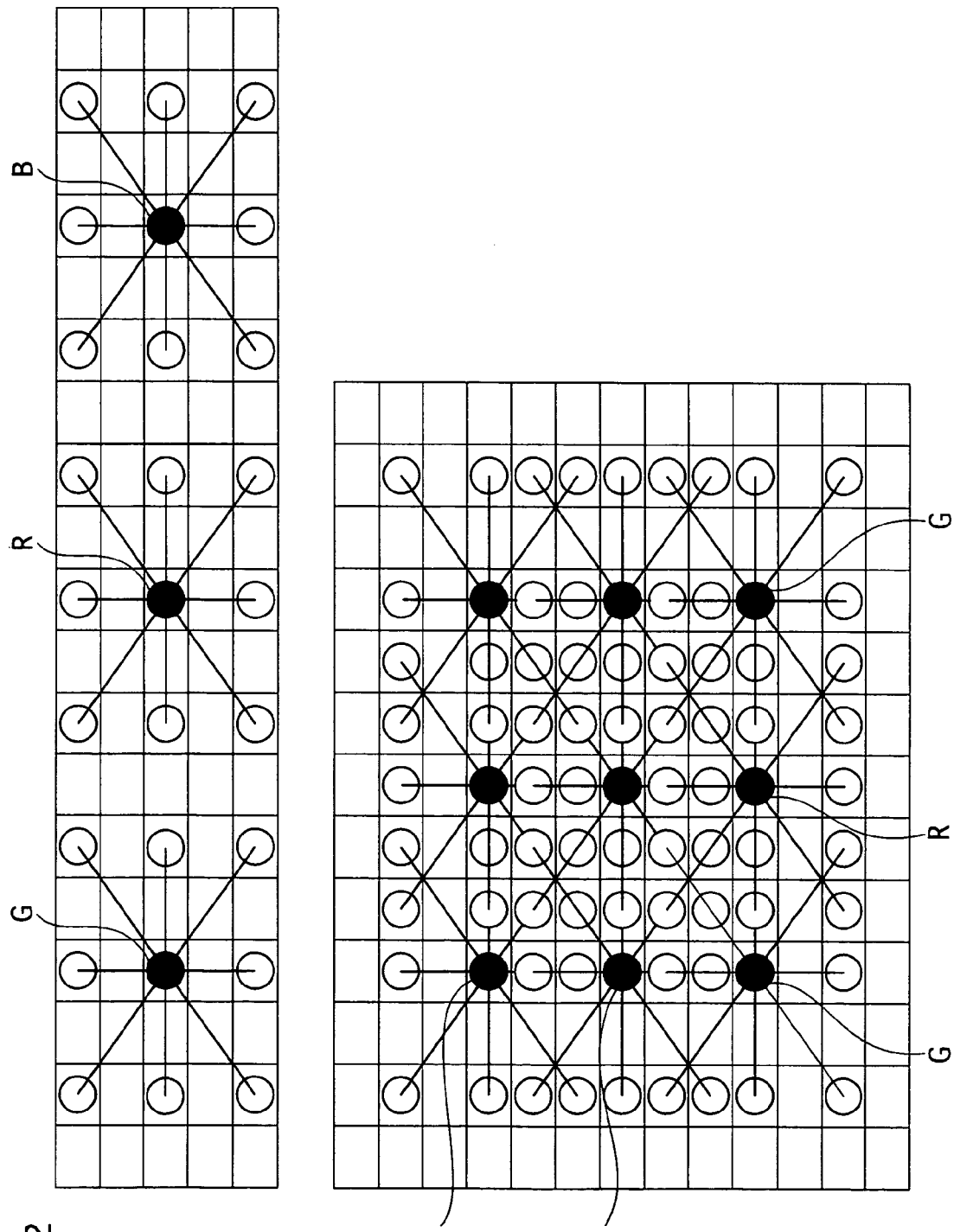
FIG. 32 shows a pixel mixing pattern by a solid-state image sensing device in an embodiment of the present invention.

It is preferable to treat, as one mixed pixel group, a block of nine pixels composed of three vertical pixels and three horizontal pixels that each appear every two pixels in each direction, as shown in FIG. 32. This is because it enables all the signal pixels from all the photodiodes to be mixed, without discarding them. This improves the sensitivity.

In this case, the weighted centers of the mixed pixel groups are aligned at regular intervals for each color of R, G, and B, as shown in FIG. 32.

This enables images with high resolution and less moire to be obtained.

For this mixed pixel group structure of FIG. 32, it is possible, with the following procedure, for example, to mix every three rows of signal charges which each appear every two rows in the vertical direction.

(1) First, signal charges of one out of every three rows are read out to the vertical transfer unit 103, and then transferred vertically toward the horizontal transfer unit 104 by two pixels.

(2) Next, signal charges of each row that is two rows down from the row of (1) above, are read into the vertical transfer unit 103, mixed with the signal charges read in (1) above, and then transferred vertically toward the horizontal transfer unit 104 by two pixels.

(3) Further, signal charges of each row that is two rows down from the row of (2) above, are read into the vertical transfer unit 103, mixed with the signal charges read in (1) and (2) above. This completes mixing of three pixels that appear every two pixels in the vertical direction.

This operation is available with an electrode structure composed of vertical transfer elements that each transfer signal charges of three pixels (6-phase electrode structure).

In the case of 4-phase electrode structure composed of vertical transfer elements that each transfer signal charges of two pixels, eight phases of electrodes are required in total. This is because in this case, three elements are regarded as one unit, and all the reading electrodes corresponding to the six pixels contained in each unit should be independently operated.

Figure 33:
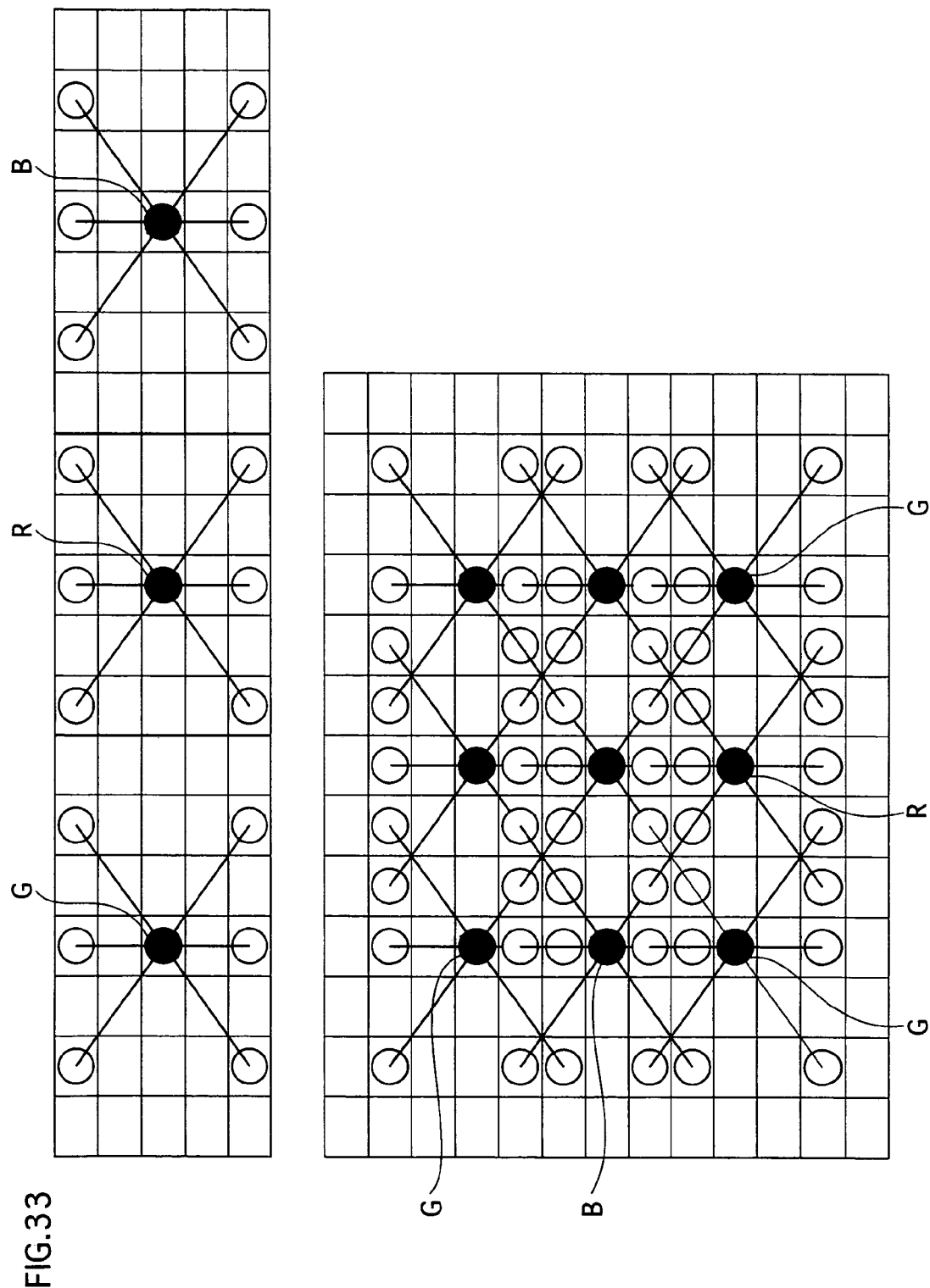
FIG. 33 shows a pixel mixing pattern by a solid-state image sensing device in an embodiment of the present invention.

As shown in FIG. 33, each mixed pixel group may be composed of six pixels that are a result of deleting three pixels of the middle row from the mixed pixel group of nine pixels shown in FIG. 32.

This also enables images with high resolution and less moire to be obtained since the mixed pixel groups for each color are arranged so that the centers thereof are arranged at regular intervals.

Figure 34:
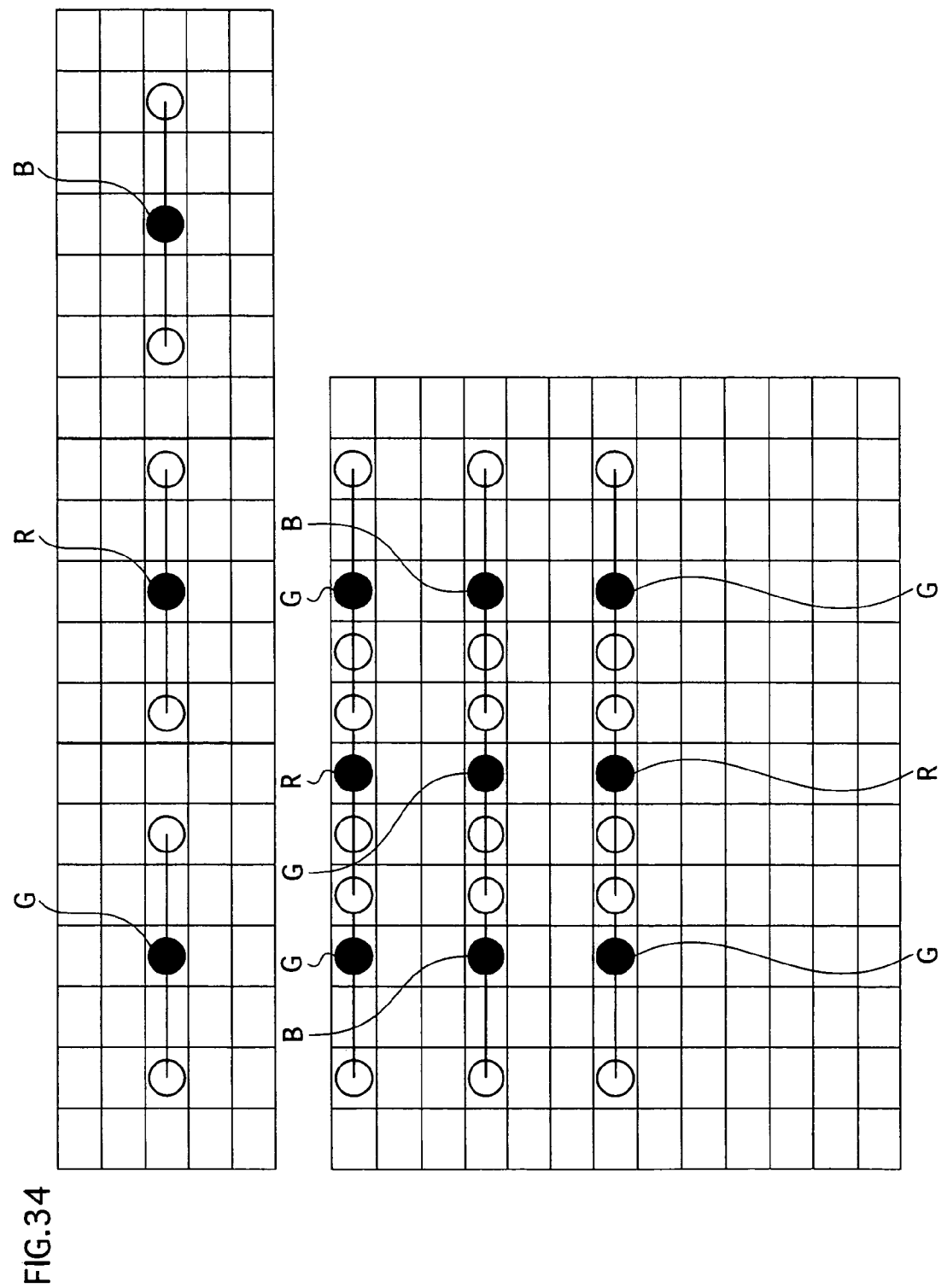
FIG. 34 shows a pixel mixing pattern by a solid-state image sensing device in an embodiment of the present invention.

Also, as shown in FIG. 34, each mixed pixel group may be composed of three pixels that align horizontally in a row, which are a result of deleting two rows from three rows that align vertically.

As stated earlier, it is possible to improve the signal output speed by reducing pixels in the vertical direction by deleting rows.

Pixel reduction in the vertical direction may be achieved by, for example, preventing signal charges from being read out to the vertical transfer unit 103 from predetermined rows of photodiodes corresponding to pixels.

In this case, the signal charges that remain in the predetermined rows of photodiodes are released to the substrate or the like.

Figure 35:
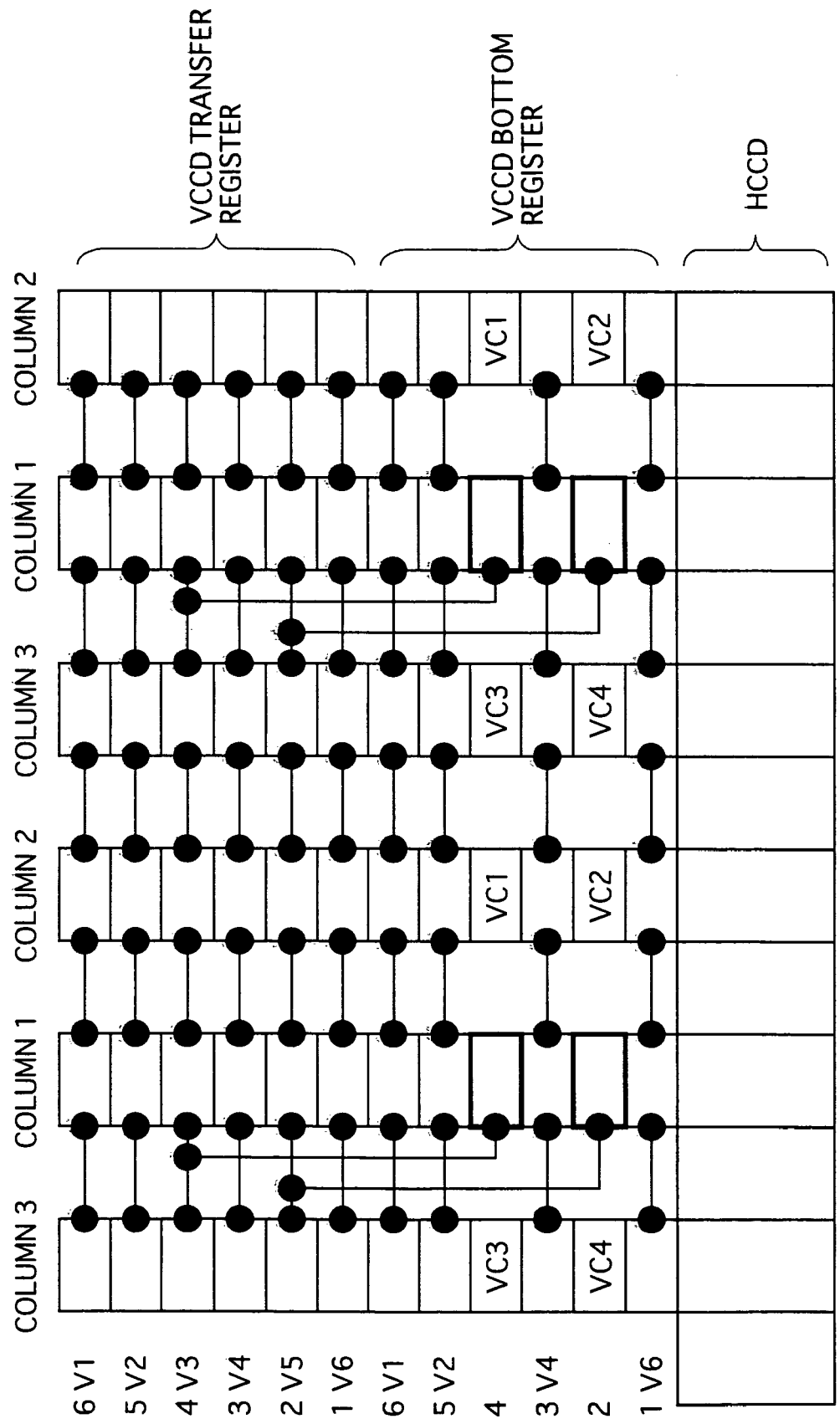
FIG. 35 shows a gate structure of the vertical transfer registers of a solid-state image sensing device in an embodiment of the present invention.

FIG. 35 shows an example of the electrode structure for achieving the above-described drive.

In the electrode structure shown in FIG. 35, each vertical transfer element of the vertical transfer unit 103 is composed of 6-phase transfer electrodes (common electrodes) V1-V6.

The bottom element has a different electrode structure from other vertical transfer elements.

That is to say, the bottom element of the second transfer column has independent electrodes (VC1 and VC2), which are different from the common electrodes, at the third and fifth phases so that the bottom element of the second transfer column can transfer signal charges independent of other transfer elements in the same transfer column and other bottom elements of other transfer columns (first and third transfer columns).

Also, the bottom element of the third transfer column has independent electrodes (VC3 and VC4), which are different from the common electrodes and the independent electrodes of the second transfer column, at the third and fifth phases so that the bottom element of the third transfer column can transfer signal charges independent of other transfer elements in the same transfer column and other bottom elements of other transfer columns (first and second transfer columns).

The bottom element of the first transfer column is composed of common electrodes V1-V6, as is the case with other transfer elements in the same transfer column.

With the above-described electrode structure, it is possible to cause the bottom elements of the second and third transfer columns in each set of three transfer columns to transfer signal charges. This enables the transfer operation shown in FIGS. 21-31 to be performed.

Figure 36:
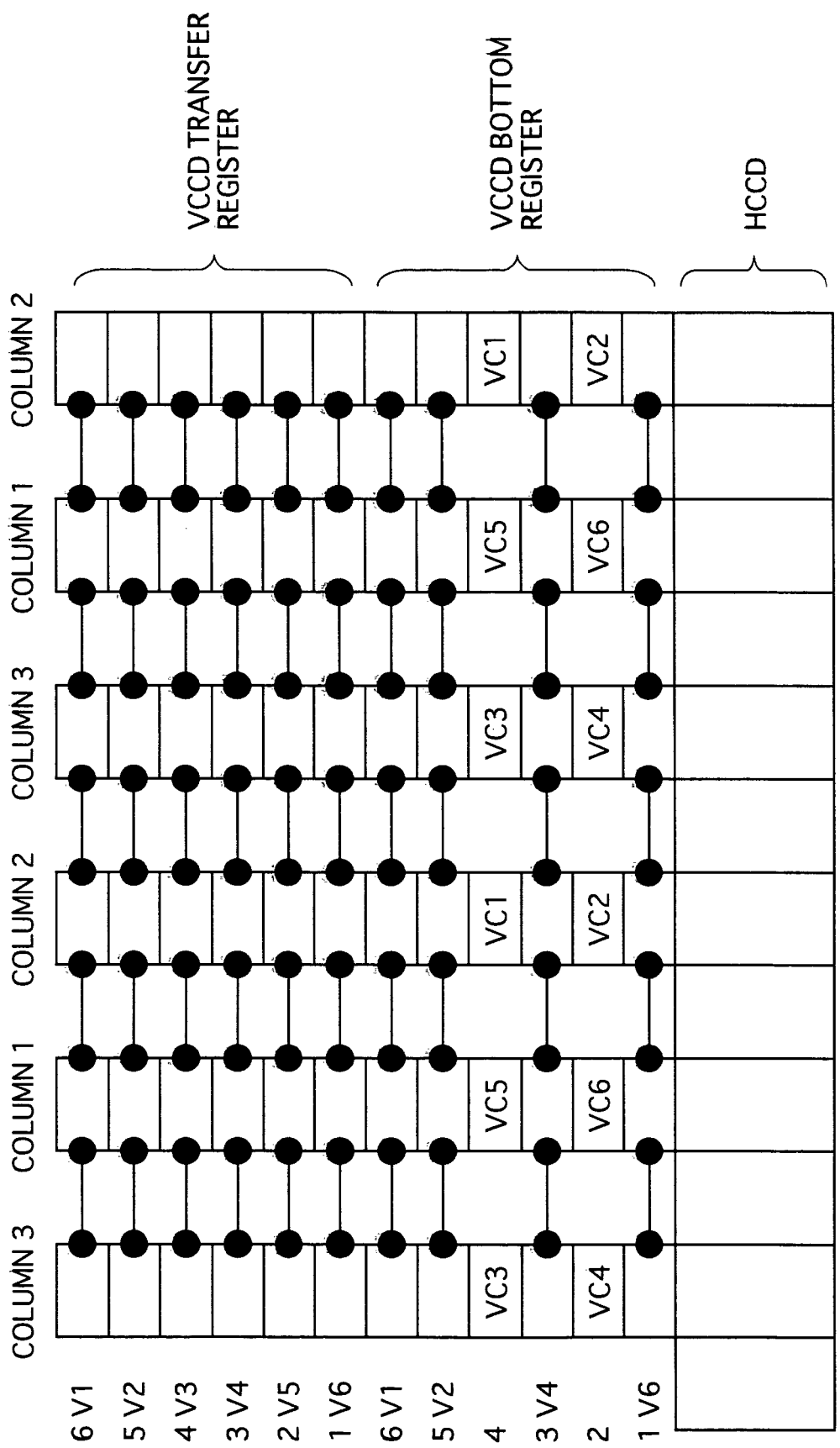
FIG. 36 shows a gate structure of the vertical transfer registers of a solid-state image sensing device in an embodiment of the present invention.

Alternatively, as shown in FIG. 36, the bottom element of the first transfer column may have independent electrodes (VC5 and VC6) at the third and fifth phases, as well.

Furthermore, when this electrode structure is adopted, in the state shown in FIG. 25, only the first transfer column may be allowed to transfer signal charges first, and then all the elements of the vertical transfer unit 103 may be allowed to transfer signal charges by one element, instead of allowing all the elements of the vertical transfer unit 103 to transfer signal charges all at once.

When the vertical transfer unit 103 is a 6-phase driving system, it is preferable that two or three electrodes out of the six electrodes in the bottom elements of the second and third transfer columns (or all of the first to third transfer columns) are independent electrodes.

Figure 37:
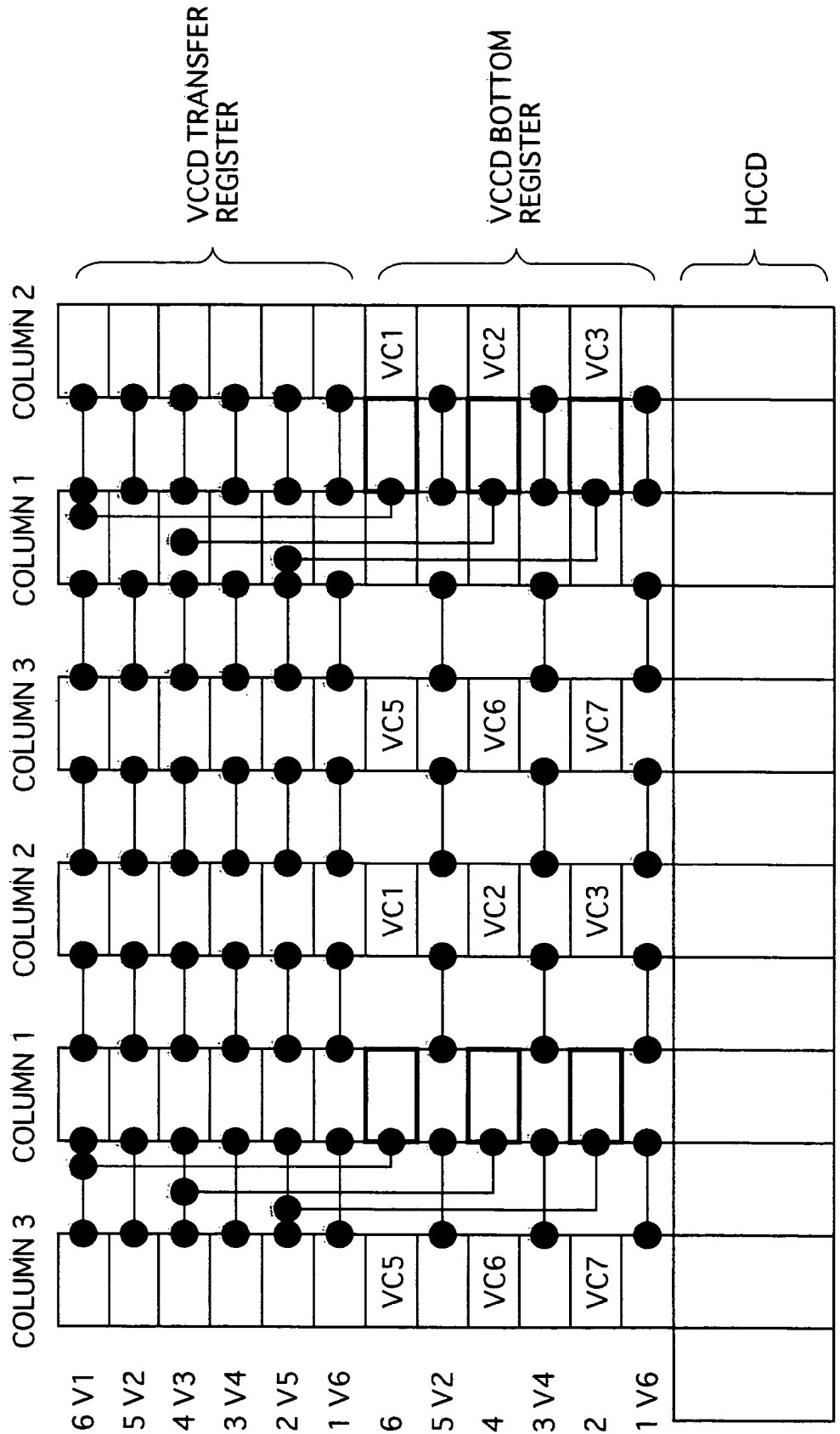
FIG. 37 shows a gate structure of the vertical transfer registers of a solid-state image sensing device in an embodiment of the present invention.
Figure 38:
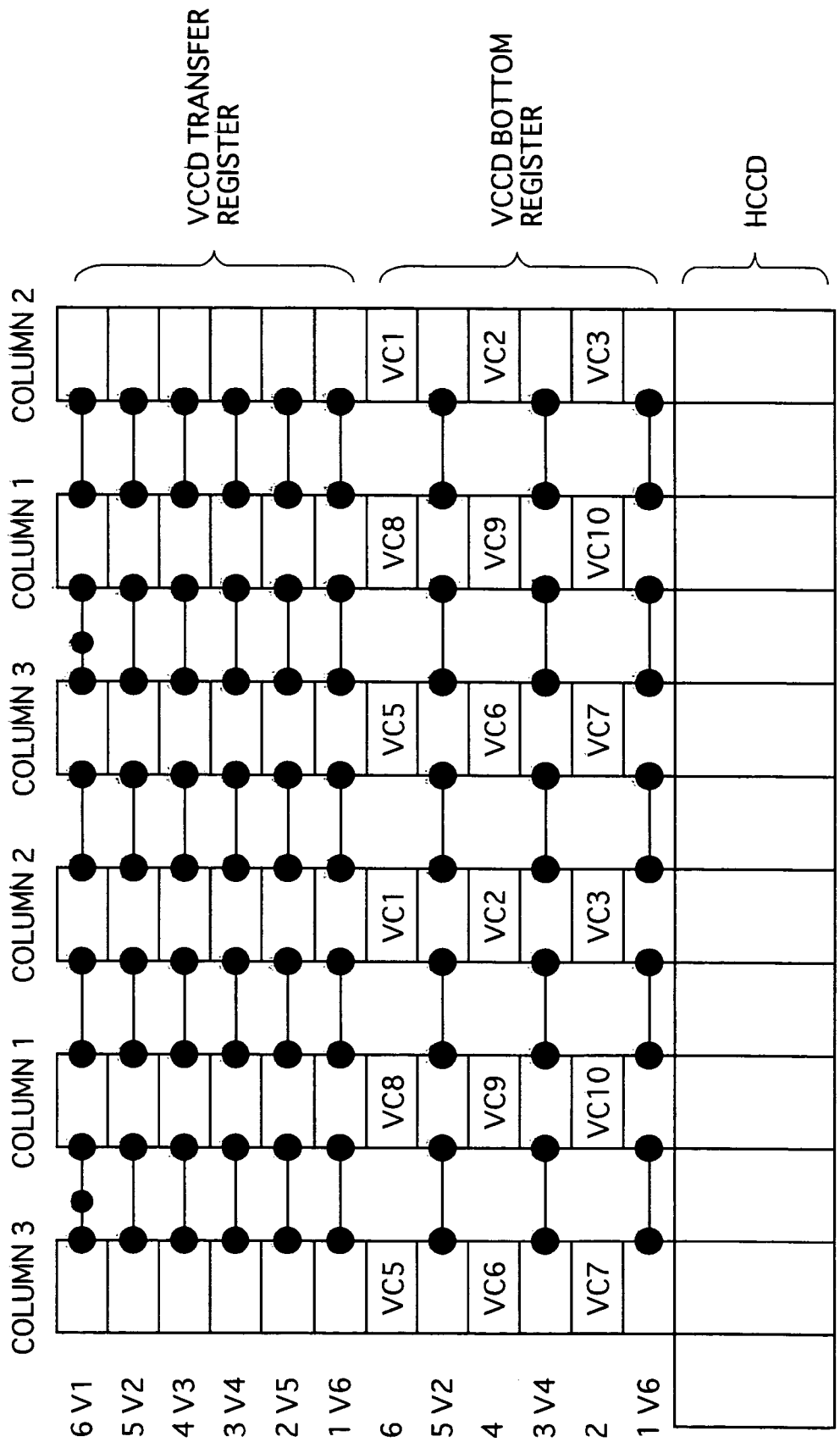
FIG. 38 shows a gate structure of the vertical transfer registers of a solid-state image sensing device in an embodiment of the present invention.

FIGS. 37 and 38 show examples where the bottom elements of certain transfer columns include three transfer electrodes that are independent electrodes.

It is preferable that at least one common electrode is present between these two or three independent electrodes when the manufacturing process is taken into account, but the independent electrodes may be adjacent to each other.

Accordingly, in the case of the 6-phase driving system, it is preferable that, as shown in FIGS. 35 and 36, the second and fourth transfer electrodes are independent electrodes when counted from the horizontal transfer unit 104 side, or, as shown in FIGS. 37 and 38, the second, fourth, and sixth transfer electrodes are independent electrodes.

It should be noted here that the electrode structure of the bottom elements is not limited to the above-described examples.

In the present embodiment, the 6-phase driving system is applied to the electrode structure. However, 3-phase or 4-phase driving system may be applied instead.

It should be noted here that in the case of 3-phase or 4-phase driving system, the bottom elements of certain transfer columns include two independent electrodes.

Figure 39:
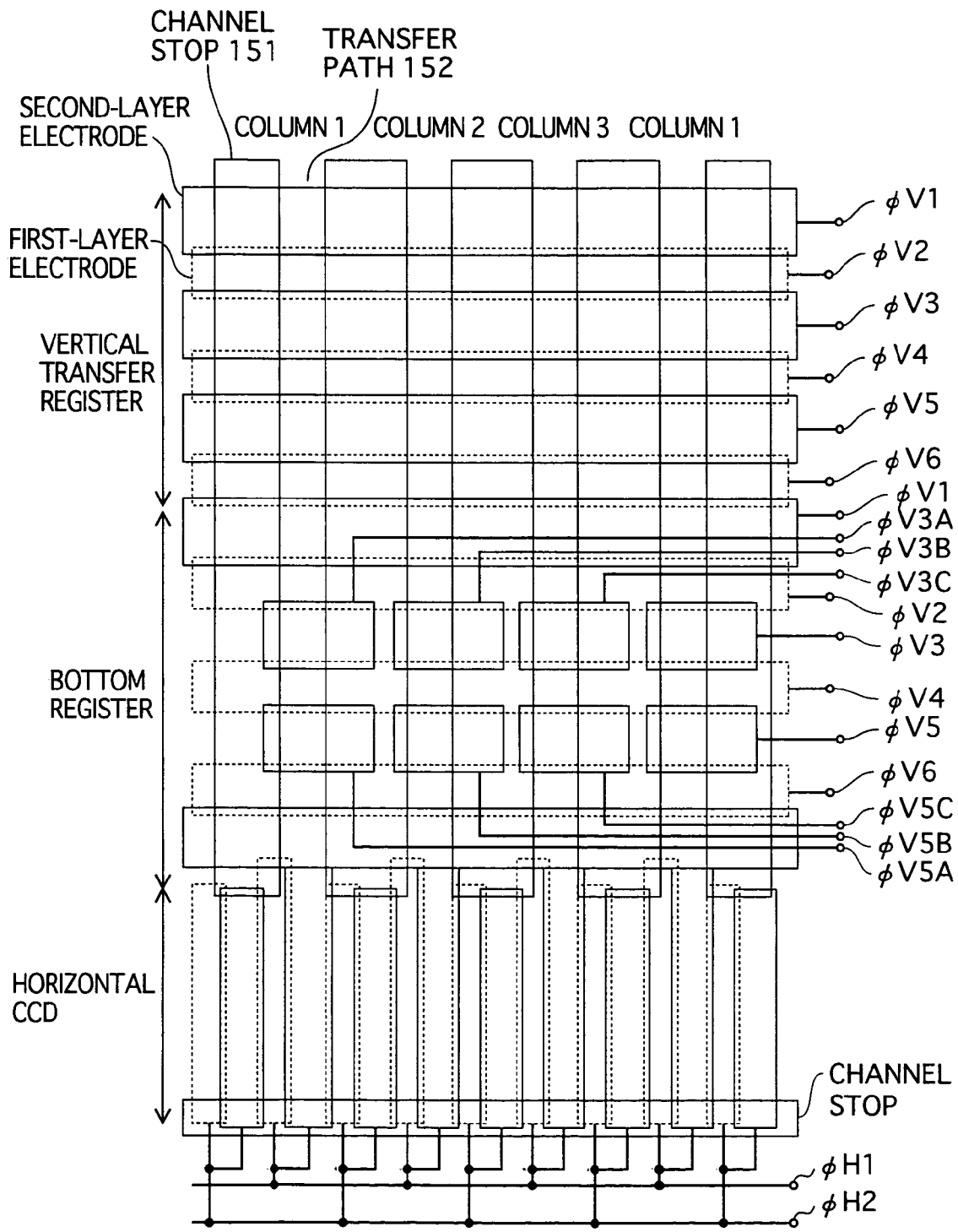
FIG. 39 shows an arrangement of gate electrodes for the vertical transfer registers of a solid-state image sensing device in an embodiment of the present invention.

FIG. 39 shows an arrangement of gate electrodes for the electrode structure shown in FIG. 35 or FIG. 36.

In FIG. 39, transfer paths 152 formed between channel stops 151 constitute the vertical transfer unit 103.

In the case of the example shown in FIG. 22, regarding the elements other than the bottom elements, three transfer electrodes V2, V4, and V6 are formed as common electrodes shared by all transfer columns of the vertical transfer unit 103, the sharing being achieved by an electrode film (first-layer electrode) which is in the same layer that includes the transfer electrodes V2, V4, and V6.

Similarly, three transfer electrodes V1, V3, and V5 are formed as common electrodes shared by all transfer columns of the vertical transfer unit 103, the sharing being achieved by an electrode film (second-layer electrode) which is in the same layer that includes the transfer electrodes V1, V3, and V5. In regards with the bottom elements, the independent electrodes (in the present example, the transfer electrodes at the third and fifth phases, namely the second and fourth electrodes when counted from the horizontal transfer unit 104 side) are formed from an electrode film that is the same as the second-layer electrode, into a pattern of separate rectangular pieces that correspond to the transfer columns respectively.

To prevent the bottom elements of the first transfer columns from being driven independently as shown in FIG. 35, $\phi$V3A and $\phi$V5A are connected to the terminals of $\phi$V3 and $\phi$V5 in FIG. 39.

Figure 40:
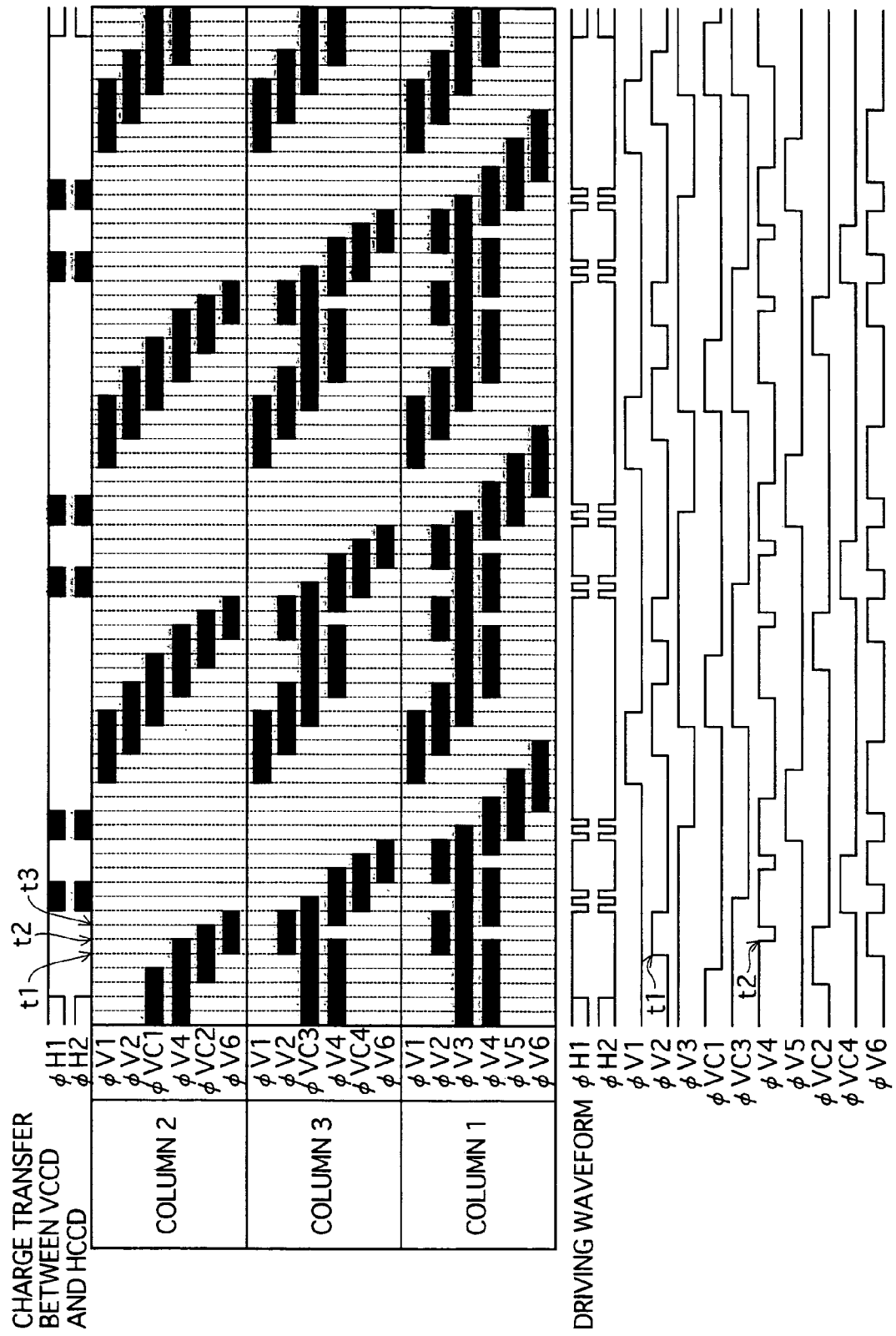
FIG. 40 shows a driving timing chart of a solid-state image sensing device in an embodiment of the present invention.

FIG. 40 shows a timing chart of control signals sent from the control unit (not illustrated) to transfer electrodes of the vertical transfer unit 103 and horizontal transfer unit 104, and shows how signal charges are transferred in correspondence with the timing chart, in the case of the electrode structure shown in FIG. 35.

Figure 41:
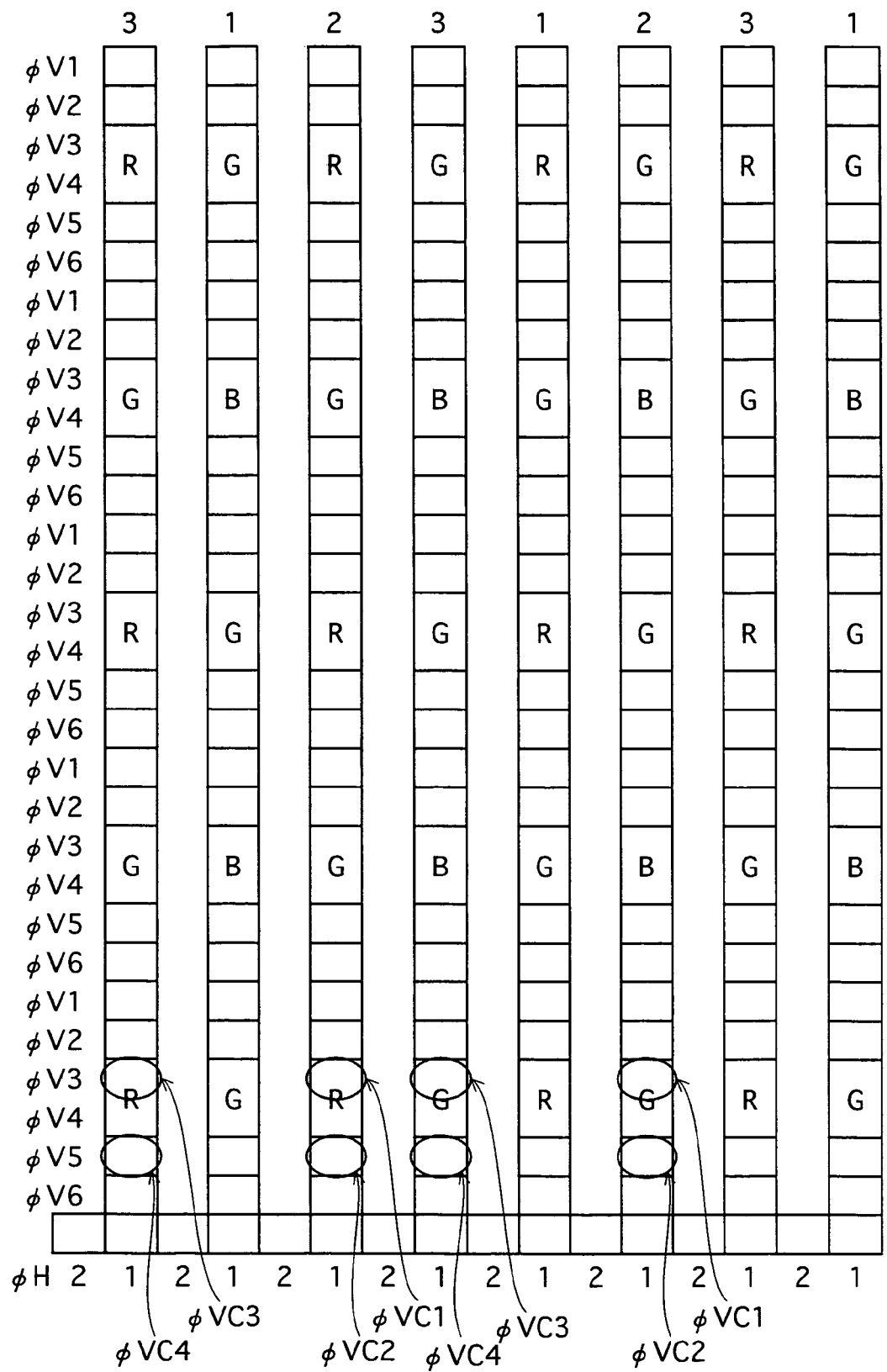
FIG. 41 shows a driving timing chart of a solid-state image sensing device in an embodiment of the present invention.

In the case of this electrode structure, signal charges read out from the light-to-electric conversion elements 102 are stored in transfer electrodes V3 and V4, as shown in FIG. 41.

In FIG. 40, when high-level driving pulses are sent to electrodes V1-V6 and VC1-VC4, these electrodes become storage units.

When low-level driving pulses are sent to electrodes V1-V6 and VC1-VC4, these electrodes become barrier units.

By driving the vertical transfer unit 103 and horizontal transfer unit 104 in accordance with the timing chart shown in FIG. 40, the pixel mixture explained in the present embodiment is achieved.

It is preferable that as shown in FIG. 40, $\phi$V2 is turned to a high level (t1) before $\phi$V4 is turned to a low level (t2).

In the present example, the $\phi$V2 is turned to a high level at time t1. With this operation, the storage electrodes for storing signal charges are: $\phi$V3 and $\phi$V4 before time t1; $\phi$V2, $\phi$V3 ($\phi$VC3), and $\phi$V4 during a period between times t1 and t2; and $\phi$V2 and $\phi$V3 ($\phi$VC3) during a period between times t2 and t3.

This provides an advantageous effect that while signal charges are moved to the horizontal transfer unit 104, the signal charges stored in the virtual transfer elements, which do not perform transferring, are not lost.

Now, a solid-state image sensing apparatus using the solid-state image sensing device 101 will be described.

Figure 1:
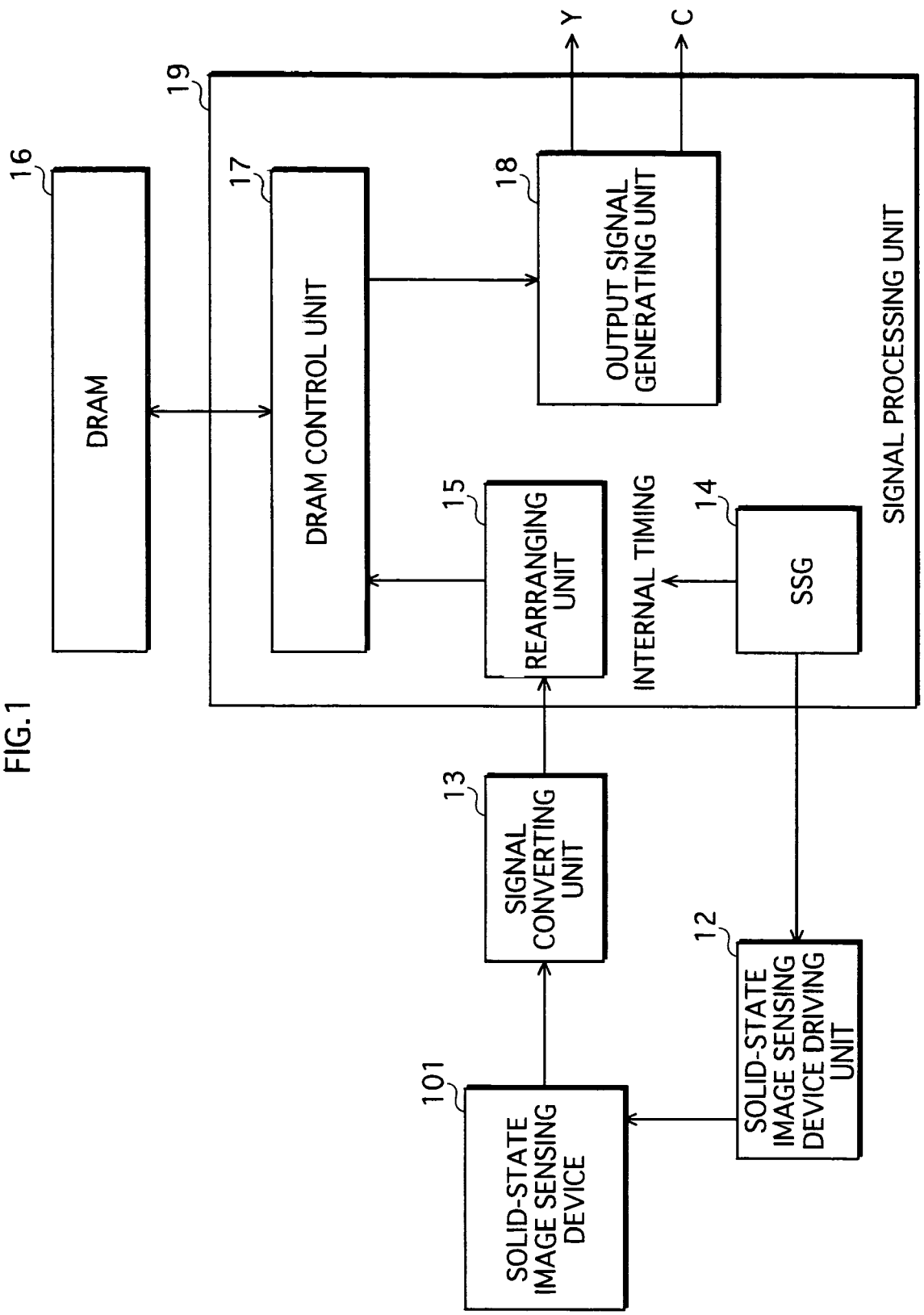
FIG. 1 is a block diagram showing the construction of the solid-state image sensing apparatus of the present invention.

FIG. 1 is a block diagram showing the construction of the solid-state image sensing apparatus of the present invention.

The solid-state image sensing device 101, which has been described up to now, converts received light into electric signals, and outputs the electric signals to a signal converting unit 13.

A solid-state image sensing device driving unit 12 controls the solid-state image sensing device 101 by outputting control signals thereto.

The signal converting unit 13 performs CDS (Correlated Double Sampling), AGC (Auto Gain Control), and A/D (Analog/Digital) conversion onto the electric signals received from the solid-state image sensing device 101.

In the CDS process, noise is removed from the electric signals output from the solid-state image sensing device 101.

In the AGC process, the output level of the signals is adjusted by giving gains to the signals after the CDS process.

In the A/D conversion process, the solid-state image sensing data after the level adjustment in the AGC process is converted into digital signals.

The signal converting unit 13 outputs, at once, three lines of digital signals after the A/D conversion to a rearranging unit 15.

A SSG (Sync Signal Generator) 14 generates a reference signal for determining the timing of driving the solid-state image sensing device 101 and a signal processing unit 19.

The SSG 14 also generates and outputs a reference signal for determining the timing of starting the field (screen) and a horizontal line to the rearranging unit 15. The rearranging unit 15 rearranges the digital signals output from the signal converting unit 13 in accordance with the reference signal received from the SSG 14.

The digital signals having been output from the horizontal transfer unit of the solid-state image sensing device 101 and having been processed by the signal converting unit 13 correspond to pixels arranged in a one-dimensional array, as stated earlier. In the rearrangement process performed by the rearranging unit 15, the digital signals output from the signal converting unit 13 are returned to the two-dimensional array.

Suppose, for example, that data corresponding to three rows of pixels indicated as "a" and three rows of pixels indicated as "b" in FIG. 20 are input into the rearranging unit 15 in the order indicated by FIG. 2.

FIG. 2 shows the order in which data is input from the signal converting unit 13 into the rearranging unit 15.

FIG. 3 shows a two-dimensional array of pixel data corresponding to the electric signals generated by the solid-state image sensing device 101.

In FIG. 2, the sign "dummy" indicates a pixel that is positioned around the periphery of the vertical transfer unit 103, and for which signal charges of three pixels have not been mixed together.

The signs a7-a12, a13-a18, b7-b12, and b13-b18 shown in FIG. 2 correspond to a1-a6 and b1-b6 shown in FIGS. 29 and 31, but the subscripts have been changed to clearly indicate positions in the two-dimensional array.

The rearranging unit 15 performs the rearrangement process in which it rearranges the input data shown in FIG. 2 into the original two-dimensional array shown in FIG. 3.

The rearrangement process will be describe in detail later.

A DRAM (Dynamic Random Access Memory) 16 holds digital data after the rearrangement by the rearranging unit 15.

A DRAM control unit 17 receives, from the rearranging unit 15, solid-state image sensing device data that is output as a result of rearranging the digital signals into signals for each line, and stores the received data in the DRAM 16.

The DRAM control unit 17 reads out the solid-state image sensing device data after the rearrangement from the DRAM 16, and outputs the read-out data to an output signal generating unit 18.

The output signal generating unit 18 receives the solid-state image sensing device data that has passed through a rearrangement block, and performs thereon a Y signal process for generating and outputting luminance signals, and a C signal process for generating and outputting color difference signals. The output signal generating unit 18 generates and outputs luminance signals in the Y signal process. The image after the conversion from the solid-state image sensing device data to the Y signals sometimes lacks sharpness. Therefore, an outline correction process is further performed on the data after the conversion to accentuate the outline of the image.

<2. Operation>

Figure 4:
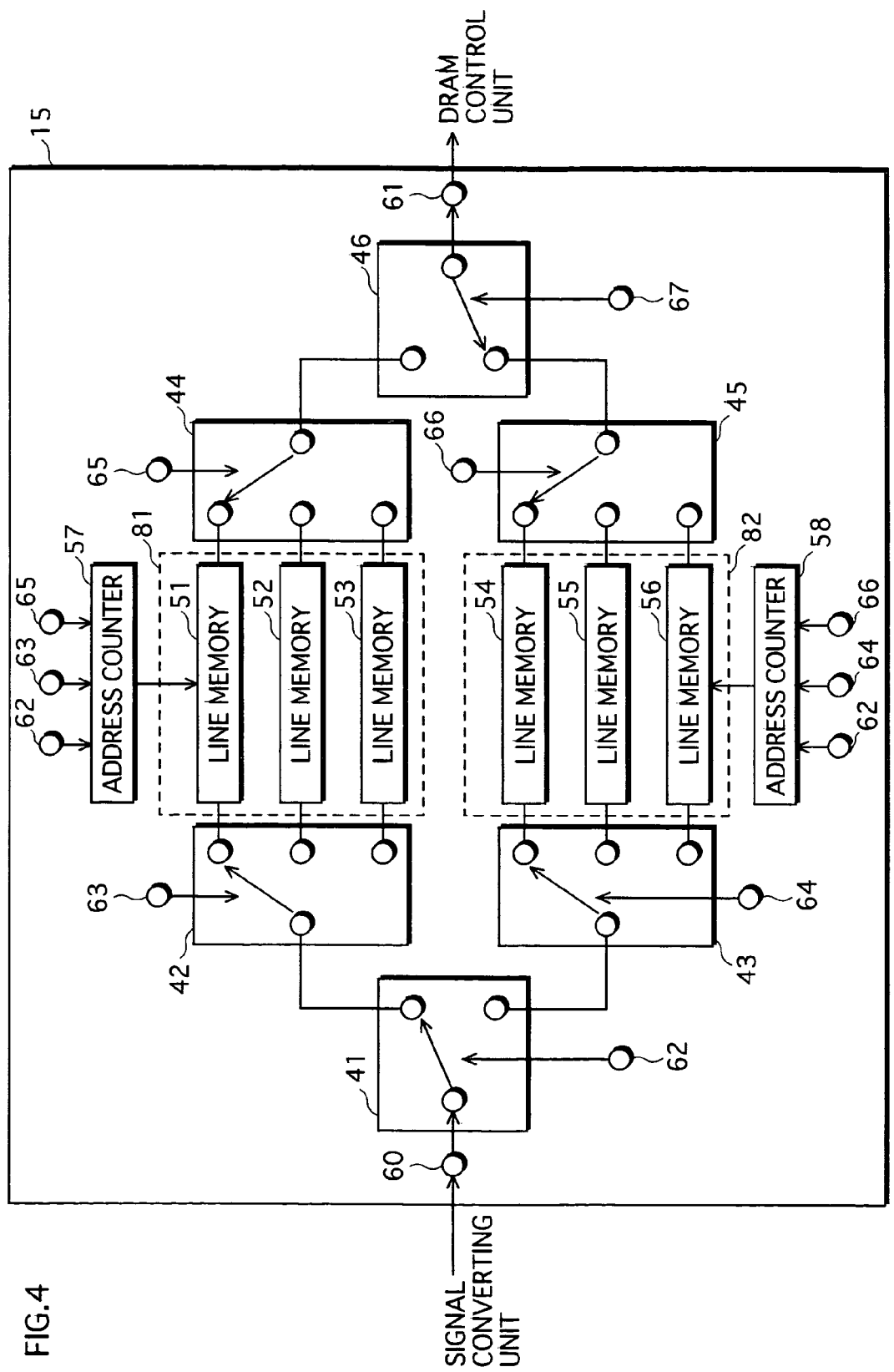
FIG. 4 is a block diagram showing the construction of the rearranging unit.

FIG. 4 is a block diagram showing the construction of the rearranging unit 15.

An input unit 60 receives data a1 to b30 shown in FIG. 2 from the signal converting unit 13.

Each of line memories 51 to 56 holds eight pieces of data that are input from the signal converting unit 13 to the rearranging unit 15, and has a horizontal address (HA) in each data holding area.

It should be noted here that though in the present embodiment, it is described that each line memory holds eight pieces of data for the sake of convenience, the number of pieces of data held by the line memory is not limited to eight, but may be increased or decreased depending on the number of pieces of pixels provided by the solid-state image sensing device.

The data (in the present embodiment, eight pieces of data) held by each line memory corresponds to one horizontal line of the screen.

A memory group composed of line memories 51 to 53 is referred to as a memory set 81; and a memory group composed of line memories 54 to 56 is referred to as a memory set 82.

A switch 41 receives data from the input unit 60 and outputs the data to either the memory set 81 or the memory set 82, depending on a signal received from an input unit 62.

The input unit 62 receives a signal that is a pulse that rises each time data of three horizontal lines (3H) is input.

The input unit 63 receives a signal that is a pulse that rises each time data of one pixel is input. A switch 42 selects one among the line memories 51-53 depending on a signal input from the input unit 63.

The input unit 64 receives a signal that is a pulse that rises each time data of one pixel is input. A switch 43 selects one among the line memories 54-56 depending on a signal input from the input unit 64.

An address counter 57 generates a write address or a read address for a line memory based on signals input into the input units 62, 63, and 65, and sends the generated address to the line memory selected by the switch 42.

Similarly, an address counter 58 generates a write address or a read address for a line memory based on signals input into the input units 62, 64, and 66, and sends the generated address to the line memory selected by the switch 43.

The input units 65 and 66 receive a signal that is a pulse that rises each time data of one horizontal line (1H) is input. A switch 44 selects one among the line memories 51-53 depending on a signal input from the input unit 65. A switch 45 selects one among the line memories 54-56 depending on a signal input from the input unit 66.

A switch 46 selects either the memory set 81 or the memory set 82 depending on a signal received from an input unit 67.

The memory sets to be selected by the switch 41 and the switch 46 are predetermined to be in a reversed relationship as follows: when the switch 41 selects the memory set 81, the switch 46 selects the memory set 82; and when the switch 41 selects the memory set 82, the switch 46 selects the memory set 81.

The rearranging unit 15 reads data from the memory set 82 while writing data into the memory set 81. Conversely, the rearranging unit 15 reads data from the memory set 81 while writing data into the memory set 82.

Now, reading and writing data from/into the memory set 81 will be explained, omitting description of reading and writing data from/into the memory set 82, for convenience's sake.

Figure 5:
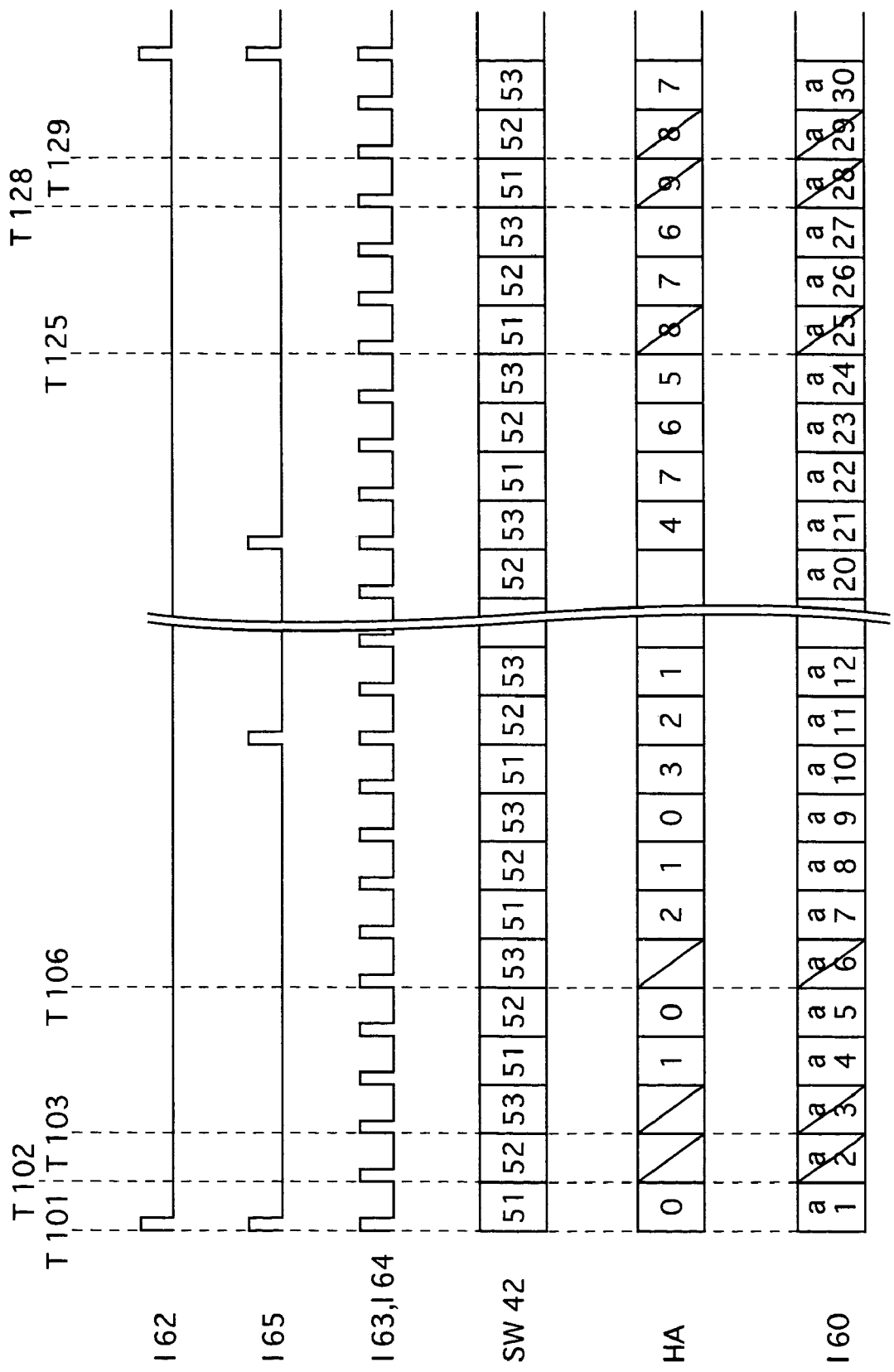
FIG. 5 shows an operation in which the rearranging unit rearranges data a1 to a30, which are input from the signal converting unit, using the memory set.

FIG. 5 shows an operation in which the rearranging unit 15 rearranges data a1-a30, which are input from the signal converting unit 13, using the memory set 81.

The rows identified by signs I60, I62, I63, I64, and I65 in FIG. 5 indicate signals that are input to the input units 60, 62, 63, 64, and 65, respectively.

The row identified by sign "SW42" in FIG. 5 indicates a series of line memories selected out of the line memories 51 to 53 by the switch 42.

The row identified by sign "HA" in FIG. 5 indicates the write address for the line memories 51 to 53.

The rearranging unit 15 determines a line memory and a write address for the determined line memory, in accordance with the contents of "SW42" and "HA".

For example, at time T101, in the case of the example shown in FIG. 5, the rearranging unit 15 writes data a1 into an area indicated by address "0" in the line memory 51 because at this time, the SW42 is 51, the HA is 0, and the I60 is a1.

When the SW42 is 52 or 53, which represents line memory 52 or 53, the value of HA is generated based on an immediately preceding value of SW42.

When the SW42 is 51 and the I62 indicates a pulse is input, the value of HA is 0. The HA is incremented each time the SW42 is 51.

When the SW42 is 52, the value of HA is a result of subtracting 1 from an immediately preceding value of the HA, when the SW42 is 51. Similarly, when the SW42 is 53, the value of HA is a result of subtracting 2 from the preceding value of the HA, when the SW42 is 51.

When the write address for the line memory 52 or 53 becomes lower than 0 as a result of the subtraction, the rearranging unit 15 does not write data into the line memory.

Also, when the write address for the line memory 52 or 53 is equal to or higher than 8, the rearranging unit 15 does not write data into the line memory.

Data is not written at the time T102 of FIG. 5 since at this time, the SW42 is 52 and the HA is lower than 0.

Similarly, data is not written into the line memories at the times T103, T106, T125, T128, and T129.

As a result of the operation shown in FIG. 5, data of horizontal three lines, namely a1-a30 shown in FIG. 3, are stored in the line memories 51-53.

The line memory 51 is an area corresponding to vertical address 0 as shown in FIG. 3, and stores a1, a4, a7, a10, a13, a16, a19, and a22 in areas that correspond to horizontal addresses 0-7.

The line memory 52 is an area corresponding to vertical address 1 as shown in FIG. 3, and stores a5, a8, a11, a14, a17, a20, a23, and a26 in areas that correspond to horizontal addresses 0-7.

The line memory 53 is an area corresponding to vertical address 2 as shown in FIG. 3, and stores a9, a12, a15, a18, a21, a24, a27, and a30 in areas that correspond to horizontal addresses 0-7.

Figure 6:
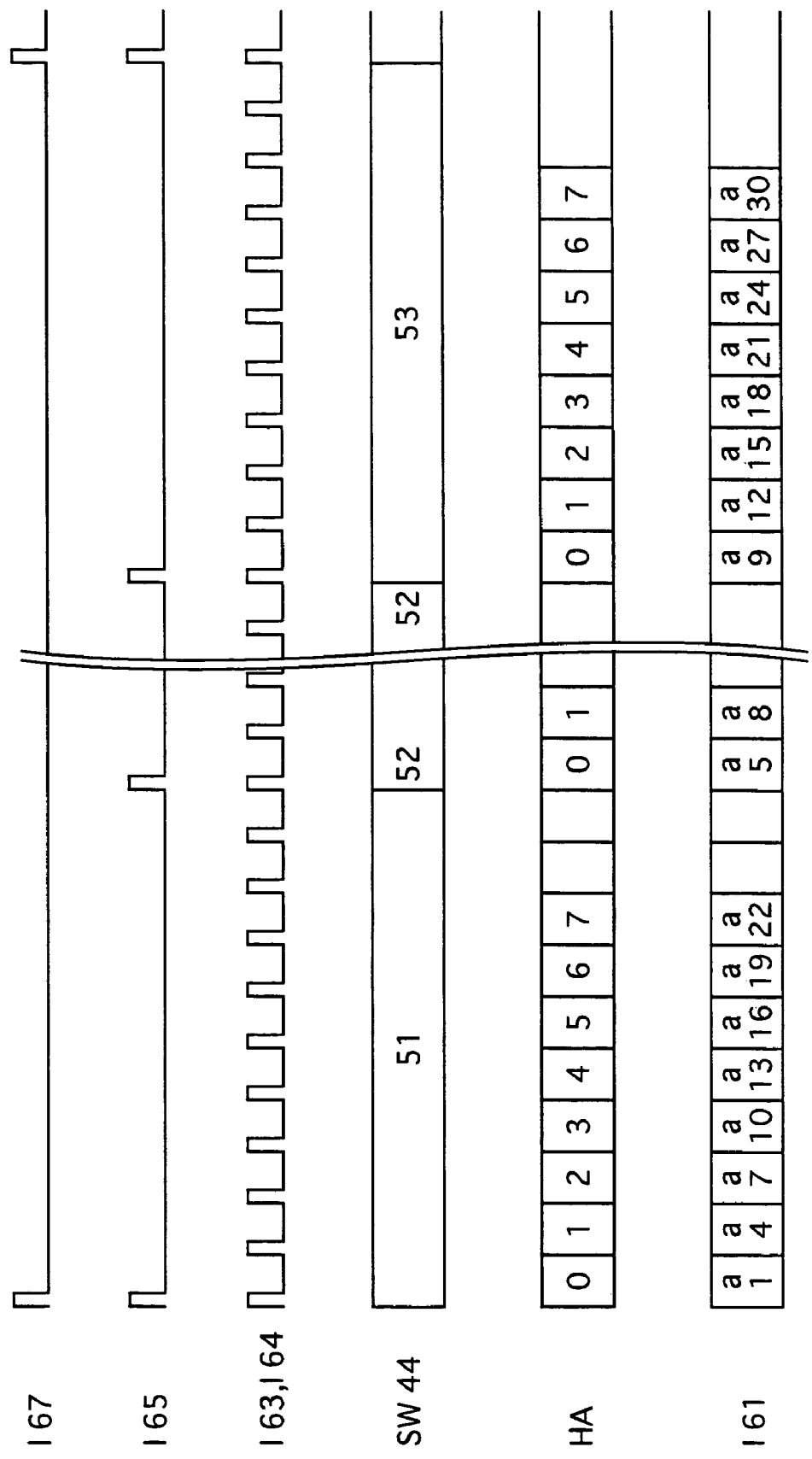
FIG. 6 shows an operation in which the rearranging unit outputs the data, which has been rearranged using the memory set, to the DRAM control unit.

FIG. 6 shows an operation in which the rearranging unit 15 outputs the data, which has been rearranged using the memory set 81, to the DRAM control unit 17.

The row identified by sign "SW44" in FIG. 6 indicates each line memory selected each time out of the line memories 51 to 53 by the switch 44. The row identified by sign "HA" in FIG. 6 indicates the read address for the line memories 51 to 53.

When both the I67 and I65 indicate that a pulse is input, the SW44 is 51. The SW44 is incremented each time the I65 indicates that a pulse is input, showing 52 and then 53.

When both the I65 and I63 indicate that a pulse is input, the HA is 0. The HA is incremented each time the I63 indicates that a pulse is input.

The row identified by sign "I61" in FIG. 6 indicates data that is read out from the line memory indicated by the SW44, at the address indicated by the HA.

The rearranging unit 15 arranges data by performing the control shown in FIG. 6, and outputs the arranged data to the DRAM control unit 17.

The rearranging unit 15 processes b1-b30 in a similar manner to a1-a30, as described above, using the memory set 82.

<3. Modifications>

The present invention has been described through the above embodiment. However, not limited to the embodiment, the present invention can be modified as follows, for example.

(1)

In the above-described embodiment, the rearranging unit 15 discards dummy data a2, a3, a6, a25, a28, a29, b2, b3, b6, b25, b28, and b29 without storing them into line memories. However, the dummy data may also be stored in the line memories, and then when the stored data is read, the data is arranged by adjusting the addresses, and the arranged data is output.

In this modification, the operation of the address counters 57 and 58 differs from that in the embodiment.

Also, each line memory has areas for storing 10 pieces of data including the dummy data.

Figure 8:
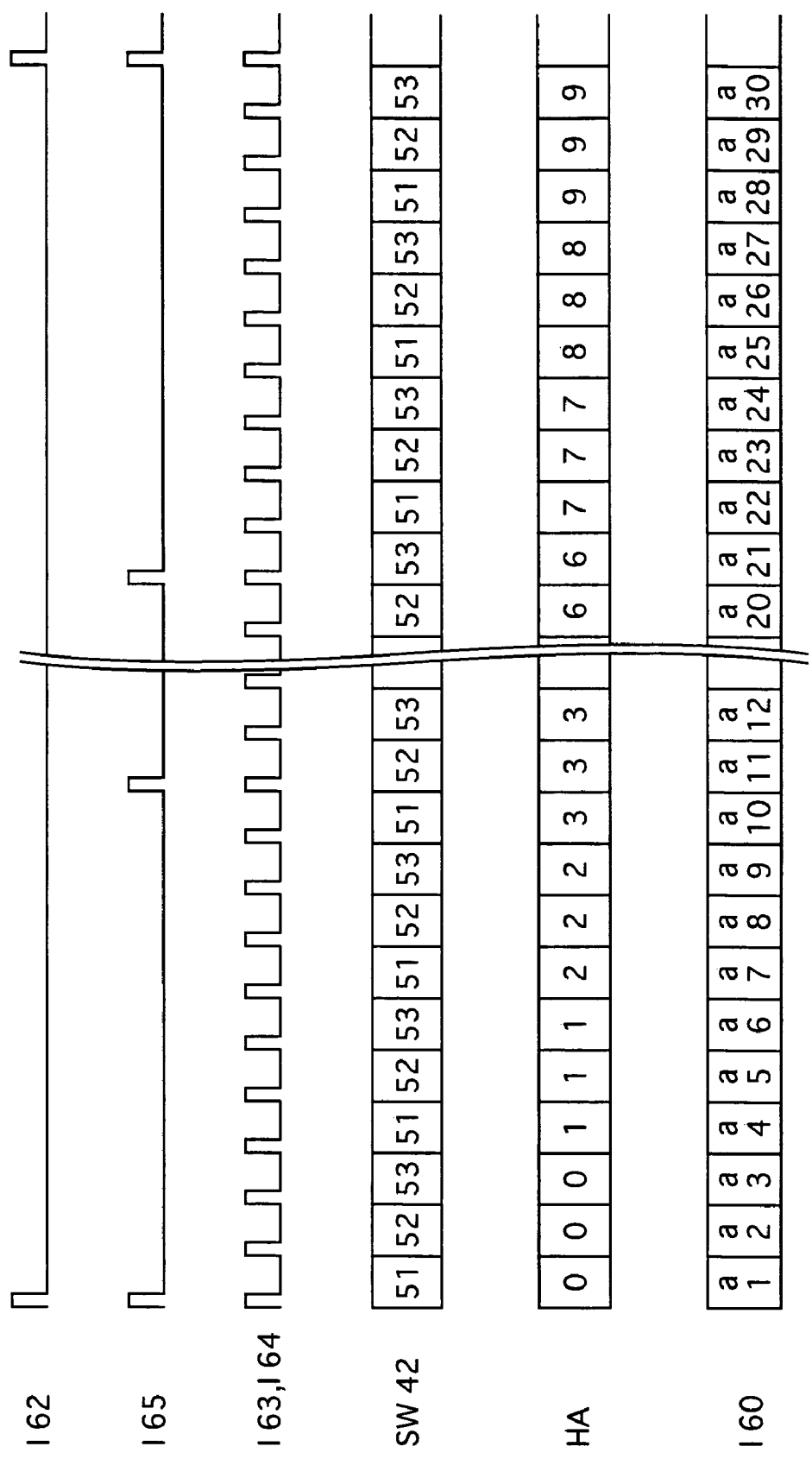
FIG. 8 shows an operation in which the rearranging unit rearranges data input from the signal converting unit, using the memory set.

FIG. 8 shows an operation in which the rearranging unit 15 rearranges data input from the signal converting unit 13, using the memory set 81.

When all of the I62, I65, and I63 indicate input of a pulse, the address counter 57 allows the switch 42 to switch to the line memory 51, specifies 0 as the write address.

As the row of SW42 indicates, the switch 42 switches its connection cyclically to the line memory 51, 52, and 53 each time the I63 indicates input of a pulse.

The address counter 57 increments the value of the HA every time the I63 indicates input of three pulses.

With the above-described operation, the input data shown in FIG. 2 is stored in a line memory as shown in FIG. 7.

FIG. 7 shows a data arrangement in a line memory when the dummy data is stored in the line memory, as well.

In this case, the line memory 51 is an area corresponding to vertical address 0 as shown in FIG. 7, and stores a1, a4, a7, a10, a13, a16, a19, a22, a25, and a28 in areas that correspond to horizontal addresses 0-9.

Similarly, the line memory 52 is an area corresponding to vertical address 1 shown in FIG. 7, and stores a2, a5, a8, a11, a14, a17, a20, a23, a26, and a29 in areas that correspond to horizontal addresses 0-9.

Similarly, the line memory 53 is an area corresponding to vertical address 2 shown in FIG. 7, and stores a3, a6, a9, a12, a15, a18, a21, a24, a27, and a30 in areas that correspond to horizontal addresses 0-9.

When data is stored in line memories as shown in FIG. 7, there are two methods available for controlling the data to be read out into the DRAM: (a) read address control; and (b) read timing control.

(A) Read Address Control

Figure 9:
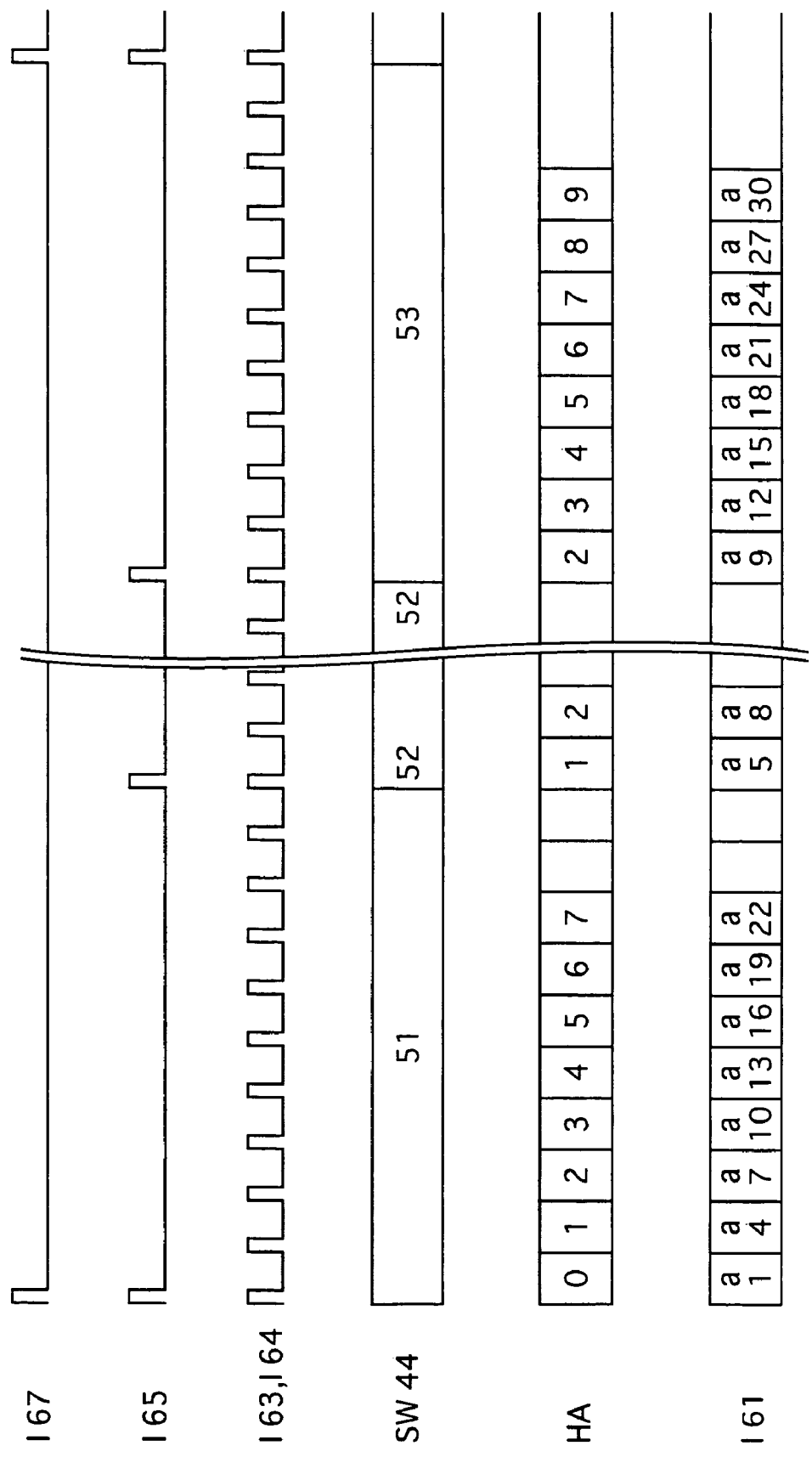
FIG. 9 shows an operation in which the rearranging unit performs the read address control to output the data rearranged using the memory set, to the DRAM control unit.

FIG. 9 shows an operation in which the rearranging unit 15 performs the read address control to output the data rearranged using the memory set 81, to the DRAM control unit 17.

As shown in FIG. 9, the rearranging unit 15 reads data a1, as indicated by the I61, from the line memory 51 selected by the switch 44 as indicated by the SW44, at an area having address 0 as indicated by the HA, when all of the I67, I65, and I63 indicate input of a pulse, and then outputs the read data.

The rearranging unit 15 increments the value of the HA every time the I63 indicates input of a pulse, reads data from an area indicated by the incremented value of the HA, and outputs the read data.

The incrementation is repeated a predetermined number of times (="the number of pieces of data stored in one line"—"1", namely, in this example, seven times), then the data output is stopped until the I65 indicates input of a pulse.

Then, when the I65 indicate input of a pulse, the rearranging unit 15 reads data a5, as indicated by the I61, from the line memory 52 to which the switch 44 is switched as indicated by the SW44, at an area having address 1 as indicated by the HA, and then outputs the read data. After this, each time the I63 indicates input of a pulse, there arranging unit 15 increments the value of the HA and outputs the read data.

The incrementation is repeated seven times, then the data output is stopped until the I65 indicates input of a pulse.

Then, when the I65 indicate input of a pulse, the rearranging unit 15 reads data a9, as indicated by the I61, from the line memory 53 to which the switch 44 is switched as indicated by the SW44, at an area having address 2 as indicated by the HA, and then outputs the read data. After this, each time the I63 indicates input of a pulse, the rearranging unit 15 increments the value of the HA and outputs the read data.

As described above, the rearranging unit 15 shifts the initial value of the read address by one each time the line memory connected to the switch changes among the line memories 51, 52, and 53. This eliminates the need to read dummy data, and enables data to be output in a desired order.

(B) Read Timing Control

Figure 10:
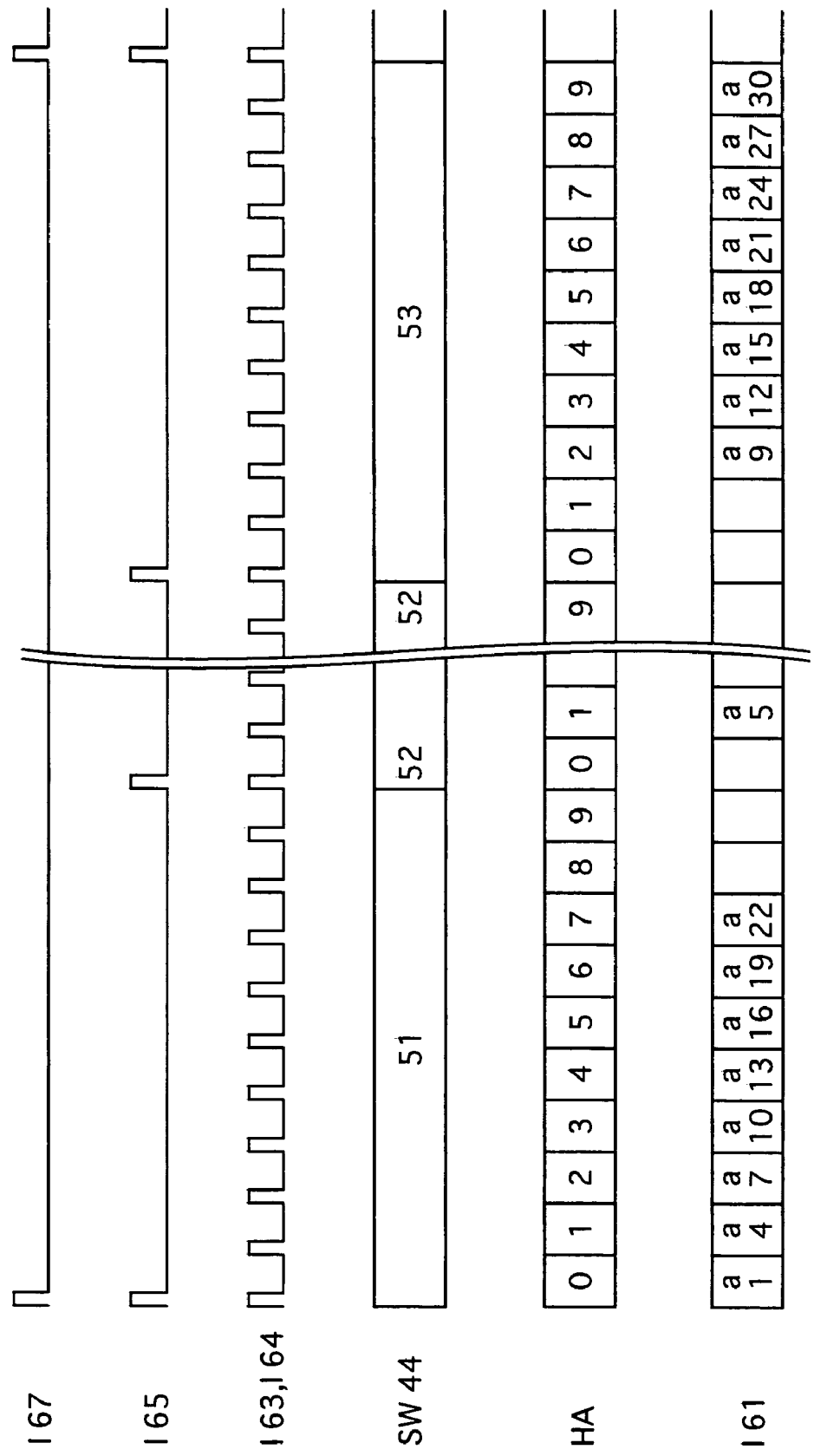
FIG. 10 shows an operation in which the rearranging unit performs the read timing control to output the data rearranged using the memory set, to the DRAM control unit.

FIG. 10 shows an operation in which the rearranging unit 15 performs the read timing control to output the data rearranged using the memory set 81, to the DRAM control unit 17.

As shown in FIG. 10, the rearranging unit 15 reads data a1, as indicated by the I61, from the line memory 51 selected by the switch 44 as indicated by the SW44, at an area having address 0 as indicated by the HA, when all of the I67, I65, and I63 indicate input of a pulse, and then outputs the read data.

The rearranging unit 15 increments the value of the HA every time the I63 indicates input of a pulse, reads data from an area indicated by the incremented value of the HA, and outputs the read data.

The data output is repeated eight times, then when the HA is 8 or 9, no data output is performed.

Then, when the I65 and I63 indicate input of a pulse, the SW44 indicates that the switch 44 connects to the line memory 52, and the HA indicates address 0, but no data output is performed.

That is to say, when the switch 44 switches to the line memory 52, data is not read from the area at the address 0, which is indicated by the HA, and thus no data output is performed. After this, each time the I63 indicates input of a pulse, the rearranging unit 15 increments the value of the HA and outputs the read data.

The data output is repeated eight times, then when the HA is 9, no data output is performed.

Then, when the I65 and I63 indicate input of a pulse, the SW44 indicates that the switch 44 connects to the line memory 53, and the HA indicates address 0, but no data output is performed.

After the I63 indicates that a pulse has been input twice, namely, when the HA is 2 or more, data is read from the address indicated by the HA and the read data is output.

The data output is repeated eight times, then stopped.

(2) Modification where One Memory Set is Used

Figure 11:
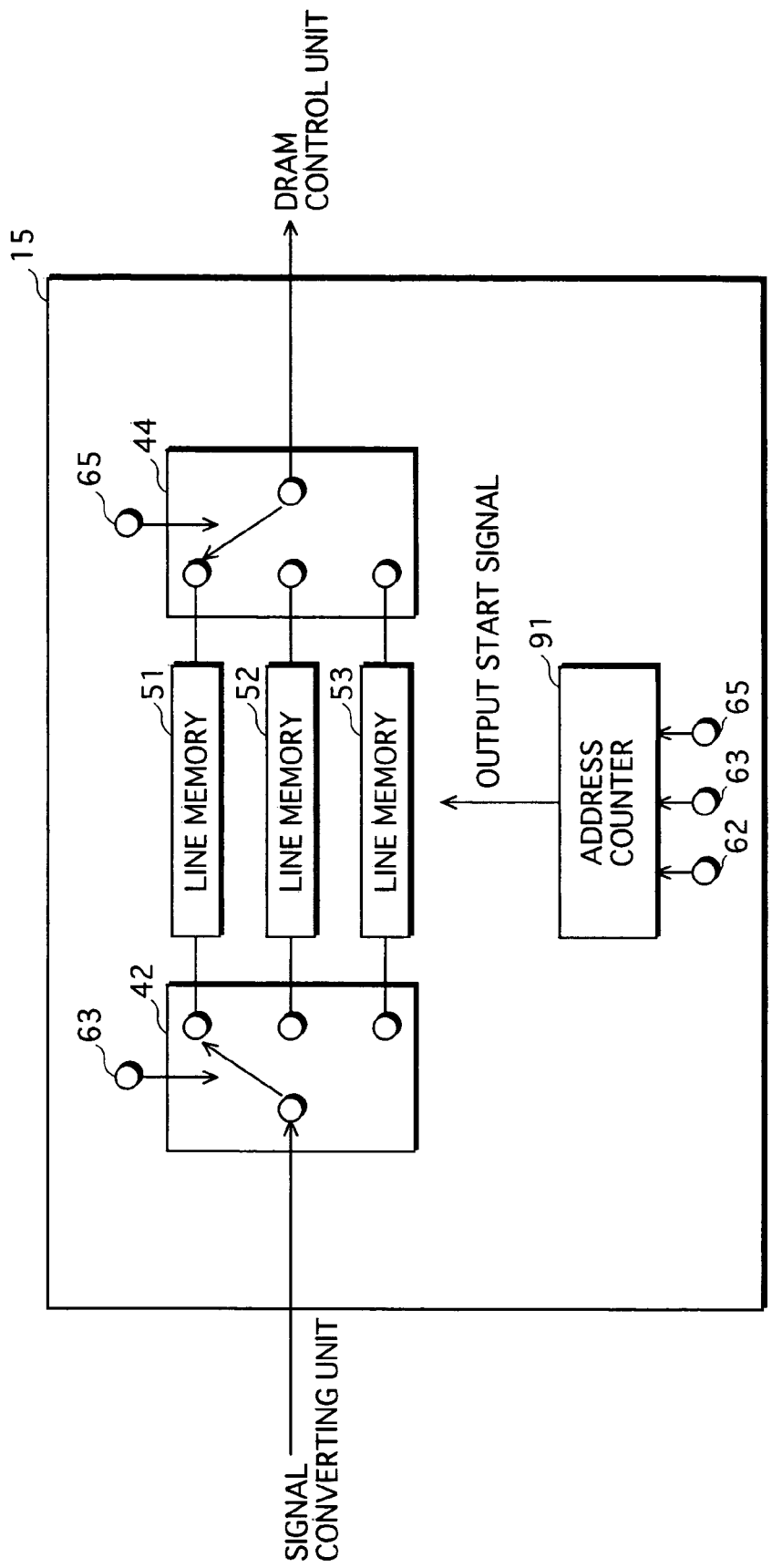
FIG. 11 is a block diagram showing the construction of the rearranging unit when one memory set is used.

FIG. 11 is a block diagram showing the construction of the rearranging unit 15 when one memory set is used.

In this modification, the rearranging unit 15 includes only one memory set. As a result, the rearranging unit 15 cannot perform the data reading and writing in parallel.

Figure 12:
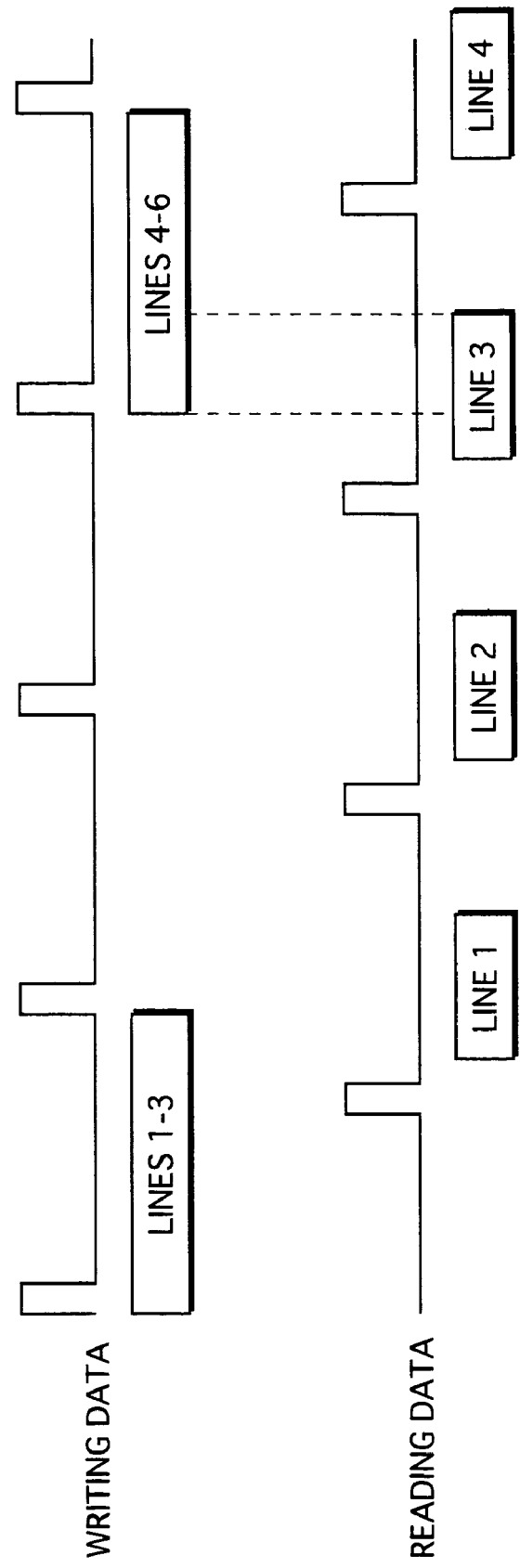
FIG. 12 shows timing with which data is written by the rearranging unit that includes only one memory set.

FIG. 12 shows timing with which data is written by the rearranging unit 15 that includes only one memory set.

Each of the pulses appearing in the rows of the writing data and reading data rises each time data of one horizontal line (1H) is input.

As indicated by the dotted lines in FIG. 12, the timing of writing data for lines 4-6 overlaps with the timing of reading data for line 3. To avoid data from being destroyed, the address counter 91 adjusts the write and read addresses and the write timing so that the signal converting unit 13 does not write the data that has not been completely read out by the DRAM control unit 17.

It is possible to avoid incorrect overwriting of data by performing a control using an output start signal so that data is received from the signal converting unit 13 only after data has completely been read out from the line memory 51 or 53.

(3) Modification for Using 2-Port Memory

Figure 13:
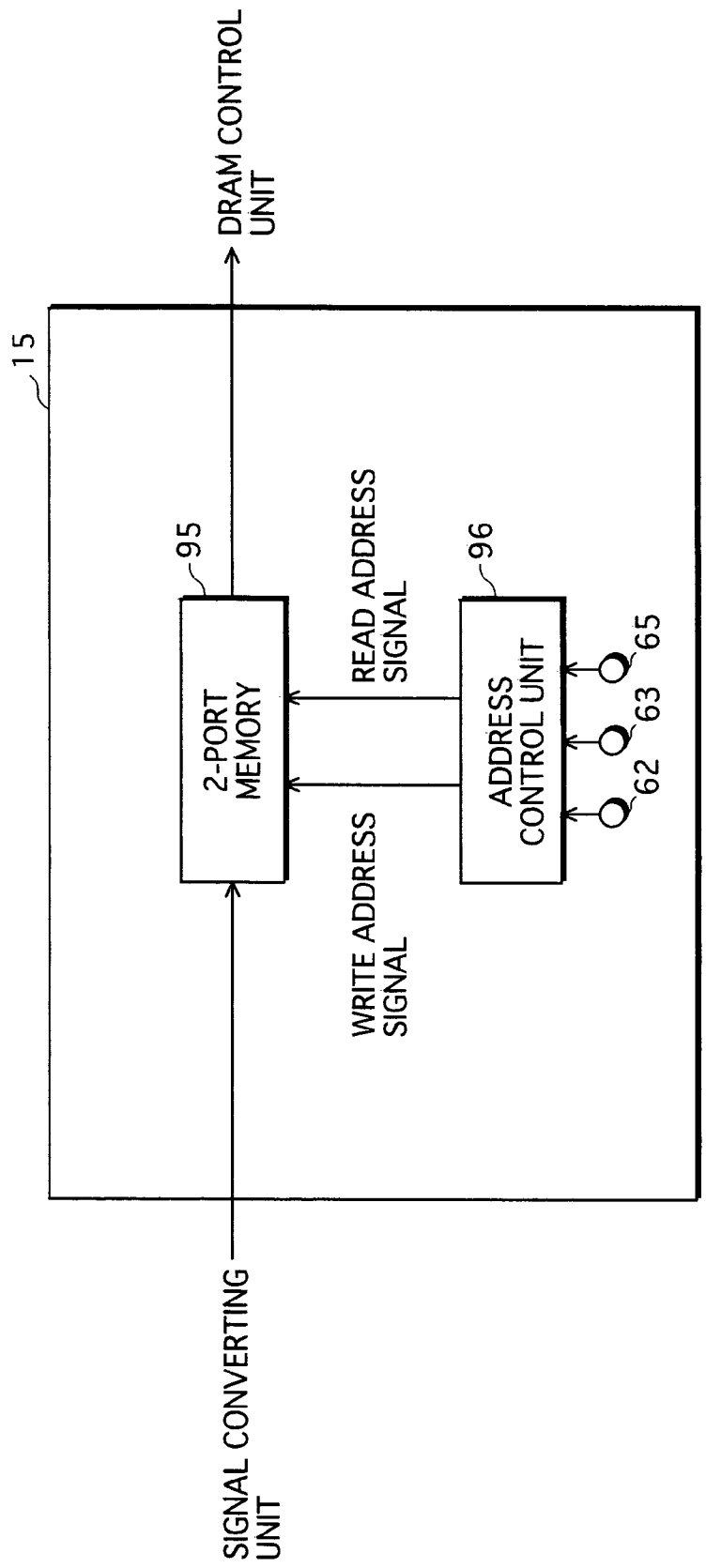
FIG. 13 is a block diagram showing the construction of the rearranging unit that includes a 2-port memory and an address control unit.

FIG. 13 is a block diagram showing the construction of the rearranging unit 15 that includes a 2-port memory 95 and an address control unit 96.

The address control unit 96 stores, in advance, information that shows relationships between (i) storage areas indicated by horizontal and vertical addresses shown in FIG. 3 and (ii) data stored in the storage areas.

The 2-port memory 95, under control of the address control unit 96, rearranges data received from the signal converting unit 13 as shown in FIG. 3, stores therein the rearranged data, and performs reading and writing of the rearranged data in parallel.

The input units 62, 63, and 65 shown in FIG. 13 receives the same signals as the input units 62, 63, and 65 shown in FIG. 4.

It should be noted here that to avoid deletion of data that has not been completely read out yet from the 2-port memory 95, the address control unit 96 controls and adjusts the write and read addresses so that data is written only into addresses from which data has been completely read out.

(4) Modification Regarding Location of Rearranging Unit 15

The description so far assumes that the rearranging unit 15 is embedded in the signal processing unit 19. However, not limited to this, the rearranging unit 15 may be located at any of the positions shown in FIGS. 14, 15, 16, 17, and 18.

There is no need to change the function of the rearranging unit 15 depending on the location thereof, but it slightly affects the arrangement of the units and wiring therebetween.

Figure 14:
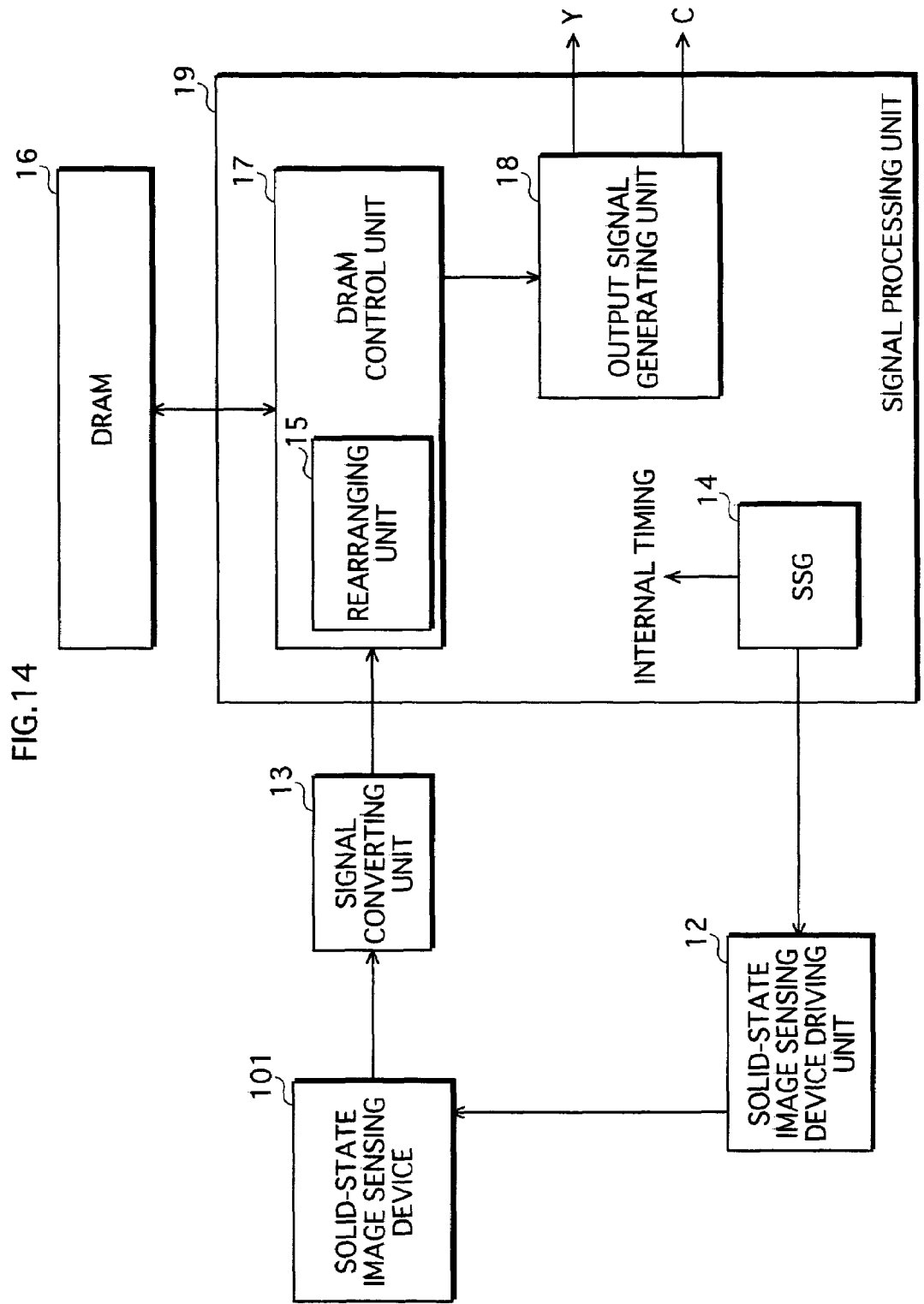
FIG. 14 is a block diagram showing the construction of the solid-state image sensing apparatus in which the rearranging unit is embedded in the DRAM control unit.

FIG. 14 is a block diagram showing the construction of the solid-state image sensing apparatus in which the rearranging unit 15 is embedded in the DRAM control unit 17.

With this construction in which the rearranging unit 15 is embedded in the DRAM control unit 17, the rearranging unit 15 may rearrange data before the DRAM control unit 17 writes the data to the DRAM 16, or after the DRAM control unit 17 reads the data from the DRAM 16.

Figure 15:
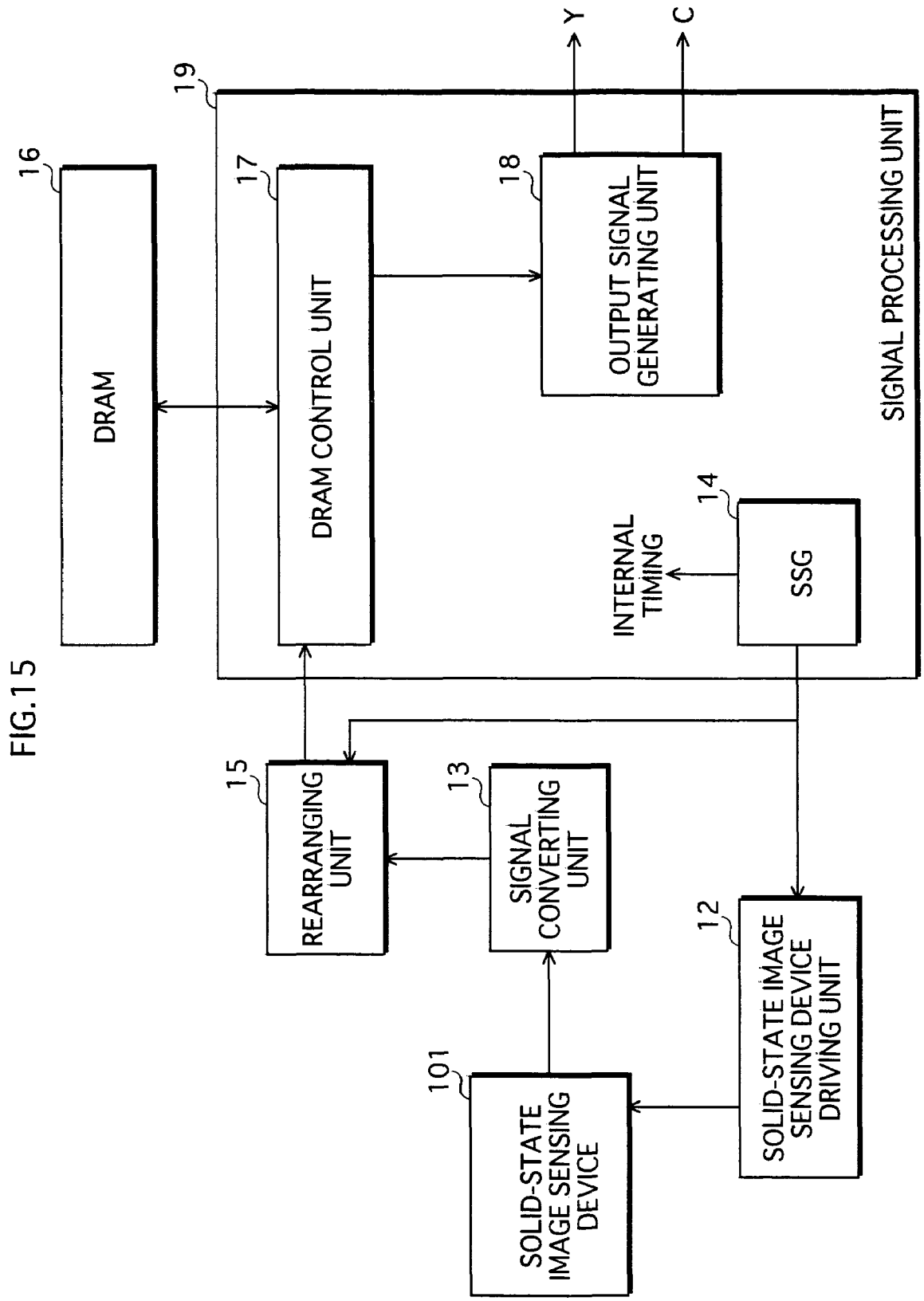
FIG. 15 is a block diagram showing the construction of the solid-state image sensing apparatus in which the rearranging unit is independent of the signal processing unit.

FIG. 15 is a block diagram showing the construction of the solid-state image sensing apparatus in which the rearranging unit 15 is independent of the signal processing unit 19.

With this construction, data output from the signal converting unit 13 is rearranged by the rearranging unit 15, and then output to the DRAM control unit 17.

Figure 16:
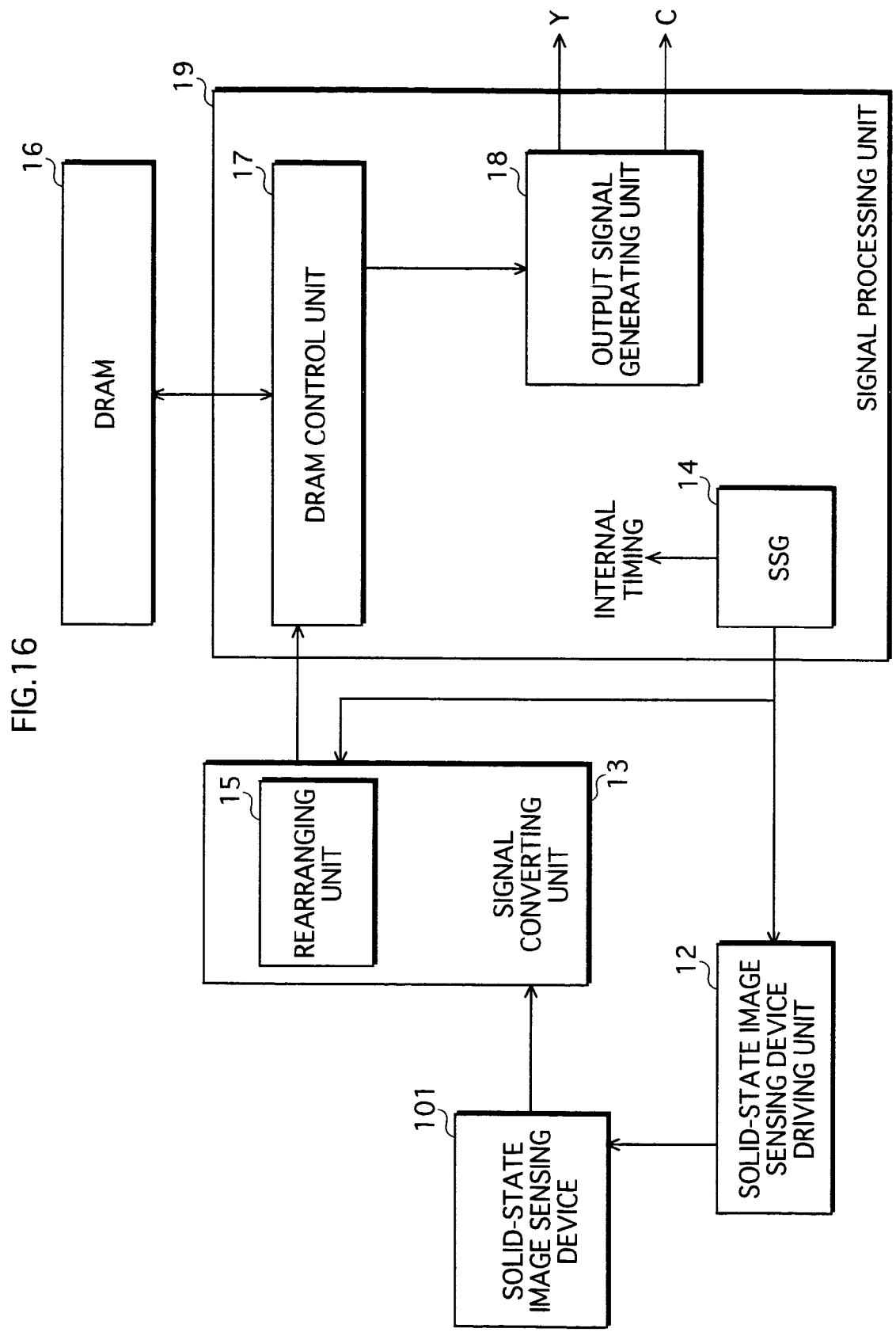
FIG. 16 is a block diagram showing the construction of the solid-state image sensing apparatus in which the rearranging unit is embedded in the signal converting unit.

FIG. 16 is a block diagram showing the construction of the solid-state image sensing apparatus in which the rearranging unit 15 is embedded in the signal converting unit 13.

With this construction, signal charges output from the solid-state image sensing device 101 are subjected to the A/D conversion performed by an A/D conversion sub-unit in the signal converting unit 13, and the data after the A/D conversion is rearranged by the rearranging unit 15, and then output to the DRAM control unit 17.

Figure 17:
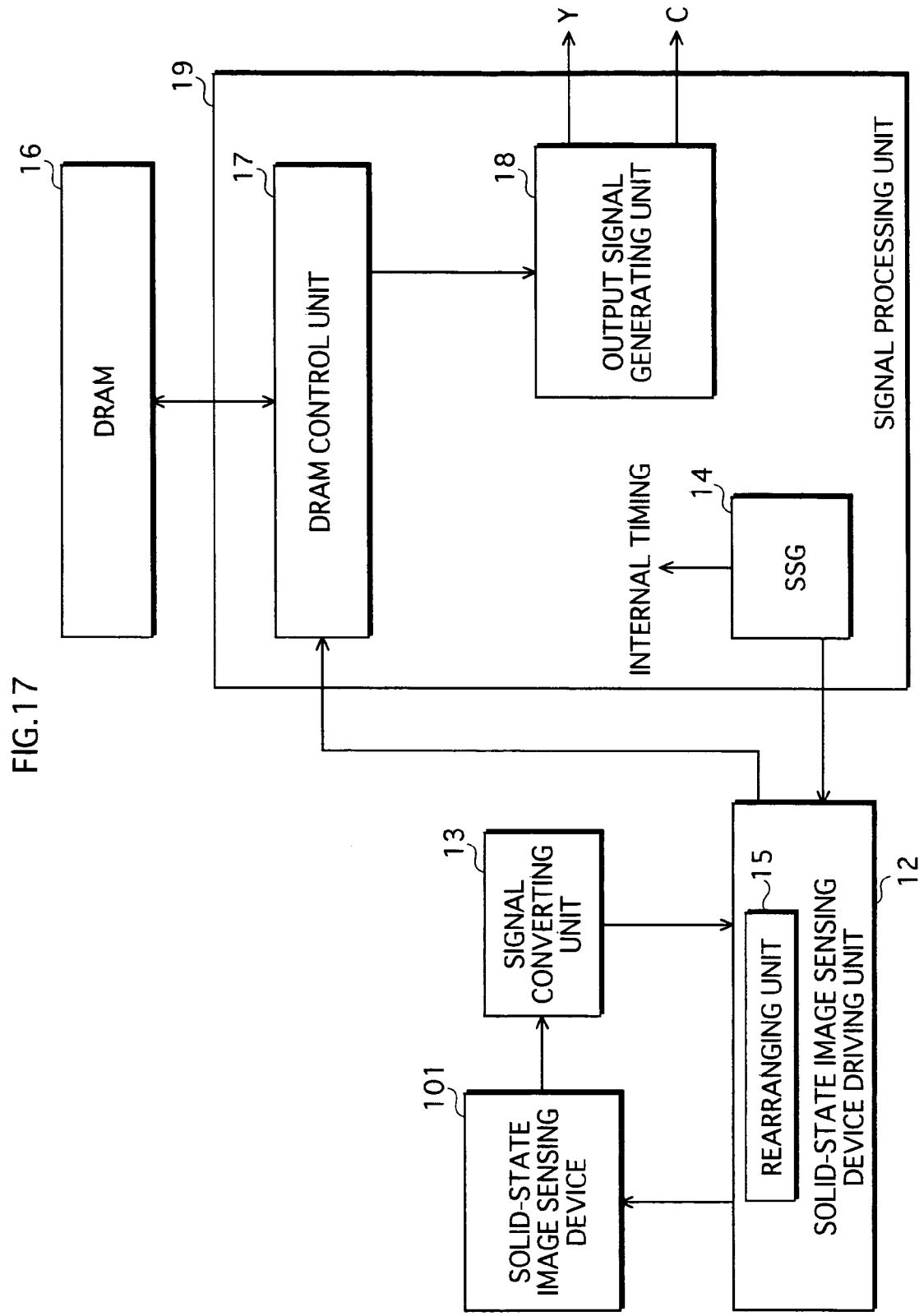
FIG. 17 is a block diagram showing the construction of the solid-state image sensing apparatus in which the rearranging unit is embedded in the solid-state image sensing device driving unit.

FIG. 17 is a block diagram showing the construction of the solid-state image sensing apparatus in which the rearranging unit 15 is embedded in the solid-state image sensing device driving unit 12.

With this construction, data output from the signal converting unit 13 is rearranged by the rearranging unit 15 embedded in the solid-state image sensing device driving unit 12, and then output to the DRAM control unit 17.

Figure 18:
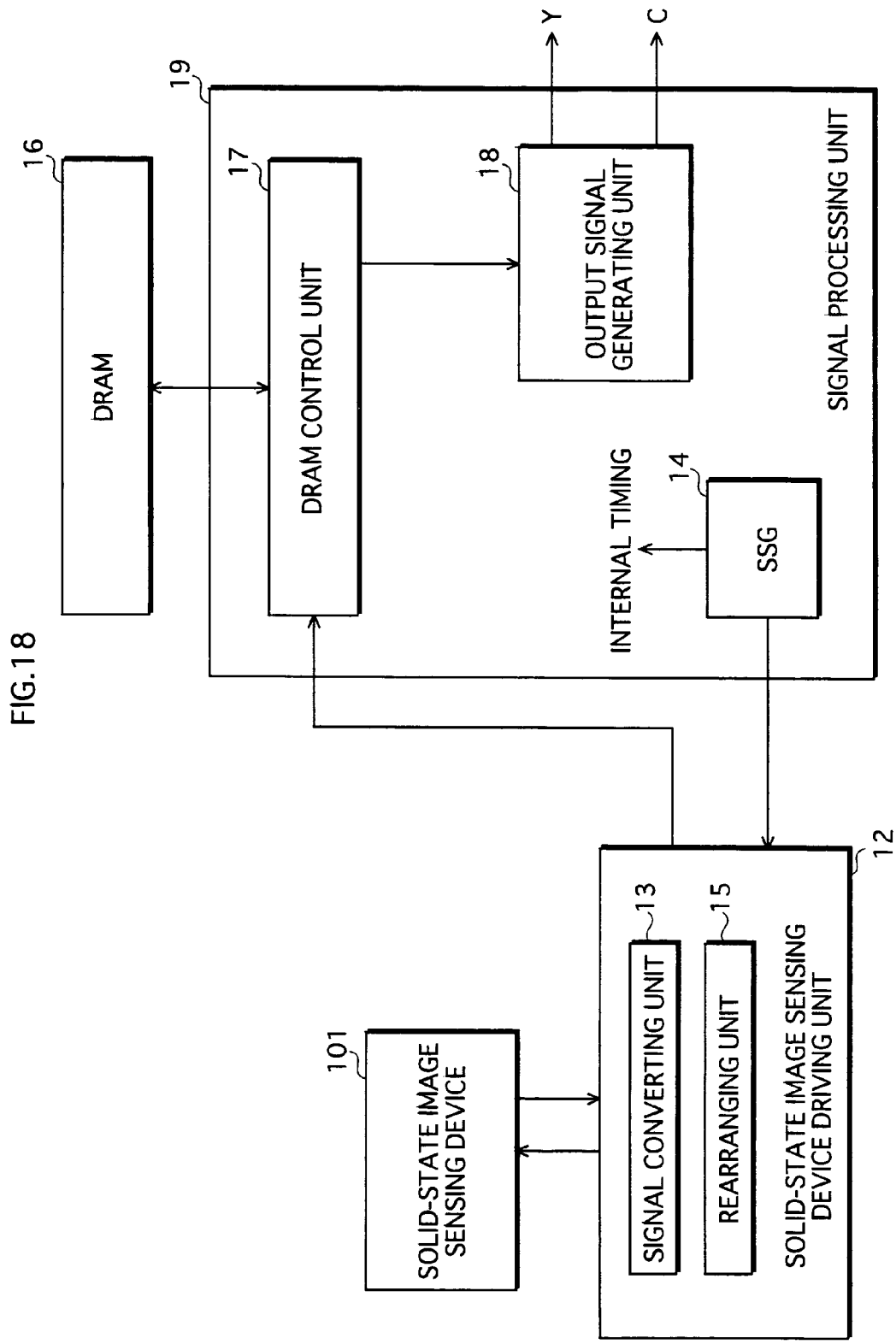
FIG. 18 is a block diagram showing the construction of the solid-state image sensing apparatus in which the signal converting unit and the rearranging unit are embedded in the solid-state image sensing device driving unit.

FIG. 18 is a block diagram showing the construction of the solid-state image sensing apparatus in which the signal converting unit 13 and the rearranging unit 15 are embedded in the solid-state image sensing device driving unit 12.

With this construction, signal charges output from the solid-state image sensing device 101 are subjected to the A/D conversion performed by an A/D conversion sub-unit in the signal converting unit 13 in the solid-state image sensing device driving unit 12 or other processes, and the data after such processes is rearranged by the rearranging unit 15, and then output to the DRAM control unit 17.

(5) Application to Digital Camera

The solid-state image sensing apparatus of the present embodiment may be applied to digital cameras.

Figure 42:
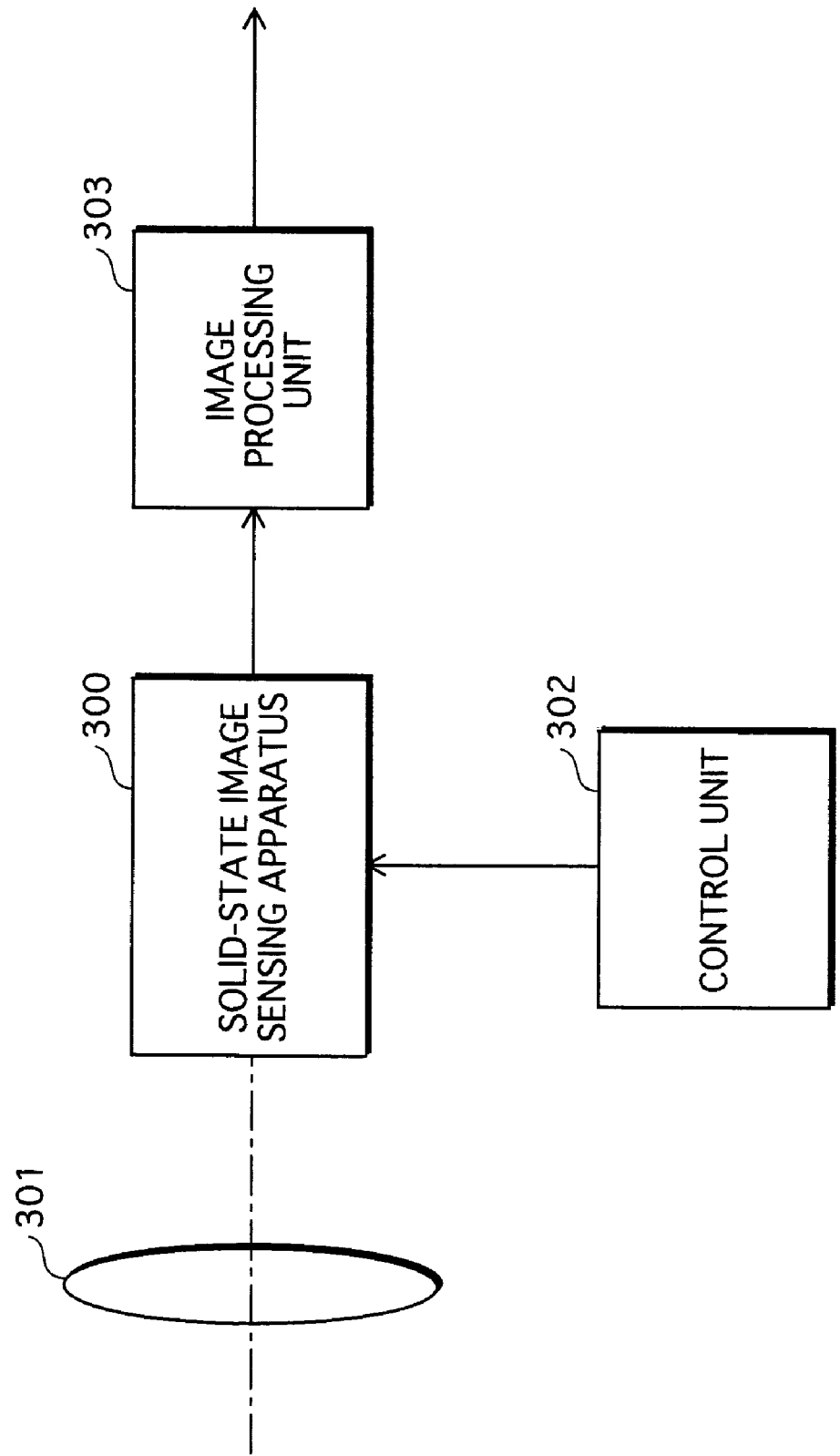
FIG. 42 shows a construction of a digital camera of the present invention.

FIG. 42 shows a construction of a digital camera of the present invention.

A solid-state image sensing apparatus 300 is the same as the solid-state image sensing apparatus described in the present embodiment.

The digital camera includes: an optical system 301 including a lens for focusing light, which comes from a photogenic subject, onto a plane of the 300; a control unit 302 for controlling driving of the 300 and the operation of the whole digital camera; and an image processing unit 303 for performing various processes on the signals output from the 300.

With use of the solid-state image sensing apparatus of the present invention by switching between the high-speed operation mode and the all-pixel reading mode, a digital camera operable in a video (high-speed operation) mode and a still-picture (all-pixel reading) mode is achieved.

(6) Modification Regarding Internal Structure of Rearranging Unit

In the above-described embodiment, data output from the signal converting unit 13 is rearranged by the rearranging unit 15, and the rearranged data is written into the line memories, and the rearranged data is read therefrom and written into the DRAM 16 via the DRAM control unit 17. However, the pixel data may be written into the line memories without rearrangement, in sequence as they are output from the signal converting unit 13, and the pixel data may be rearranged when they are read from the line memories.

The construction of the solid-state image sensing apparatus of the present modification is the same as that shown in FIG. 1.

Figure 43:
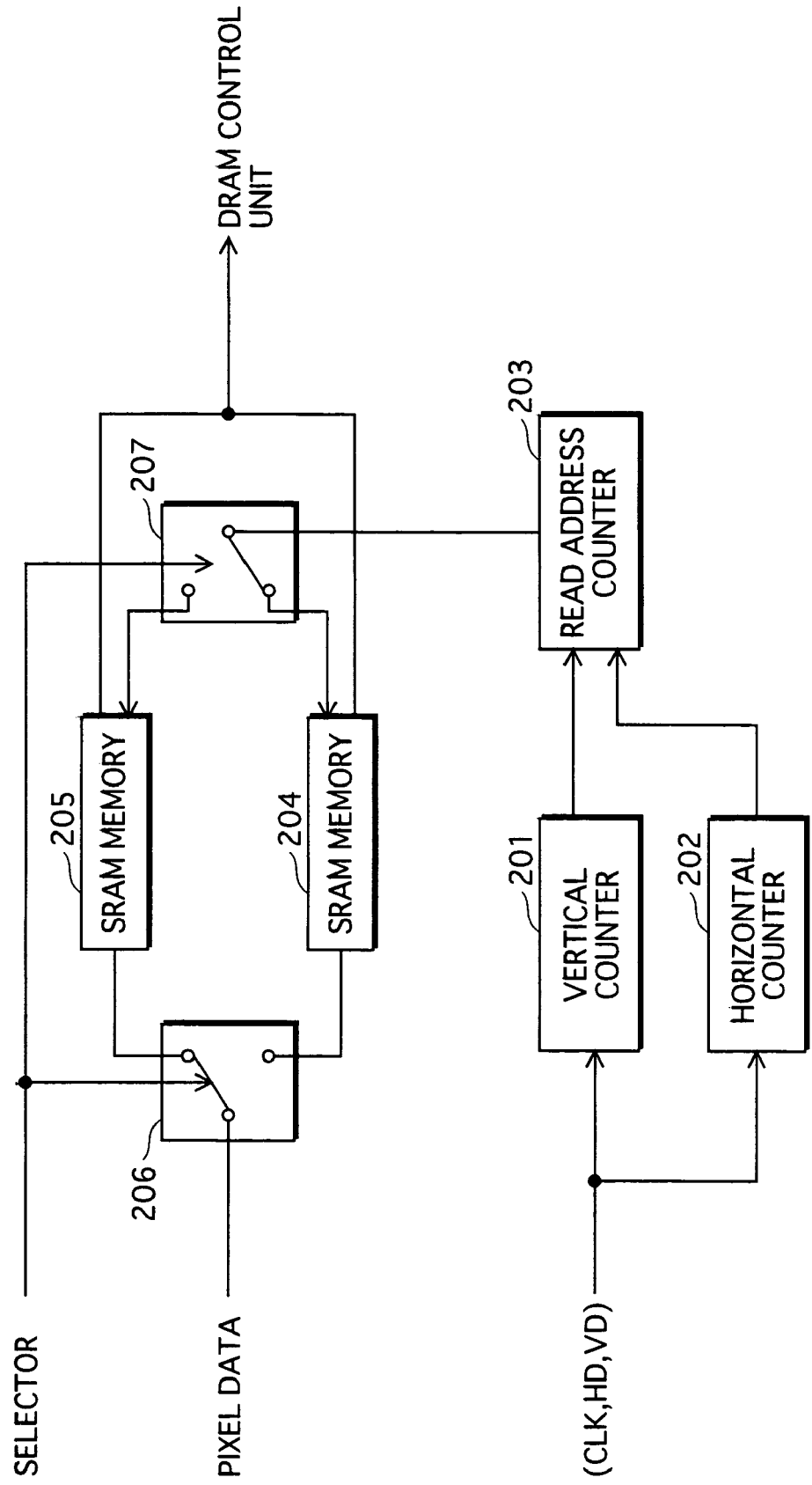
FIG. 43 is a block diagram showing a construction of the rearranging unit of the present modification.

FIG. 43 is a block diagram showing a construction of the rearranging unit 15 of the present modification.

The rearranging unit 15 includes, as shown in FIG. 43, a vertical counter 201, a horizontal counter 202, a read address counter 203, a SRAM memory 204, a SRAM memory 205, a selector 206, and a selector 207, where the SRAM memories 204 and 205 constitute a memory set.

The SRAM memories 204 and 205 are used to store pixel data temporarily. When data is written into one of the SRAM memories 204 and 205, data is read from the other.

The read address counter 203 sets read addresses for the SRAM memories 204 and 205. The data read out from the set read addresses is output to the DRAM control unit 17.

The selector 206 is a switch for selecting one of the SRAM memories 204 and 205 into which data is written. The selector 207 is a switch for selecting one of the SRAM memories 204 and 205 from which data is read.

A selector signal, which is a pulse that rises each time data of three horizontal lines (3H) is input, is provided from the SSG 14. Each time a pulse is input as the selector signal, the selectors 206 and 207 switch the selected SRAM memory.

The selectors 206 and 207 always select a different SRAM memory from each other, and connect to the selected SRAM memory. For example, while the selector 206 selects the SRAM memory 205, the selector 207 selects the SRAM memory 204; and while the selector 206 selects the SRAM memory 204, the selector 207 selects the SRAM memory 205.

A clock signal (CLK), a horizontal sync signal (HD), and a vertical sync signal (VD) are input into the vertical counter 201 and the horizontal counter 202. Outputs of the vertical counter 201 and the horizontal counter 202 are input into the image processing unit 203.

In the present example, it is supposed that devices or the like are operated in synchronization with the trailing edge of pulse of each of the signals CLK, HD, and VD. However, the devices or the like may be operated in synchronization with the leading edge of pulse of each signal.

Pixel data is written into a SRAM memory in synchronization with the signal output from the SSG 14, in an order in which the pixel data is output from the signal converting unit 13, without being rearranged.

When pixel data is written into a SRAM memory, the data is written into areas indicated by the addresses, starting with an initial address of the SRAM memory (for example, address value "0"), followed by address values in the ascending order, "1", "2", "3", . . . .

FIG. 44 shows data written into a SRAM memory.

The following description relates to reading data from the SRAM memory 204.

Description regarding the SRAM memory 205 is omitted to avoid overlapping with the description regarding the SRAM memory 204.

The signs such as "a1" in the boxes identify each piece of data, and the numbers put above the boxes indicate addresses assigned to storage areas of the SRAM memory 204.

It is supposed here that addresses are assigned to the storage areas of the SRAM memories 204 and 205 in a similar manner, starting with the same initial address value "0".

FIG. 44 shows, for example, that data "a1" is recorded in a storage area of the SRAM memory 204 indicated by address "0", and that data "a2" is recorded in a storage area indicated by address "1". Similarly, data "a3"-"a30" output from the signal converting unit 13 are stored in storage areas indicated by addresses "2"-"29".

The vertical counter 201 is reset to a value "0" when both input signals HD and VD become a high level, and then incremented by "1" each time a high level of the HD is detected. The vertical counter 201 outputs the count values (hereinafter, referred to as vertical counting values) to the read address counter 203.

The horizontal counter 202 is reset to a value "0" when both input signals HD and VD become a high level, and then incremented by "1" each time a high level of the CLK is detected. The horizontal counter 202 outputs the count values (hereinafter, referred to as horizontal counting values) to the read address counter 203.

Figure 45:
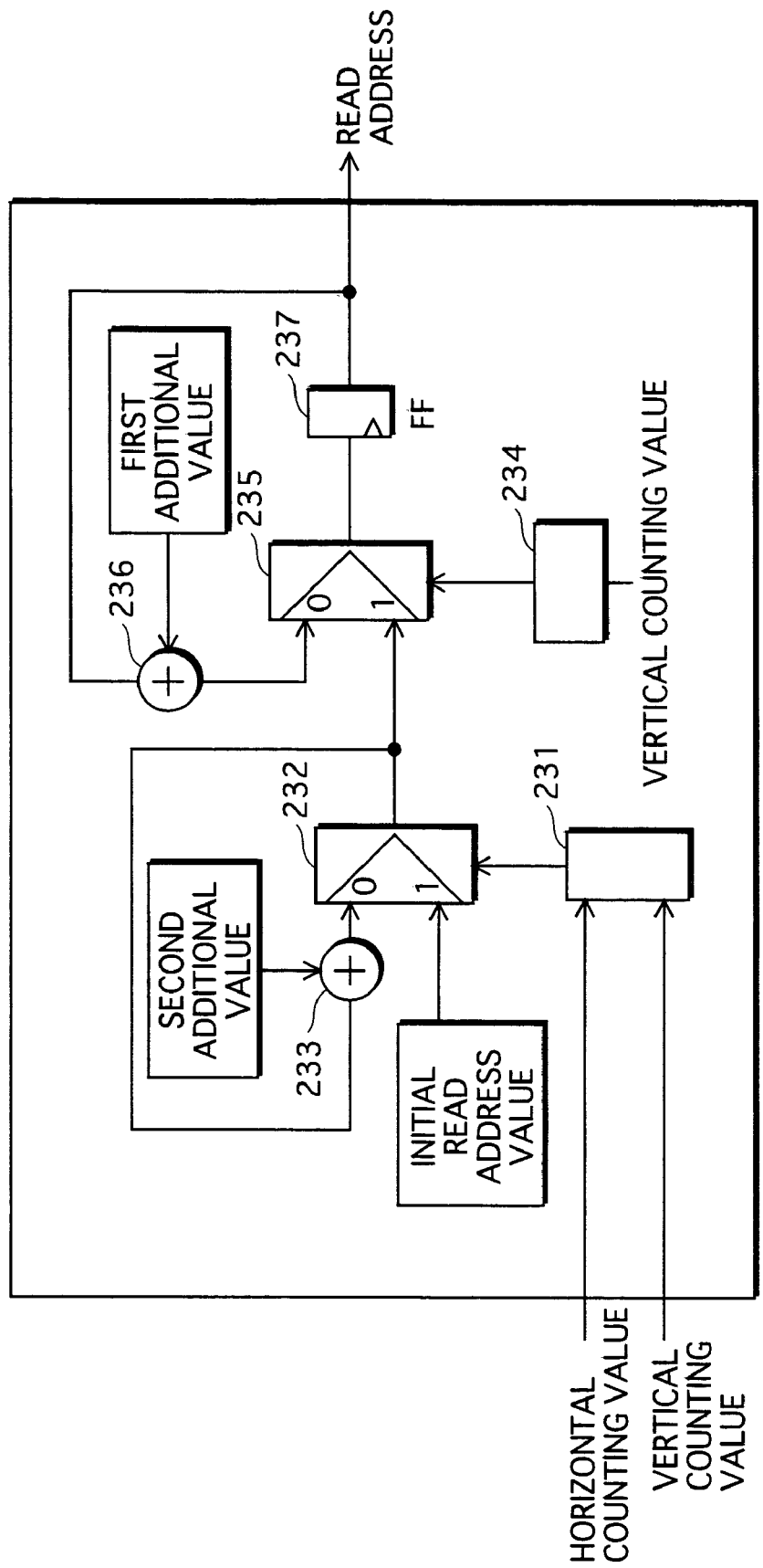
FIG. 45 is a block diagram showing the construction of the read address counter.

FIG. 45 is a block diagram showing the construction of the read address counter 203.

As shown in FIG. 45, the read address counter 203 includes a comparator 231, a selector 232, an adder 233, a latch 234, a selector 235, an adder 236, and a latch 237.

The comparator 231 receives a horizontal counting value and a vertical counting value from the horizontal counter 202 and the vertical counter 201, and if both the received horizontal and vertical counting values are "1", outputs a value "1" to the selector 232, and if both the received horizontal and vertical counting values are not "1", outputs a value "0" to the selector 232.

The selector 232 receives the two inputs, and if an output value from the comparator 231 is "1", outputs an initial read address value to the selector 235, and if an output value from the comparator 231 is "0", outputs an output value from the adder 233 to the selector 235.

It should be noted here that the above-said initial read address value is a read start address of the DRAM 16 that is determined in advance. In the present modification example, it is presumed that the initial read address value is "0".

When a HD signal is input, the adder 233 adds a second additional value to a received value, and outputs the result value to the selector 232.

The above-said second additional value is determined in advance, and in this example, the value is presumed to be "4".

The latch 234 receives a vertical counting value, and each time the received vertical counting value has changed from the previously received value, outputs a pulse that indicates a value "1", and if there is no change, outputs a low-level signal that indicates a value "0".

The selector 235 outputs a value output from the selector 232 to the latch 237 if the latch 234 outputs the value "1", and outputs a value output from the adder 236 to the latch 237 if the latch 234 outputs the value "0".

When a CLK signal is input, the adder 236 adds a first additional value to a received value, and outputs the result value to the selector 235.

The latch 237 outputs a read address, which was output from the selector 235, to the DRAM control unit 17.

The DRAM control unit 17 reads data from a storage area of the DRAM indicated by the read address obtained from the rearranging unit 15, and outputs the read data to the output signal generating unit 18.

Figure 46:
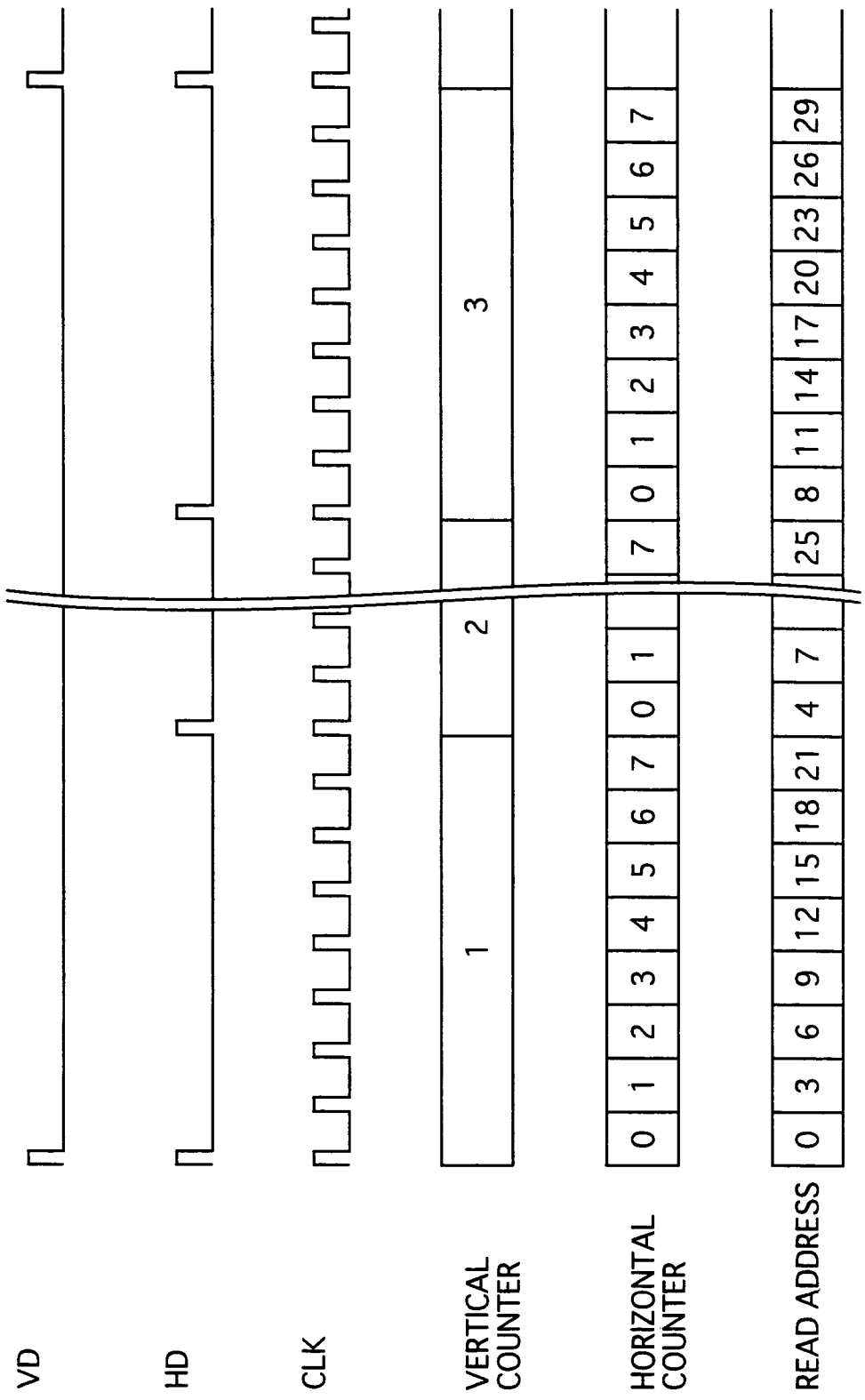
FIG. 46 is a timing chart showing changes in VD, HD, CLK, vertical counting value, horizontal counting value, and read address, in terms of the rearranging unit in the present modification example.

FIG. 46 is a timing chart showing changes in VD, HD, CLK, vertical counting value, horizontal counting value, and read address, in terms of the rearranging unit 15 in the present modification example.

As shown in FIG. 46, the rearranging unit 15 outputs read addresses "0", "3", "6", "9", ... in the stated order to the DRAM control unit 17. Upon receiving these addresses, the DRAM control unit 17 reads, from the DRAM 16, the value "a1" from the storage area at the address "0", the value "a4" from the storage area at the address "3", the value "a7" from the storage area at the address "6", the value "a10" from the storage area at the address "9", ... in the stated order.

As described above, it is possible that data is written into the SRAM memory 204 in an order the data is output from the signal converting unit 13, and that written data is read out from the SRAM memory 204 in a desired order.

It should be noted here that determining specific values for the first and second additional values and the initial read address value is closely related to designing and may be changed as necessary to meet the specifications.

(7) In the description so far, three vertical transfer columns are regarded as one unit, and each unit has the same structure of transfer electrodes. However, 2n+1 vertical transfer columns may be regarded as one unit, and each unit may have the same structure of transfer electrodes, where n is a natural number of 2 or higher.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A pixel arranging apparatus for rearranging a two-dimensionally arranged pixel data received from a solid-state image sensing device, wherein the two-dimensionally arranged pixel data are generated by mixing charges of a plurality of light-to-electric conversion elements so as to reduce a number of pixels processed, the pixel arranging apparatus comprising:

an acquiring unit for acquiring a sequence of the two-dimensionally arranged pixel data from the solid-state image sensing device;

an extracting unit for extracting pieces of pixel data from the sequence of the two-dimensionally arranged pixel data, one piece out of every predetermined number of pieces; and an arranging unit for arranging the extracted pieces of pixel data sequentially in an order in which the pieces of pixel data are extracted, wherein:

the extracting unit extracts, as first pixel data, pieces of pixel data from the plurality of pieces of pixel data, one piece out of three pieces starting from a predetermined position, extracts, as second pixel data, pieces of pixel data from the plurality of pieces of pixel data, one piece out of three pieces starting from a position that is posterior to the predetermined position by four pieces of pixel data, and extracts, as third pixel data, pieces of pixel data from the plurality of pieces of pixel data, one piece out of three pieces starting from a position that is posterior to the predetermined position by eight pieces of pixel data, and the arranging unit arranges the extracted pieces of first pixel data sequentially in an order in which the pieces of first pixel data are extracted, arranges the extracted pieces of second pixel data sequentially in an order in which the pieces of second pixel data are extracted, and arranges the extracted pieces of third pixel data sequentially in an order in which the pieces of third pixel data are extracted.

2. The pixel arranging apparatus of claim 1, wherein
the extracting unit extracts a predetermined number of pieces of first pixel data,
the extracting unit extracts a predetermined number of pieces of second pixel data, and
the extracting unit extracts a predetermined number of pieces of third pixel data.

3. A camera including the pixel arranging apparatus defined in claim 1.

4. The pixel arranging apparatus of claim 2, wherein
the extracting unit includes:
a storage sub-unit;
a writing sub-unit for writing the sequence of the plurality of pieces of pixel data into an area having consecutive addresses of the storage sub-unit in an order in which the writing sub-unit receives thereof; and
an address control sub-unit for outputting addresses that each appear every predetermined number of addresses among the consecutive addresses for the area, wherein
the arranging unit reads pieces of pixel data from positions in the area indicated by the addresses output by the address control sub-unit, and arranges the read pieces of pixel data sequentially.

5. The pixel arranging apparatus of claim 2, wherein
the extracting unit includes:
a storage sub-unit including three line memories; and
a control sub-unit for cyclically selecting a line memory out of the three line memories each time one piece of pixel data is transferred, and
the arranging unit includes
a writing sub-unit for extracting one piece of pixel data from the sequence of the plurality of pieces of pixel data in an order in which the writing unit receives thereof, and writing the extracted piece of pixel data into a line memory currently selected by the control sub-unit.

6. The pixel arranging apparatus of claim 2, wherein
the arranging unit includes:
a 2-port memory for performing reading and writing of data in parallel; and
a data processing sub-unit for writing or reading the extracted pieces of pixel data into/from the 2-port memory based on a two-dimensional arrangement of light-to-electric conversion elements provided in the solid-state image sensing device.

7. The pixel arranging apparatus of claim 4, wherein
the address control sub-unit includes:
a control signal receiving lower-unit for receiving, from outside the pixel arranging apparatus, a reference clock and a horizontal sync signal;
a horizontal counter for counting in synchronization with the reference clock to output horizontal counting values;

a vertical counter for counting in synchronization with the horizontal sync signal to output vertical counting values; and an address calculating lower-unit for calculating addresses that are each represented by ax+by+c, based on the horizontal and vertical counting values, wherein "x" represents a horizontal counting value, "y" represents a vertical counting value, "a" and "b" respectively represent a given number, and "c" represents a reading start address that corresponds to a position from which the extracting unit begins to extract the pieces of pixel data.

8. The pixel arranging apparatus of claim 5, wherein
the writing sub-unit writes, into the line memory currently selected by the control sub-unit, only pieces of pixel data located at positions excluding predetermined positions for exclusion in the sequence of the plurality of pieces of pixel data.

9. The pixel arranging apparatus of claim 5, wherein
the arranging unit includes
a reading sub-unit, for each of the three line memories, for discarding a predetermined number of pieces of pixel data at a start of a line memory after reading thereof, and reading out remaining pieces of pixel data that follow the discarded pieces of pixel data.

10. The pixel arranging apparatus of claim 5, wherein
the arranging unit includes
a reading sub-unit for reading pixel data only from predetermined positions indicated by predetermined consecutive addresses in each of the three line memories.

11. A solid-state image sensing apparatus comprising (a) a solid-state image sensing device that includes two-dimensionally arranged light-to-electric conversion elements and (b) a signal processing circuit, wherein:
the solid-state image sensing device includes:
a vertical transfer unit for transferring, in a vertical direction, signal charges read out from the light-to-electric conversion elements, the vertical transfer unit being composed of a plurality of transfer columns that correspond to a plurality of columns into which the light-to-electric conversion elements are arranged:
a horizontal transfer unit for receiving the signal charges from the vertical transfer unit and transferring the received signal charges in a horizontal direction, wherein
each of the vertical and horizontal transfer units includes transfer electrodes for receiving control signals from a control unit,
each transfer column of the vertical transfer unit includes one or more transfer registers each of which corresponds to a predetermined number of rows of light-to-electric conversion elements,
a bottom register of each one out of every 2n+1 transfer columns, where n is an integer greater than or equal to 1, has a same transfer electrode structure with which transfer of signal charges from the bottom register to the horizontal transfer unit is controlled independent of other transfer registers in each transfer column and other bottom registers of other transfer columns,
wherein the vertical transfer unit, the horizontal transfer unit, and the bottom register are controlled to mix charges of a plurality of light-to-electric conversion elements in order for reducing a number of pixels processed,
the signal processing circuit includes:
a converting unit for converting the signal charges transferred from the horizontal transfer unit into two-dimensionally arranged pixel data, and outputting the two-dimensionally arranged pixel data sequentially; and
a pixel arranging apparatus which includes:
an acquiring unit for acquiring a sequence of the two-dimensionally arranged pixel data;
an extracting unit for extracting pieces of pixel data from the sequence of the two-dimensionally arranged pixel data, one piece out of every predetermined number of pieces; and
an arranging unit for arranging the extracted pieces of pixel data sequentially in an order in which the pieces of pixel data are extracted,
wherein a bottom register of each one out of three transfer columns has a same transfer electrode structure with which transfer of signal charges from the bottom register to the horizontal transfer unit is controlled independent of other transfer registers in each transfer column and other bottom registers of other transfer columns,
wherein the extracting unit extracts, as first pixel data, pieces of pixel data from the plurality of pieces of pixel data, one piece out of three pieces starting from a predetermined position,
extracts, as second pixel data, pieces of pixel data from the plurality of pieces of pixel data, one piece out of three pieces starting from a position that is posterior to the predetermined position by four pieces of pixel data, and
extracts, as third pixel data, pieces of pixel data from the plurality of pieces of pixel data, one piece out of three pieces starting from a position that is posterior to the predetermined position by eight pieces of pixel data, and
the arranging unit arranges the extracted pieces of first pixel data sequentially in an order in which the pieces of first pixel data are extracted,
arranges the extracted pieces of second pixel data sequentially in an order in which the pieces of second pixel data are extracted, and
arranges the extracted pieces of third pixel data sequentially in an order in which the pieces of third pixel data are extracted,
wherein the extracting unit extracts a predetermined number of pieces of first pixel data,
the extracting unit extracts a predetermined number of pieces of second pixel data, and
the extracting unit extracts a predetermined number of pieces of third pixel data, and
wherein the extracting unit includes:
a storage sub-unit;
a writing sub-unit for writing the sequence of the plurality of pieces of pixel data into an area having consecutive addresses of the storage sub-unit in an order in which the writing sub-unit receives thereof; and
an address control sub-unit for outputting addresses that each appear every predetermined number of addresses among the consecutive addresses for the area, wherein
the arranging unit reads pieces of pixel data from positions in the area indicated by the addresses output by the address control sub-unit, and arranges the read pieces of pixel data sequentially.

12. The solid-state image sensing apparatus of claim 11, wherein
the address control sub-unit includes:
a control signal receiving lower-unit for receiving, from outside the pixel arranging apparatus, a reference clock and a horizontal sync signal;
a horizontal counter for counting in synchronization with the reference clock to output horizontal counting values;

a vertical counter for counting in synchronization with the horizontal sync signal to output vertical counting values; and an address calculating lower-unit for calculating addresses that are each represented by ax+by+c, based on the horizontal and vertical counting values, wherein "x" represents a horizontal counting value, "y" represents a vertical counting value, "a" and "b" respectively represent a given number, and "c" represents a reading start address that corresponds to a position from which the extracting unit begins to extract the pieces of pixel data.

13. The solid-state image sensing apparatus of claim 11, wherein the extracting unit includes:

a storage sub-unit including three line memories; and a control sub-unit for cyclically selecting a line memory out of the three line memories each time one piece of pixel data is transferred, and the arranging unit includes a writing sub-unit for extracting one piece of pixel data from the sequence of the plurality of pieces of pixel data in an order in which the writing unit receives thereof, and writing the extracted piece of pixel data into a line memory currently selected by the control sub-unit.

14. The solid-state image sensing apparatus of claim 11, wherein the arranging unit includes:

a 2-port memory for performing reading and writing of data in parallel; and a data processing sub-unit for writing or reading the extracted pieces of pixel data into/from the 2-port memory based on a two-dimensional arrangement of light-to-electric conversion elements provided in the solid-state image sensing device.

15. A camera including the solid-state image sensing apparatus defined in claim 11.

16. The solid-state image sensing apparatus of claim 13, wherein the writing sub-unit writes, into the line memory currently selected by the control sub-unit, only pieces of pixel data located at positions excluding predetermined positions for exclusion in the sequence of the plurality of pieces of pixel data.

17. The solid-state image sensing apparatus of claim 13, wherein the arranging unit includes a reading sub-unit, for each of the three line memories, for discarding a predetermined number of pieces of pixel data at a start of a line memory after reading thereof, and reading out remaining pieces of pixel data that follow the discarded pieces of pixel data.

18. The solid-state image sensing apparatus of claim 13, wherein the arranging unit includes a reading sub-unit for reading pixel data only from predetermined positions indicated by predetermined consecutive addresses in each of the three line memories.

* * * * *